(12) United States Patent
Oroojlooyjadid et al.

(10) Patent No.: US 11,531,907 B2
(45) Date of Patent: Dec. 20, 2022

(54) AUTOMATED CONTROL OF A MANUFACTURING PROCESS

(71) Applicant: SAS Institute Inc., Cary, NC (US)

(72) Inventors: Afshin Oroojlooyjadid, Hellertown, PA (US); Mohammadreza Nazari, Philadelphia, PA (US); Davood Hajinezhad, Cary, NC (US); Amirhassan Fallah Dizche, Raleigh, NC (US); Jorge Manuel Gomes da Silva, Durham, NC (US); Jonathan Lee Walker, Raleigh, NC (US); Hardi Desai, Raleigh, NC (US); Robert Blanchard, San Diego, CA (US); Varunraj Valsaraj, Cary, NC (US); Ruiwen Zhang, Cary, NC (US); Weichen Wang, Cary, NC (US); Ye Liu, Morrisville, NC (US); Hamoon Azizsoltani, Raleigh, NC (US); Prathaban Mookiah, San Diego, CA (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/854,264

(22) Filed: Jun. 30, 2022

(65) Prior Publication Data
US 2022/0374732 A1    Nov. 24, 2022

Related U.S. Application Data

(63) Continuation-in-part of application No. 17/559,735, filed on Dec. 22, 2021, now Pat. No. 11,436,438.
(Continued)

(51) Int. Cl.
*G06N 5/02*        (2006.01)

(52) U.S. Cl.
CPC ................................ *G06N 5/022* (2013.01)

(58) Field of Classification Search
CPC ........................................................ G06N 5/022
(Continued)

(56) References Cited

U.S. PATENT DOCUMENTS 6,529,891 B1 * 3/2003 Heckerman .......... G06K 9/6296
707/999.107
10,402,741 B2   9/2019 Hunt et al.
(Continued)

OTHER PUBLICATIONS

Mnih, Volodymyr, et al. "Human-level control through deep reinforcement learning." nature 518.7540 (2015): 529-533.
(Continued)

*Primary Examiner* — Juan A Torres
(74) *Attorney, Agent, or Firm* — Bell & Manning, LLC

(57) ABSTRACT

A computing device trains a machine state predictive model. A generative adversarial network with an autoencoder is trained using a first plurality of observation vectors. Each observation vector of the first plurality of observation vectors includes state variable values for state variables and an action variable value for an action variable. The state variables define a machine state, wherein the action variable defines a next action taken in response to the machine state. The first plurality of observation vectors successively defines sequential machine states to manufacture a product. A second plurality of observation vectors is generated using the trained generative adversarial network with the autoencoder. A machine state machine learning model is trained to predict a subsequent machine state using the first plurality of observation vectors and the generated second plurality of observation vectors. A description of the machine state machine learning model is output.

30 Claims, 25 Drawing Sheets
(6 of 25 Drawing Sheet(s) Filed in Color)

Related U.S. Application Data

(60) Provisional application No. 63/306,963, filed on Feb. 4, 2022, provisional application No. 63/185,850, filed on May 7, 2021.

(58) Field of Classification Search
USPC .......................................................... 706/12
See application file for complete search history.

(56) References Cited

U.S. PATENT DOCUMENTS

| | | | |
|---|---|---|---|
| 10,474,959 B2 | 11/2019 | Hunt et al. | |
| 10,699,207 B2 | 6/2020 | Hunt et al. | |
| 10,762,424 B2 | 9/2020 | Nazari et al. | |
| 11,055,861 B2 | 7/2021 | Nazari et al. | |
| 2019/0012344 A1* | 1/2019 | Gebremariam | G06F 16/24554 |
| 2020/0183047 A1* | 6/2020 | Denli | G06F 17/18 |
| 2020/0394559 A1* | 12/2020 | Zhang | G06N 3/0472 |
| 2020/0410273 A1* | 12/2020 | Miao | G06V 10/255 |
| 2021/0019551 A1* | 1/2021 | Yan | G06N 3/0454 |
| 2022/0036539 A1* | 2/2022 | Brauer | G06T 7/0004 |
| 2022/0058444 A1* | 2/2022 | Olabiyi | G06K 9/6264 |
| 2022/0147818 A1* | 5/2022 | Zhang | G06N 3/08 |

OTHER PUBLICATIONS

Omidshafiei, Shayegan, et al. "Deep decentralized multi-task multi-agent reinforcement learning under partial observability." International Conference on Machine Learning. PMLR, 2017. pp. 1-10.

Ruder, Sebastian. "An overview of multi-task learning in deep neural networks." arXiv preprint arXiv:1706.05098 (2017).

Yan, Hao, et al. "Deep multistage multi-task learning for quality prediction of multistage manufacturing systems." *Journal of Quality Technology* 53.5 (2021): 526-544.

Bellemare, Marc G., et al. "Autonomous navigation of stratospheric balloons using reinforcement learning." *Nature* 588.7836 (2020): 77-82.

SAS Institute Inc. 2017. *SAS® Visual Data Mining and Machine Learning 8.2: Deep Learning Programming Guide*. Cary, NC: SAS Institute Inc.

SAS Institute Inc. 2022. *SAS® Visual Data Mining and Machine Learning: Reinforcement Learning Programming Guide*. Cary, NC: SAS Institute Inc.

SAS Institute Inc. 2021. *SAS® Visual Data Mining and Machine Learning: Reinforcement Learning Programming Guide*. Cary, NC: SAS Institute Inc.

Mnih, Volodymyr, et al. Presentation of "Human-level control through deep reinforcement learning." Google DeepMind. CSC2541. Nov. 4, 2016.

* cited by examiner

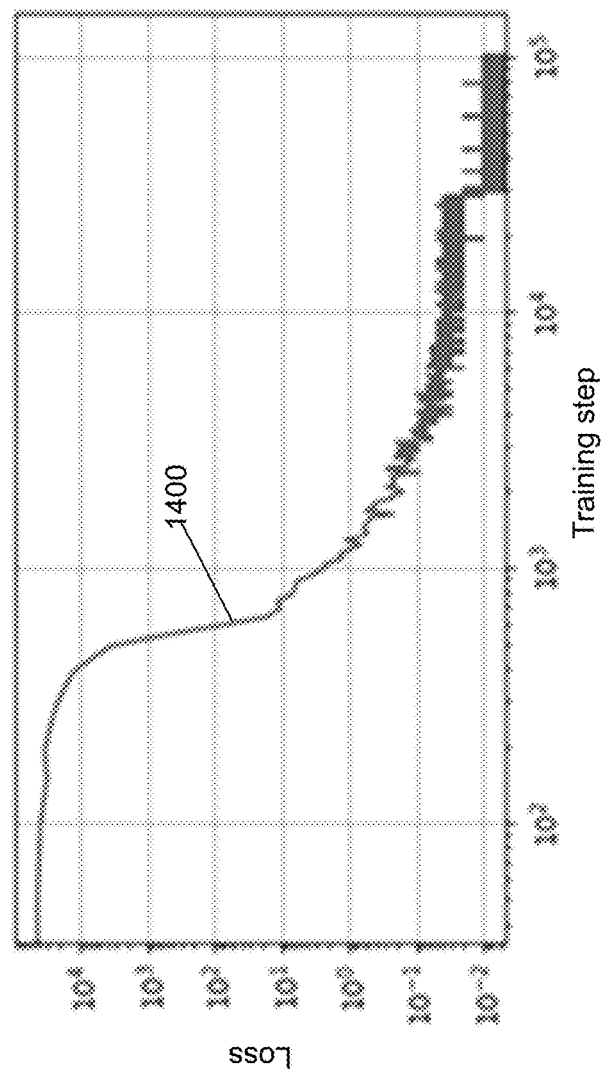
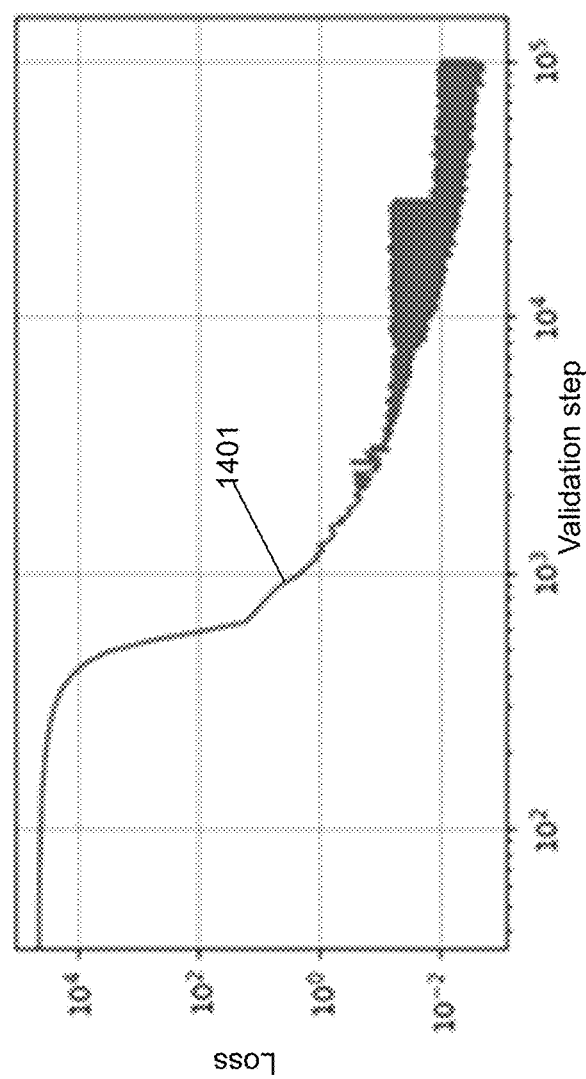

AUTOMATED CONTROL OF A MANUFACTURING PROCESS

CROSS-REFERENCE TO RELATED APPLICATIONS

The present application claims the benefit of and priority under 35 U.S.C. § 119(e) to U.S. Provisional Patent Application No. 63/306,963 filed on Feb. 4, 2022, the entire contents of which are hereby incorporated by reference. The present application is also a continuation-in-part of U.S. patent application Ser. No. 17/559,735 that was filed Dec. 22, 2021, the entire contents of which are hereby incorporated by reference. U.S. patent application Ser. No. 17/559,735 claimed priority under 35 U.S.C. § 119(e) to U.S. Provisional Patent Application No. 63/185,850 filed on May 7, 2021.

BACKGROUND

The emergence of automation and automatic control in a manufacturing process makes it possible to decrease a cost of a final product and increase a quality of a final product. Nevertheless, efficient and automatic control of a manufacturing process remains a challenge.

SUMMARY

In an example embodiment, a non-transitory computer-readable medium is provided having stored thereon computer-readable instructions that, when executed by a computing device, cause the computing device to train a machine state predictive model. A generative adversarial network with an autoencoder is trained using a first plurality of observation vectors. Each observation vector of the first plurality of observation vectors includes state variable values for state variables and an action variable value for an action variable. The state variables define a machine state, wherein the action variable defines a next action taken in response to the machine state. The first plurality of observation vectors successively defines sequential machine states to manufacture a product. A second plurality of observation vectors is generated using the trained generative adversarial network with the autoencoder. A plurality of observation vectors includes the first plurality of observation vectors and the generated second plurality of observation vectors. A machine state machine learning model is trained to predict a subsequent machine state using the plurality of observation vectors. A description of the trained machine state machine learning model is output.

In yet another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to train a machine state predictive model.

In an example embodiment, a method of training a machine state predictive model is provided.

Other principal features of the disclosed subject matter will become apparent to those skilled in the art upon review of the following drawings, the detailed description, and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the disclosed subject matter will hereafter be described referring to the accompanying drawings, wherein like numerals denote like elements.

FIG. 14A shows a loss value as a function of a training step computed for a state variable by the environment model training device of FIG. 6 in accordance with an illustrative embodiment.

FIG. 14B shows a loss value as a function of a validation step computed for the state variable by the environment model training device of FIG. 6 in accordance with an illustrative embodiment.

DETAILED DESCRIPTION

Figure 1:
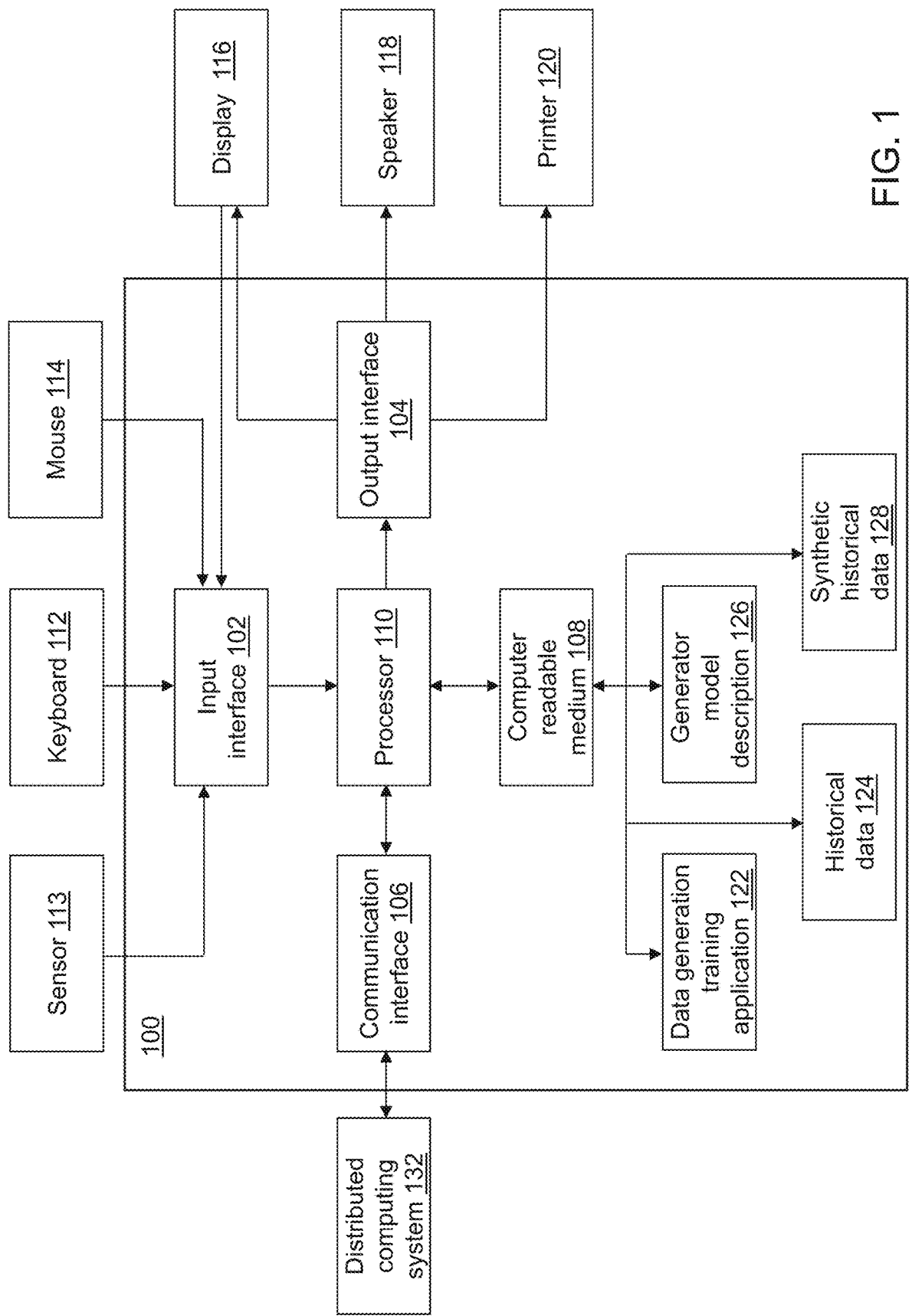
FIG. 1 depicts a block diagram of a data generation training device in accordance with an illustrative embodiment.

Control of machines and tools is a crucial aspect in the manufacture of products. The raw materials and parts are passed through different machines, each performing a pre-designed operation until a final product is output. In an automated manufacturing environment, different possible properties for products and conditions of machines are considered in advance and for each property/condition the settings for each machine are determined. When each product enters a machine, sensors detect and provide information regarding a state of the product, of an environment surrounding the product, and/or of the machine. Using predetermined settings, the machine performs an intended operation on the product. To make sure that the manufacturing process performs accurately, key performance indicators for the process may be obtained and monitored continuously by product managers. If any indicator starts to deviate from an intended operation, a product management team adjusts the settings of the machine/machines that they think caused the issue. However, this can be a tedious process because typically it is not easy to find a machine operation adjustment that results in minimal wasted product. Worse, for some products, the setting of each machine may need to be verified/adjusted for each single part making it a laborious task. This process typically depends on the expert knowledge of key individuals making the system availability/performance rely on a few people.

The quality of the final product also depends heavily on the performance of every machine used as part of the production line. If one machine does not perform as intended, the final product will not match the designed specifications resulting in a wasted item. For example, in tile manufacturing, if the temperature of one oven (usually a tile goes into more than 10 ovens) goes higher than what it is supposed to be, the color of different tiles may deviate slightly from the intended color possibly resulting in a wasted tile. Similarly, in a part manufacturing process, a part may require casting and molding that involves several ovens, manufacturing injection, machining, joining operations like welding, shearing and forming, or thermal processes. The parts may be deformed in the forging process if the oven temperature is too high, or may not be formed well if the oven temperature is too low. Either case usually results in a wasted part causing revenue loss.

Waste in a manufacturing process can be very expensive. For example, the waste involved in tile manufacturing in Europe is about 1.4 million tons per year that accounts for about 5% of the raw material consumption. In a manufacturing company that follows common best practices, the waste can be as low as 0.05% in auto-steering systems or as high as 7% in a welding wire manufacturer. Overall, for small and medium-scale manufacturers, the waste on average is about 3.9%, which can account for millions of dollars expenses per year.

The waste usually happens when some unforeseen situation occurs resulting in a deviation from the standard-setting. In manufacturing systems using rule-based methods for machine control, the process is modeled using a set of differential equations, and the outcome of the model determines the control policy. These control policies usually work normal conditions; however, any deviation from the normal conditions results in a deviation from the intended specifications of the final product. For example, in the tile manufacturing process, several machines add paint to the tiles and then the tiles are passed into a series of ovens for baking. Any change in the thickness of the color added by one machine results in a color variation. As a result, after the tiles are baked in the ovens, the tiles with more color may be sufficiently darker that they are treated as. Like the machines that add paint, the ovens need to be controlled precisely to achieve the same quality for all of the tiles. For each oven, the temperature needs to be adjusted for tiles with different thicknesses and different color patterns. Otherwise, colors deviate again possibly resulting in wasted tiles. Thus, due to the complexity of various manufacturing systems and the existence of unpredictable events, machine control using the classical methods is inefficient and results in waste.

In some manufacturing processes, it might be required to customize the setting of each machine for every single product. For example, the customization may need to consider the previous processed parts due to the sequence-dependent quality criteria and sequence-dependent machine setup. This means that the processing time of a certain product on a machine is not deterministic and varies based on the previous parts or settings of the machine. In other words, the performance of the machine follows a stochastic process in which the settings (decision) of the machine for each product may affect the quality of the upcoming products. This can be translated into a sequential decision-making problem for each single machine in the production line, and for all the machines together. Given this, there are two viewpoints for dealing with the decision-making problem in a production line: making a decision for a single machine by considering the different items that are sent to it, and making a decision for a single item on all of the machines on which the product is processed. Herein, the first viewpoint is applied because the pipeline can easily be extended to all machines.

The root of the issues with the classical methods is originated in the fact that the method needs to consider all possible cases for product property and machine settings. However, because there may be numerous cases, it is very expensive or sometimes impossible to consider all of them to obtain a pre-determined solution based on the differential equation for each. However, if we use historical observations along with machine learning techniques, the policy can be trained to handle unexpected events by extrapolating the trained policy for new situations. To obtain an effective machine control model, an ensemble of machine learning models may be combined and trained in a pipeline.

The machine control is based on characteristics of the raw materials/products as well as the status of the machines at each decision time. The existence of enough historical data that describes the process is key to development of an effective machine control model using the pipeline. First, a simulator of the environment is trained with machine learning methods such as linear regression, random forest, gradient boosting method, deep learning, etc., or an ensemble of them. The trained simulator can be used to simulate different scenarios and evaluate different metrics in each scenario. The trained simulator is used with a reinforcement learning (RL) algorithm to train a specialized policy to control each of the machines, or any number of them together. The outcome of the RL algorithm is a policy, a mapping of the status of the system to the actions that can be used to control the machine(s) in an efficient way.

RL is a field of machine learning in which an agent interacts with an environment with the goal of maximizing the expected cumulative discounted reward in a sequential decision-making problem. The agent observes a state of the system, takes an action, and passes the taken action to the trained environment simulator, and in return the environment predicts a reward value and a next-state of the system. Through these interactions with the trained environment simulator, the agent learns a policy that maps the state to an action that maximizes the long-term discounted cumulative reward. An RL algorithm manages this learning process with the goal of learning the optimal policy as quick as possible and with the smallest number of interactions.

Multi-task learning (MTL) is a field of machine learning in which a single machine learning model is trained to simultaneously solve multiple, correlated problems at once. This is in contrast to traditional machine learning where statistical models are developed to solve a single problem. The MTL model receives input as a standard machine learning model, but the learned features are used to produce multiple output values that correspond to each of the desired tasks. This approach can be advantageous in situations in which solving one task imparts information that may be useful in solving a related task. More recently, multi-task learning has been extended to deep-learning methods to produce deep neural networks that are capable of solving for multiple tasks simultaneously.

Such a neural network consists of one or more layers unique to each task that are fed by at least one layer that is shared across all tasks. Each task has a corresponding loss function with an associated scaler that can be used to increase or decrease the model's "focus" on that particular task. The model's weights are learned through minimizing a linear combination of the weighted loss functions, known as the total loss. This architecture affords a network that extracts latent features that generalize across all of the tasks while also allowing each task-specific branch of the network to learn embeddings specific to that particular task. The deep neural network is trained using historical data collected from the manufacturing environment to predict the parameters for the manufacturing devices which, if used, will result in products manufactured to the desired specifications. The training routine aims to minimize the difference between the network's outputs and the desired manufacturing parameters. Once trained and deployed in the manufacturing environment, the network is provided with a current state of the manufacturing system and in response, outputs the appropriate device parameters.

For illustration, the MTL model may be used to control a series of ovens during a glass bending process while manufacturing automotive mirrors. The MTL model receives input encoding the type and thickness of the raw glass, the product being manufactured, the desired curvature of the glass, the number of cycles of relevant equipment that undergoes regular replacement, the route the glass will take through additional manufacturing processes (e.g., annealing lanes), and the degree to which recently manufactured mirrors have conformed to the target specifications. Each piece of raw glass travels through a series of seven 7 ovens, in sequence. During the process, the glass is progressively heated and bent. The MTL model treats each of these heating steps as a separate (but not independent) task and contains a separate output layer for each task. Each output layer provides the temperature to which that oven should be set to optimally bend the piece of raw glass, given the current state of the manufacturing environment.

In the end-to-end pipeline, historical data of a manufacturing process is used to train the simulator of the environment that is used to train an RL agent. To build the trained simulator, also referred to as the environment, the state and action spaces are defined, which involves the definition of the state variables and a set of allowed actions for each state variable. An environment is a simulator of the actual system, such as a manufacturing line, in the real world. At its core, the environment is a predictor model that may include one or more physics-based models or a machine learning model trained using the historical data. An environment can be very useful in a manufacturing system to simulate the system with new settings, machine failure analysis, inventory management, etc. This can be done by designing different scenarios and running thousands/millions of time-steps of the process using the trained simulator and analyzing the counterfactual output.

To build the environment for a production line, a machine learning model is trained for each state variable in the to simulate a state-transition for that variable. Assuming the existence of n variables used to define a machine state $s_t$ at time t, n machine learning models are trained, one for each state-variable-transition. The input to these models is historical data that includes a sequence of state $s_t$ and action $a_t$ pairs. Each model predicts one of the state variables for the next time-step t, i.e., $s_{t+1}=ML^i(s_t, a_t)$, $i \in \{1, \ldots, n\}$, where ML indicates the machine learning model. Similarly, assuming the existence of n variables in a reward function, reward variables can be obtained by $r_t^j=ML^j(s_t, a_t)$, $j \in \{1, \ldots, m\}$. A reward value $r_t$ for time t can be obtained using a reward value function $r_t=g(r_t^1, \ldots, r_t^m)$ where g indicates the reward value function. For illustration, the reward value function may be a sum of the reward computed for each reward variable. The reward value function and its parameters may be industry-specific and specifically defined for each production line.

The main criteria for the trained simulator are its accuracy with respect to the real-world system and its speed in predicting the action. A very accurate model may run slowly making it unusable in practice. Similarly, a fast model that is inaccurate is not useful. There are several machine learning algorithms that can be used to train an environment. Linear regression, decision tree, random forest, gradient boosting, support vector machine, naïve Bayesian model, and neural networks are among the most common machine learning models to train a predictor model. To choose a type of machine learning model, experiments were performed for different state-spaces of a manufacturing process with linear regression, random forest, gradient boosting, neural network, support vector machine, and non-linear regression via a Taylor series expansion. Among them, with a large enough historical dataset, the neural network performed the best considering both the accuracy and the prediction time. In addition, utilizing the neural network to train the environment allows scoring the environment using a graphical processing unit (GPU), resulting in an approximately 50% decrease in the score time. Furthermore, using a GPU supports scoring of dozens of environment instances in parallel with almost zero overhead. The existence of this capability further supports multi-threaded training of the RL agent resulting in faster training of the RL algorithm. This is possible since running parallel instances of the environment supports the gathering of more samples and as a result, more gradient steps used to update the policy faster.

The main functions of the environment used in training the RL algorithm are a reset function and a step function. The reset function chooses a random state based on the state variable. The step function takes an action and runs the dynamic of the production line to predict the reward value and the next-state. Once trained, in each call of the step function, the score function of the trained models is called. The RL agent calls the step function thousands of times, so it is important that the step function be fast. Otherwise, it would be very expensive to train an RL agent. This means that the utilized machine learning models in the step function should be very quick to score.

Once the environment is ready for use, the RL algorithm is trained to learn the policy. In the manufacturing process, the state usually involves continuous variables with an infinite state-space size. As a result, the classic tabular RL algorithm cannot be used to train a policy. To address this issue, a function approximator is used to approximate the value of each state and action pair. The action space typically involves a few possible actions or continuous actions in a small range that can be translated into a discrete action space with a reasonable size. A Deep Q-Network algorithm, for example as described in a paper by Mnih Volodymyr, et al., titled *Human-level control through deep reinforcement learning* and published in Nature volume 518 number 7540 at pages 529-533 in 2015, may be used to train the policy that uses a neural network to approximate the value of each discrete action on each continuous state.

Enough historical data is needed to train the simulator and the policy. In some cases, enough historical data may not be available. As a result, the historical data that exists may be used to train a generator model to generate additional synthetic data that supplements the existing historical data. To train machine learning models to provide accurate target variable value predictions, the synthetic data used to train the machine learning models should accurately represent the observations included in historical data 124 that may include continuous as well as discrete variables with widely varying statistical distributions. The observations included in historical data 124 further may include high cardinality variables and exhibit a high degree of sparsity. A data generation training application 122 generates synthetic data in which the pairwise correlation between variables is more accurate than using existing methods as shown by results described herein. Data generation training application 122 provides a data generation model training process based on a combination of a conditional generative adversarial network (GAN) with an autoencoder (AE).

An architecture implemented using data generation training application 122 includes a conditional generator model and a discriminator model. The conditional generator model solves the problem of imbalanced categorical data that is common in real tabular data. More specifically, the conditional generator model samples such that all of the categories from discrete attributes are sampled evenly during the training process so that during the testing process, the real data distribution is accurately reproduced. The discriminator model classifies a data point as either real (drawn from historical data 124) or fake (generated). Fake is also referred to as synthetic herein. The architecture implemented using data generation training application 122 further includes an AE trained to understand the pairwise correlations in the real data and to preserve the pairwise correlation in a lower dimensional feature space. The conditional generator is integrated with the decoder model of the trained AE.

Referring to FIG. 1, a block diagram of a data generation training device 100 is shown in accordance with an illustrative embodiment. Data generation training device 100 may include an input interface 102, an output interface 104, a communication interface 106, a non-transitory computer-readable medium 108, a processor 110, data generation training application 122, historical data 124, a generator model description 126, and synthetic historical data 128. Data generation training application 122 trains a generator model with a decoder model and a discriminator model to create data stored in synthetic historical data 128 from data stored in historical data 124. Fewer, different, and/or additional components may be incorporated into data generation training device 100.

Input interface 102 provides an interface for receiving information from the user or another device for entry into data generation training device 100 as understood by those skilled in the art. Input interface 102 may interface with various input technologies including, but not limited to, a keyboard 112, a sensor 113, a mouse 114, a display 116, a track ball, a keypad, one or more buttons, etc. to allow the user to enter information into data generation training device 100 or to make selections presented in a user interface displayed on display 116.

The same interface may support both input interface 102 and output interface 104. For example, display 116 comprising a touch screen provides a mechanism for user input and for presentation of output to the user. Data generation training device 100 may have one or more input interfaces that use the same or a different input interface technology. The input interface technology further may be accessible by data generation training device 100 through communication interface 106.

Output interface 104 provides an interface for outputting information for review by a user of data generation training device 100 and/or for use by another application or device. For example, output interface 104 may interface with various output technologies including, but not limited to, display 116, a speaker 118, a printer 120, etc. Data generation training device 100 may have one or more output interfaces that use the same or a different output interface technology. The output interface technology further may be accessible by data generation training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Data generation training device 100 may have one or more communication interfaces that use the same or a different communication interface technology. For example, data generation training device 100 may support communication using an Ethernet port, a Bluetooth antenna, a telephone jack, a USB port, etc. Data and/or messages may be transferred between data generation training device 100 and another computing device of a distributed computing system 132 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Data generation training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Data generation training device 100 also may have one or more drives that support the loading of a memory media such as a CD, DVD, an external hard drive, etc. One or more external hard drives further may be connected to data generation training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Data generation training device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a GPU, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Data generation training application 122 may perform operations associated with training an AE, a generator model with a decoder model, and a discriminator model to generate fake or synthetic observation vectors from data stored in historical data 124. Some or all of the operations described herein may be embodied in data generation training application 122. The operations may be implemented using hardware, firmware, software, or any combination of these methods.

Referring to the example embodiment of FIG. 1, data generation training application 122 is implemented in software (comprised of computer-readable and/or computer-executable instructions) stored in computer-readable medium 108 and accessible by processor 110 for execution of the instructions that embody the operations of data generation training application 122. Data generation training application 122 may be written using one or more programming languages, assembly languages, scripting languages, etc. Data generation training application 122 may be integrated with other analytic tools. As an example, data generation training application 122 may be part of an integrated data analytics software application and/or software architecture such as that offered by SAS Institute Inc. of Cary, N.C., USA. Merely for illustration, data generation training application 122 may be implemented using or integrated with one or more SAS software tools such as Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, and SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Data generation training application 122 may be implemented as a Web application. For example, data generation training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Historical data 124 may include, for example, a plurality of rows and a plurality of columns. The plurality of rows may be referred to as observation vectors or records (observations), and the columns may be referred to as variables. In an alternative embodiment, historical data 124 may be transposed. The plurality of variables defines a vector $x_i$ for each observation vector i=1, 2, . . . , N, where N is a number of the observation vectors included in historical data 124. Historical data 124 may include additional variables that are not included in the plurality of variables. Each observation vector may be defined using one or more continuous variables and/or one or more discrete variables, where $N_c$ is a number of the one or more continuous variables included in historical data 124 for each observation vector, and $N_d$ is a number of the one or more discrete variables included in historical data 124 for each observation vector.

The plurality of variables that define each observation vector may include an identifier variable ID, a plurality of state variables that define a machine state vector s, an action variable a, and a reward variable r. Unique values of identifier variable ID indicate a unique episode. Historical data 124 may include a plurality of episodes. For example, historical data 124 may include data captured for a period of time for multiple machines operating in various manufacturing situations. A common value for the identifier variable ID may indicate a specific machine operating in a specific manufacturing situation. Each episode is a sequence of states, actions, and rewards that occur from a starting time to a time at which a terminal state is reached. For example, a unique value of the identifier variable ID may define a subset of the observation vectors included in historical data 124 that are associated with a specific episode, $e=\{s_j, a_j, r_j\}$, j=1, . . . , T, where T indicates a number of observation vectors that have the unique value of the identifier variable ID and is associated with the terminal state. j=1 is associated with the starting time of the episode.

The machine state s includes variables that define machine characteristics and product characteristics at a particular point in time. For example, state variables for an oven may include a current temperature, a set point temperature, a conveyor speed moving the product through the oven, a time duration that the product has been in the oven, an indicator of the type of product, etc. The final state of the episode ends the task. For example, sensor 113 may measure a physical quantity in an environment to which sensor 113 is associated and generate a corresponding measurement datum that may be associated with a time that the measurement datum is generated. The measurement datum may be stored in historical data 124. Illustrative sensors include a pressure sensor, a temperature sensor, a position or location sensor, a voltage sensor, a current sensor, a frequency sensor, a humidity sensor, a dewpoint sensor, a speed sensor, a torque sensor, etc. that may be mounted to various components used as part of a manufacturing system.

The action variable a may include an integer value where each possible value of the action variable is associated with a different action of a plurality of possible actions. The plurality of possible actions defines an action space that is a set of all actions that can be chosen in a particular manufacturing situation. For example, for an oven, the action space may include an integer value of 0 that indicates to maintain the set point temperature, an integer value of 1 that indicates to increase the set point temperature, and an integer value of 2 that indicates to decrease the set point temperature.

The reward variable r may include a reward value where each possible value of the reward variable indicates a benefit associated with the indicated action variable value. The reward value $r_j$ is a scalar feedback signal at a time step j, where j=1, . . . , T for a specific episode. The reward value may result from actions taken before time step j.

In data science, engineering, and statistical applications, data often consists of multiple measurements (across sensors, characteristics, responses, etc.) collected across multiple time instances (patients, test subjects, etc.). These measurements may be collected in historical data 124 for analysis and processing or streamed to data generation training device 100 as it is generated. Historical data 124 may include data captured as a function of time for one or more physical objects. The data stored in historical data 124 may be captured at different time points, periodically, intermittently, when an event occurs, etc. Historical data 124 may include data captured at a high data rate such as 200 or more observation vectors per second for one or more physical objects. One or more columns of historical data 124 may include a time and/or date value. Historical data 124 may include data captured under normal and abnormal operating conditions of the physical object.

The data stored in historical data 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in historical data 124 may be generated as part of the Internet of Things (IoT), where things (e.g., machines, devices, phones, sensors) can be connected to networks and the data from these things collected and processed within the things and/or external to the things before being stored in historical data 124. For example, the IoT can include sensors in many different devices and types of devices, and high value analytics can be applied to identify hidden relationships and drive increased efficiencies. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in historical data 124.

The data stored in historical data 124 may include any type of content represented in any computer-readable format such as binary, alphanumeric, numeric, string, markup language, etc. The content may include textual information, numeric information, etc. that further may be encoded using various encoding techniques as understood by a person of skill in the art.

Historical data 124 may be stored on computer-readable medium 108 or on one or more computer-readable media of distributed computing system 132 and accessed by data generation training device 100 using communication interface 106 and/or input interface 102. Historical data 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Historical data 124 may be stored using various data structures as known to those skilled in the art including one or more files of a file system, a relational database, one or more tables of a system of tables, a structured query language database, etc. on data generation training device 100 or on distributed computing system 132.

Data generation training device 100 may coordinate access to historical data 124 that is distributed across distributed computing system 132 that may include one or more computing devices. For example, historical data 124 may be stored in a cube distributed across a grid of computers as understood by a person of skill in the art. As another example, historical data 124 may be stored in a multi-node Hadoop® class. For instance, Apache™ Hadoop® is an open-source software framework for distributed computing supported by the Apache Software Foundation. As another example, historical data 124 may be stored in a cloud of computers and accessed using cloud computing technologies, as understood by a person of skill in the art. The SAS® LASR™ Analytic Server may be used as an analytic platform to enable multiple users to concurrently access data stored in historical data 124. The SAS Viya open, cloud-ready, in-memory architecture also may be used as an analytic platform to enable multiple users to concurrently access data stored in historical data 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2A:
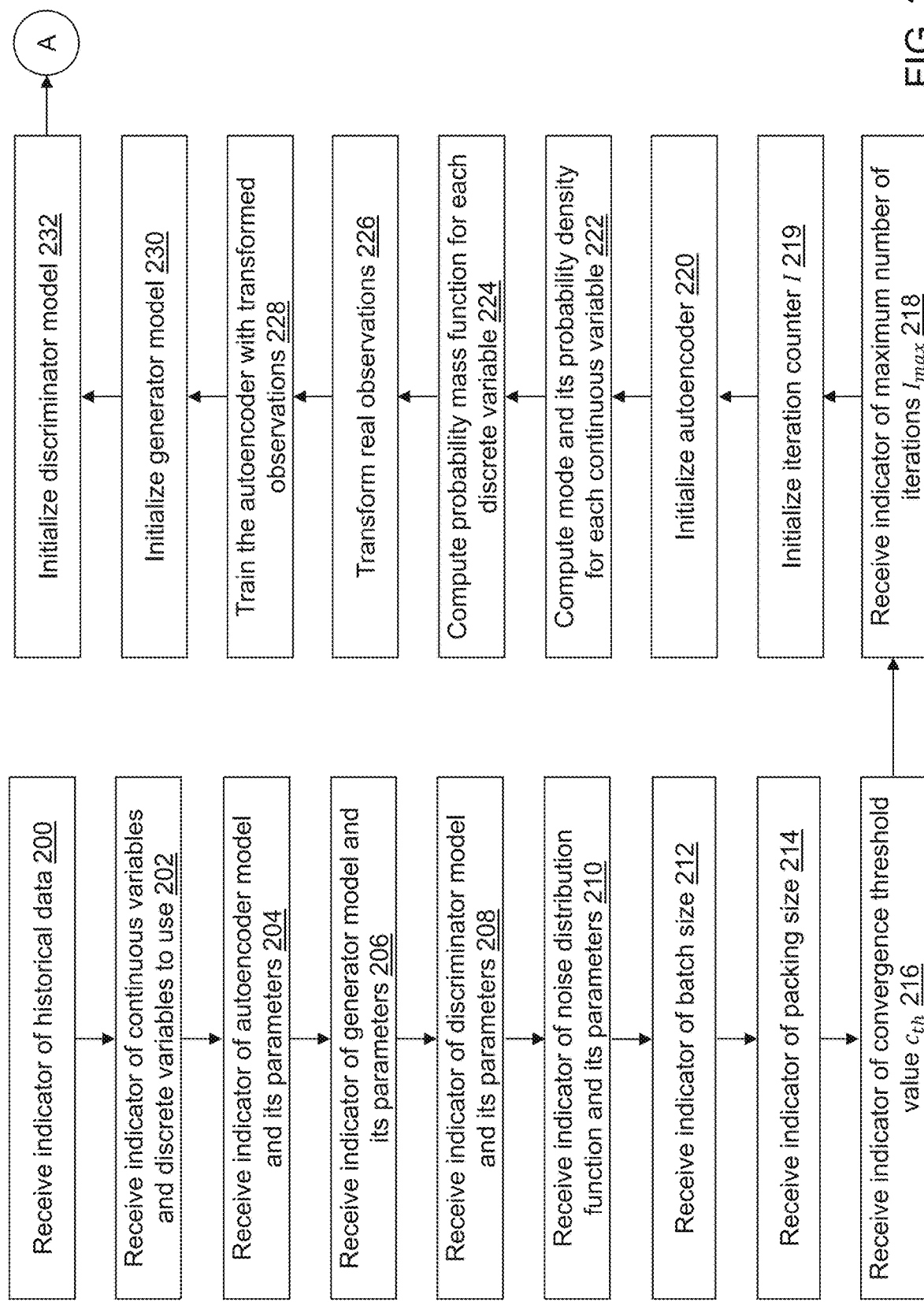
FIGS. 2A through 2C depict a flow diagram illustrating examples of operations performed by a data generation training application of the data generation training device of FIG. 1 in accordance with an illustrative embodiment.
Figure 2B:
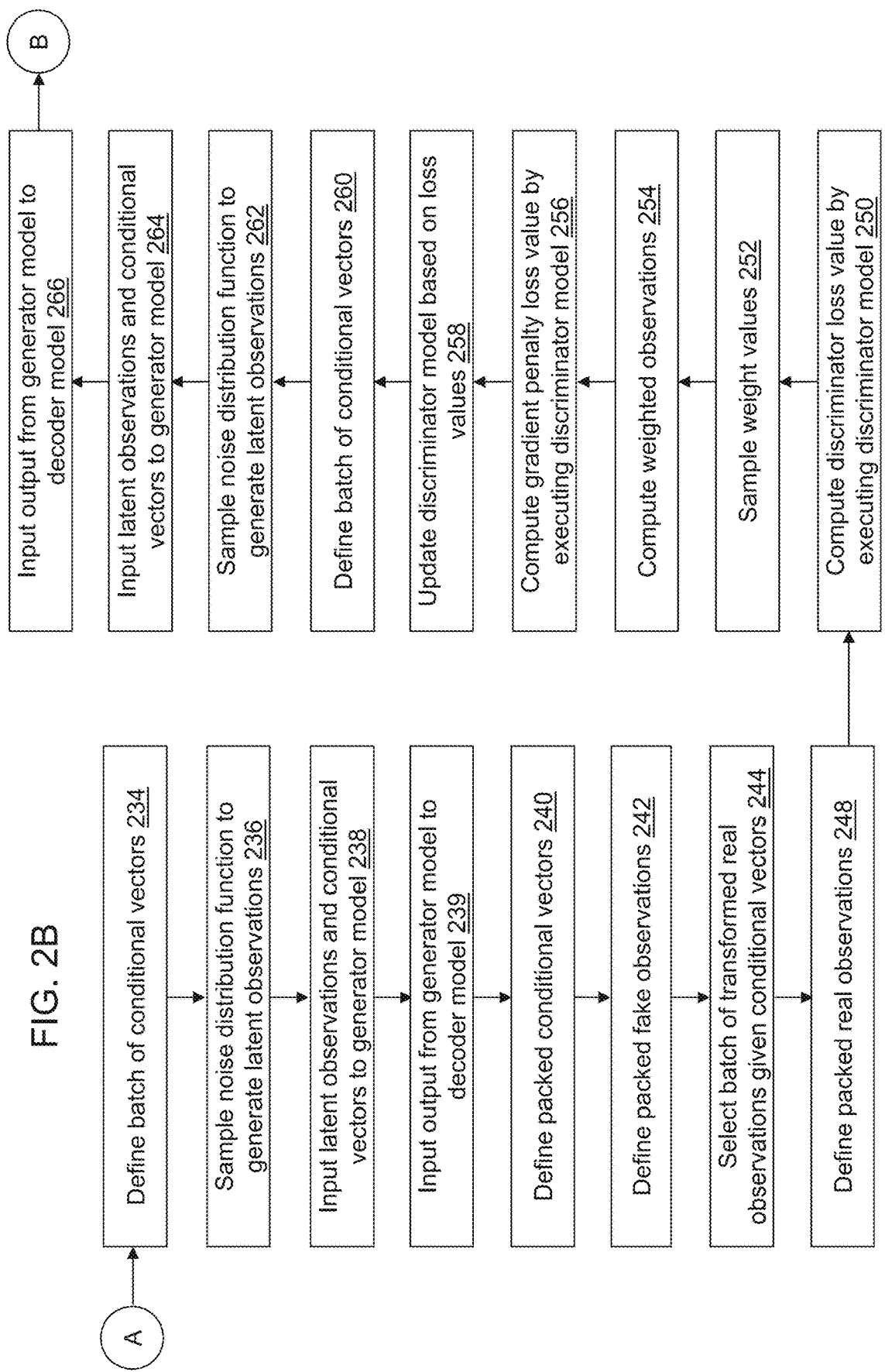
Figure 2C:
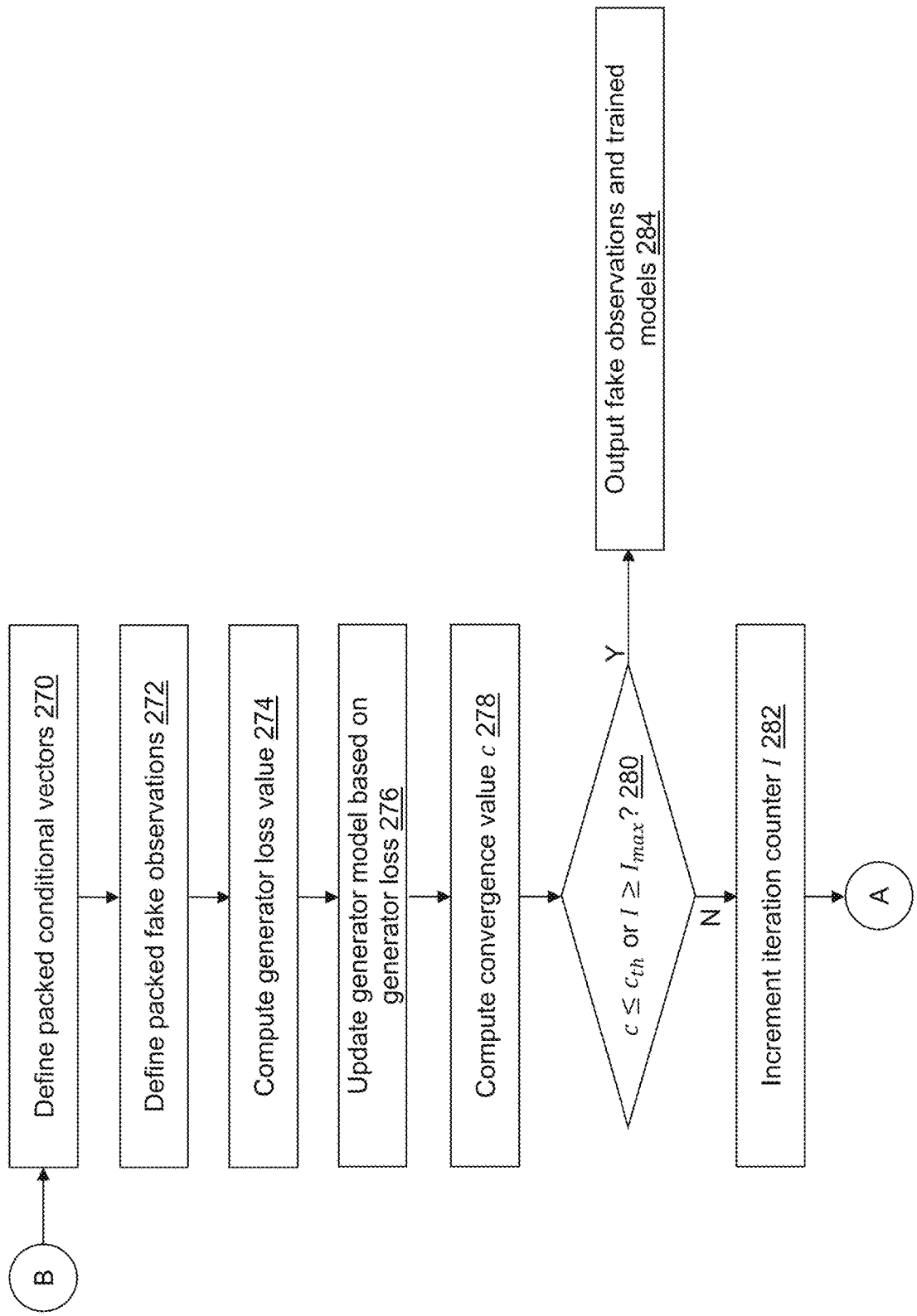

Referring to FIGS. 2A through 2C, example operations associated with data generation training application 122 are described. Additional, fewer, or different operations may be performed depending on the embodiment of data generation training application 122. The order of presentation of the operations of FIGS. 2A through 2C is not intended to be limiting. Some of the operations may not be performed in some embodiments. Although some of the operational flows are presented in sequence, the various operations may be performed in various repetitions and/or in other orders than those that are illustrated. For example, a user may execute data generation training application 122, which causes presentation of a first user interface window, which may include a plurality of menus and selectors such as drop-down menus, buttons, text boxes, hyperlinks, etc. associated with data generation training application 122 as understood by a person of skill in the art. The plurality of menus and selectors may be accessed in various orders. An indicator may indicate one or more user selections from a user interface, one or more data entries into a data field of the user interface, one or more data items read from a command line, one or more data items read from computer-readable medium 108, or one or more data items otherwise defined with one or more default values, etc. that are received as an input by data generation training application 122. Some of the operational flows further may be performed in parallel, for example, using a plurality of threads and/or a plurality of computing devices such as may be included in distributed computing system 132.

Referring to FIG. 2A, in an operation 200, a first indicator may be received that indicates historical data 124. For example, the first indicator indicates a location and a name of historical data 124. As an example, the first indicator may be received by data generation training application 122 after selection from a user interface window or after entry by a user into a user interface window. In an alternative embodiment, historical data 124 may not be selectable. For example, a most recently created dataset may be used automatically.

In an operation 202, a second indicator may be received that indicates the plurality of variables to use from historical data 124 to define observation vectors. A data type such as nominal, interval, categorical, etc. may further be defined for each variable of the plurality of variables. For example, the second indicator may indicate one or more column numbers or one or more column names with a data type defined for each. The plurality of variables are the variables that define each observation vector $x_i$, where $x_i = x_{i,j}$, $j=1, \ldots, N_v$. $x_{i,j}$ is a $j^{th}$ variable value for the $i^{th}$ observation vector $x_i$. A number of the plurality of variables may be indicated by $N_v$. The second indicator may further indicate a column number or a column name that stores the value for $y_i$ in historical data 124. Based on the data type, each variable of the plurality of variables may be indicated as either a continuous variable or a discrete variable. The one or more continuous variables and the one or more discrete variables are each included in the plurality of variables such that $N_v = N_c + N_d$.

In an operation 204, a third indicator indicates an architecture of an AE model and its parameters, where the parameters include hyperparameters and model training parameters. For illustration, the AE model may be a neural network model to be trained to compress observation vectors into a reduced dimension feature space and to decompress the compressed observation vectors back to an input feature space while preserving the correlation between the plurality of variables. The third indicator may be received by data generation training application 122 from a user interface window or after entry by a user into a user interface window. A default value for the architecture may further be stored, for example, in computer-readable medium 108.

For illustration, the AE model architecture defines a plurality of layers and their connectivity including a type of each layer. Illustrative layers include an input layer, a convolution layer, a pooling layer, an output layer, etc. One or more hyperparameters may be defined for each layer that may vary based on a type of each layer. For example, an activation function, a number of neurons, a number of groups, a dropout rate, a height and/or a width of a convolution window, a number of filters, an initialization method for filter weights, width and height padding dimensions, a number of categories or labels or unique values of the target variable value $y_i$, a detection threshold, etc. may be defined as hyperparameters for training the neural network. The architecture may define a convolutional neural network, a deep, fully connected neural network, and/or a recurrent neural network.

For illustration, the AE model may be a fully connected feed-forward neural network that includes of a five-layer deep neural network for both the encoder and the decoder. For the encoder, each layer is fully connected and uses a linear activation function following by a batch normalization. The encoder reduces the dimensionality of the input data to preserve the correlation between variables. The decoder reverses the process of the encoder and reconstructs the input data. In the illustrative fully-connected feed-forward network, any hidden node in the hidden layers gets input from all of the original features so that each hidden node can obtain information globally. For illustration, the depth of the network may be five so that the framework can be generalized to any type of tabular data varying not only in dimension but also in type of relationship, such as a non-linear correlation.

For illustration, the autoencoder model may be described based on the following layers:

$e_0 = \text{Dropout}(\text{BN}(\text{ELU}((\text{FC}_{|r| \to k_0}(r)))), p=0.1)$ $e_1 = \text{Dropout}(\text{BN}(\text{ELU}((\text{FC}_{k_0 \to 0.5k_0}(h_0)))), p=0.1)$ $e_2 = \text{Dropout}(\text{BN}(\text{ELU}((\text{FC}_{0.5k_0 \to 0.25k_0}(h_1)))), p=0.1)$ $e_3 = \text{Dropout}(\text{BN}(\text{ELU}((\text{FC}_{0.25k_0 \to 0.125k_0}(h_2)))), p=0.1)$ $e_4 = \tanh(\text{FC}_{0.125k_0 \to k_1}(h_3))$ $d_0 = \text{Dropout}(\text{BN}(\text{ELU}((\text{FC}_{k_1 \to 0.125k_0}(e_4)))), p=0.1)$ $d_1 = \text{Dropout}(\text{BN}(\text{ELU}((\text{FC}_{0.125k_0 \to 0.25k_0}(d_0)))), p=0.1)$ $d_2 = \text{Dropout}(\text{BN}(\text{ELU}((\text{FC}_{0.25k_0 \to 0.5k_0}(d_1)))), p=0.1)$ $d_3 = \text{Dropout}(\text{BN}(\text{ELU}((\text{FC}_{0.5k_0 \to k_0}(d_2)))), p=0.1)$ $\hat{\alpha}_i = \tanh(\text{FC}_{k_0 \to 1}(d_3)) 1 \leq i \leq N_c$ $\hat{\beta}_i = \text{gumbel}_{0.2}(\text{FC}_{k_0 \to m_i}(d_3)) 1 \leq i \leq N_c$ $\hat{d}_i = \text{gumbel}_{0.2}(\text{FC}_{k_0 \to |D_i|}(d_3)) 1 \leq i \leq N_d$ where r indicates transformed observation vectors input to the autoencoder model, $\text{FC}_{u \to w}$ indicates application of a linear transformation applied to the provided input parameter on a u-dimension input to obtain a w-dimension output, $k_0$ is a maximum dimension value, $k_1$ is a minimum dimension value, | | indicates a number of entries in the identified vectors such as r and $D_i$, BN indicates a batch normalization activation function layer applied to the provided input parameter, ELU indicates an exponential linear activation function layer applied to the provided input parameter, Dropout indicates a dropout layer applied to the provided input parameter that simulates a sparse activation from a given layer such that nodes are randomly dropped during training with a probability defined by a parameter p, tanh indicates a hyperbolic tangent activation function layer applied to the provided input parameter, gumbel$_{0.2}$ (v) indicates application of a Gumbel softmax on a vector v with a parameter $\tau=0.2$, $m_i$ is a number of modes defined for an $i^{th}$ continuous variable, and $D_i$ indicates a vector of unique values of an $i^{th}$ discrete variable. Fully connected layers are those layers where all the inputs from one layer are connected to every activation unit of the next layer.

Layers $e_0$ through $e_4$ are associated with an encoder of the AE model, and layers $d_0$ through $d_3$, $\hat{\alpha}_i$, $\hat{\beta}_i$, i=1, ..., $N_c$, and $\hat{d}_i$, i=1, ..., $N_d$ may be referred to as a decoder of the AE model. $\hat{\alpha}_i$, $\hat{\beta}_i$, i=1, ..., $N_c$, and $\hat{d}_i$, i=1, ..., $N_d$ define an output space of synthetic encoded observation vectors and a transformation of the decoded vector $d_3$. A last layer of the AE model may use the Gumbel softmax function to normalize an output to a probability distribution over the possible values. $\hat{\alpha}_t$ and $\hat{\beta}_i$ are the output values for each continuous variable, where $\hat{\alpha}_i$ is a scalar and $\hat{\beta}_i$ is a selected mode vector, and $\hat{d}_i$ is a one-hot vector representation of an output value computed for each discrete variable. The output of the AE model is a concatenation of $\hat{\alpha}_i$, $\hat{\beta}_i$, i=1, ..., $N_c$ for each continuous variable and $\hat{d}_i$, i=1, ..., $N_d$ for each discrete variable. The input to the autoencoder model is a concatenation of the transformed observation vectors r defined in an input space based on $\alpha_i$, $\beta_i$, i=1, ..., $N_c$ and $d_i$, i=1, ..., $N_d$ computed as described further below.

The one-hot vector representation of the output value computed for a discrete variable includes a binary variable defined for each unique value for a respective discrete variable. The one-hot vector representation can be transformed to the discrete value using a lookup table. For example, for a discrete variable value that includes one of three possible color values in the associated discrete variable column, $D_i$=red, green, blue, $|D_i|$=3, and a one-hot vector representation for the discrete variable value of red would be $\hat{d}_i$=[1,0,0]; a one-hot vector representation for the discrete variable value of green would be $\hat{d}_i$=[0,1,0]; and a one-hot vector representation for the discrete variable value of blue would be $\hat{d}_i$=[0,0,1]. Dummy variable encoding may be used in some embodiments to reduce a length of each one-hot vector representation by one. For example, a one-hot vector representation for the discrete variable value of red may be $\hat{d}_i$=[0,0]; a one-hot vector representation for the discrete variable value of green would be $\hat{d}_i$=[1,0]; and a one-hot vector representation for the discrete variable value of blue would be $\hat{d}_i$=[0,1].

The third indicator may further indicate other hyperparameters for the AE model, such as a value for $\tau$, $k_0$, $k_1$, p, as well as an initial weight vector $w_0$ or a methodology by which the initial weight vector $w_0$ is defined. The training parameters for the AE model may be associated with application of gradient descent in updating gradient vectors and weight vectors each iteration, with application of forward and backward propagation, with a loss function, etc. For example, a binary cross-entropy (BCE) loss function may be used to train the AE model:

$$BCE_{loss} = -\frac{1}{N}\sum_{i=1}^{N} r_i \log o_i + (1 - r_i)\log(1 - o_i),$$

where $r_i$ is an input to an encoder of the AE model, and $o_i$ is an output of the decoder of the AE model.

In an operation 206, a fourth indicator indicates an architecture of a generator model and its parameters, where the parameters include hyperparameters and model training parameters. For illustration, the generator model may be a neural network model to be trained to conditionally generate new observation vectors. The fourth indicator may be received by data generation training application 122 from a user interface window or after entry by a user into a user interface window. A default value for the architecture may further be stored, for example, in computer-readable medium 108.

For illustration, the generator model architecture defines a plurality of layers and their connectivity including a type of each layer. Illustrative layers include an input layer, a convolution layer, a pooling layer, an output layer, etc. One or more hyperparameters may be defined for each layer that may vary based on a type of each layer. For example, an activation function, a number of neurons, a number of groups, a dropout rate, a height and/or a width of a convolution window, a number of filters, an initialization method for filter weights, width and height padding dimensions, a number of categories or labels or unique values of the target variable value $y_i$, a detection threshold, etc. may be defined as hyperparameters for training the neural network. The architecture may define a convolutional neural network, a deep, fully connected neural network, and/or a recurrent neural network For illustration, the generator model may be described based on the following layers:

$h_0 = z \oplus \text{cond}$ $h_1 = h_0 \oplus \text{ReLU}(\text{BN}(\text{FC}_{|cond|+|z| \to k_2}(h_0)))$ $h_2 = h_1 \oplus \text{ReLU}(\text{BN}(\text{FC}_{|cond|+|z|+k_2 \to k_2}(h_1)))$ $g = \tanh(\text{FC}_{k_2 \to k_1}(h_2))$ where z indicates a batch of latent observation vectors input to the generator model, cond indicates a batch of conditional vectors input to the generator model, $\oplus$ indicates to concatenate vectors, $k_2$ indicates a generator dimension, and ReLU indicates a rectified linear activation function layer applied to the provided input parameter. The output of the generator model, g, is at the same dimension $k_1$ of the input to the decoder of the autoencoder and replaces $e_4$ when the generator model is connected to a decoder model of the AE model as described further below. Layers $d_0$ through $d_3$ may be referred to as the decoder of the AE model. $\hat{\alpha}_i$, $\hat{\beta}_i$, i=1, ..., $N_c$, and $\hat{d}_i$, i=1, ..., $N_d$ define the output space of synthetic encoded observation vectors and a transformation of the decoded vector $d_3$ computed from g.

The fourth indicator may further indicate other hyperparameters for the generator model as well as an initial weight vector $w_0$ or a methodology by which the initial weight vector $w_0$ is defined. The training parameters for the generator model may be associated with application of gradient descent in updating gradient vectors and weight vectors each iteration, with application of forward and backward propagation, with a loss function, etc.

In an operation 208, a fifth indicator indicates an architecture of a discriminator model and its parameters, where the parameters include hyperparameters and model training parameters. For illustration, the discriminator model may be a neural network model to be trained to recognize whether an input observation vector is real or fake (synthetic). The fifth indicator may be received by data generation training application 122 from a user interface window or after entry by a user into a user interface window. A default value for the architecture may further be stored, for example, in computer-readable medium 108.

For illustration, the discriminator model architecture defines a plurality of layers and their connectivity including a type of each layer. Illustrative layers include an input layer, a convolution layer, a pooling layer, an output layer, etc. One or more hyperparameters may be defined for each layer that may vary based on a type of each layer. For example, an activation function, a number of neurons, a number of groups, a dropout rate, a height and/or a width of a convolution window, a number of filters, an initialization method for filter weights, width and height padding dimensions, a number of categories or labels or unique values of the target variable value $y_i$, a detection threshold, etc. may be defined as hyperparameters for training the neural network. The architecture may define a convolutional neural network, a deep, fully connected neural network, and/or a recurrent neural network.

For illustration, the discriminator model may be described based on the following layers:

$$h_0 = r_1 \oplus \ldots \oplus r_{pac} \oplus \text{cond}_1 \oplus \ldots \oplus \text{cond}_{pac}$$

$$h_1 = \text{Dropout}(\text{leaky}_{0.2}(\text{FC}_{pac|r|+pac|cond|\to k_0}(h_0)))$$

$$h_2 = \text{Dropout}(\text{leaky}_{0.2}(\text{FC}_{k_0 \to k_0}(h_1)))$$

$$D(\cdot) = \text{FC}_{k_0 \to 14}(h_2)$$

where pac indicates a packing size, $r_{pac}$ indicates a packed input observation vector that is generated by the generator or is a transformed observation vector read from historical data 124, and $\text{leaky}_{0.2}(v)$ indicates application of a leaky ReLU activation on a vector v with a leaky ratio $\gamma=0.2$. A last layer D of the discriminator model outputs a label indicating whether the respective observation vector is real or synthetic. In alternative embodiments, the discriminator model may include a fewer or a greater number of layers of different types and may not use packed vectors as input vectors.

The fifth indicator may further indicate other hyperparameters for the discriminator model, such as $\gamma$, as well as an initial weight vector $w_0$ or a methodology by which the initial weight vector $w_0$ is defined. The training parameters for the discriminator model may be associated with application of gradient descent in updating gradient vectors and weight vectors each iteration, with application of forward and backward propagation, with a loss function, etc.

In an operation 210, a sixth indicator of a noise distribution function may be received. For example, the sixth indicator indicates a name of a noise distribution function. The sixth indicator may be received by data generation training application 122 after selection from a user interface window or after entry by a user into a user interface window. A default value for the noise distribution function may further be stored, for example, in computer-readable medium 108. As an example, a noise function may be selected from "Gaussian", "Uniform", etc. For example, a default noise function may be the Gaussian function. Of course, the noise distribution function may be labeled or selected in a variety of different manners by the user as understood by a person of skill in the art. In an alternative embodiment, the noise distribution function may not be selectable, and a single noise distribution function is implemented in data generation training application 122. For example, the Gaussian function may be used by default or without allowing a selection. With the selection of the noise distribution function, parameters associated with the selected noise function may be provided using the sixth indicator. For example, when Gaussian function is used, a mean and a variance may be provided. In an illustrative embodiment, a Gaussian function with a mean value of zero and a unit value for the variance may be defined and used by default.

In an operation 212, a seventh indicator of a batch size $N_b$ may be received. In an alternative embodiment, the seventh indicator may not be received. For example, a default value may be stored, for example, in computer-readable medium 108 and used automatically. In another alternative embodiment, the value of the batch size $N_b$ may not be selectable. Instead, a fixed, predefined value may be used. For illustration, a default value for the batch size $N_b$ value may be $N_b=4$ though other values may be used.

In an operation 214, an eighth indicator of the packing size pac may be received. In an alternative embodiment, the eighth indicator may not be received. For example, a default value may be stored, for example, in computer-readable medium 108 and used automatically. In another alternative embodiment, the value of the packing size pac may not be selectable. Instead, a fixed, predefined value may be used. For illustration, a default value for the packing size pac may be pac=10 though other values may be used. A ratio value $$q = \frac{n_b}{pac}$$

may be defined.

In an operation 216, a ninth indicator of a convergence threshold value $c_{th}$ may be received. In an alternative embodiment, the ninth indicator may not be received. For example, a default value may be stored, for example, in computer-readable medium 108 and used automatically. In another alternative embodiment, the value of the convergence threshold value $c_{th}$ may not be selectable. Instead, a fixed, predefined value may be used. For illustration, a default value of the convergence threshold value $c_{th}$ may be 0.01 though other values may be used.

In an operation 218, a tenth indicator of a maximum number of iterations $I_{max}$ may be received. In an alternative embodiment, the tenth indicator may not be received. For example, a default value may be stored, for example, in computer-readable medium 108 and used automatically. In another alternative embodiment, the value of the maximum number of iterations $I_{max}$ may not be selectable. Instead, a fixed, predefined value may be used. For illustration, a default value of the maximum number of iterations $I_{max}$ may be 100 though other values may be used.

In an operation 219, an iteration counter I is initialized, for example, as I=1.

In an operation 220, the AE model indicated in operation 204 is initialized. For example, an encoder parameter $\Phi_{enc}$ and a decoder parameter $\Phi_{dec}$ are initialized, the weights of each node are initialized randomly, etc.

In an operation 222, a mode vector $\beta_{i,j}$ and a probability density value $\alpha_{i,j}$ are computed from the observation vectors included in historical data 124 for each continuous variable of each observation vector included in historical data 124. Each mode vector includes a value for each mode, where $m_i = N_m$, i=1, . . . , $N_c$ where $N_m$ is a predefined number of modes and a number of entries in each mode vector. One of the values of the mode vector indicates the mode that is selected for the respective observation vector for the respective continuous variable. For continuous variables, a variational Gaussian mixture model is used to compute a probability density $\rho_k = \mu_k \mathcal{N}(c_{i,j}; \eta_k, \phi_k)$, k=1, . . . , $m_i$ for each mode k, where $\rho_k$ is a $k^{th}$ probability density value, $\mu_k$ is a mean value computed for the $k^{th}$ mode, $\eta_k$ is a mode value computed for the $k^{th}$ mode, $\phi_k$ is a standard deviation value computed for the $k^{th}$ mode, and $c_{i,j}$ indicates an $i^{th}$ continuous variable value for a $j^{th}$ observation vector included in historical data 124. For each $i^{th}$ continuous variable value of each $j^{th}$ observation vector, $c_{i,j}$, the probability of that value coming from each mode $m_i$ is $\rho_k = \mu_k \mathcal{N}(c_{i,j}; \eta_k, \phi_k)$, k=1, . . . , $m_i$.

A random sample is made to select a mode $s_m$ for $c_{i,j}$ based on a comparison between the probability values $\rho_k$, k=1, . . . , $m_i$. For example, a random value between zero and one is drawn from a uniform random distribution function that is compared to the ranges defined by [0, $\rho_1$], [$\rho_1$, $\rho_1 + \rho_2$], . . . , $\rho_{m_i-1}$, $\rho_{m_i-1} + \rho_{m_i}$]. The mode $s_m$ is a numerical index to the range within which the drawn random value falls. Once the mode $s_m$ is selected, a one-hot vector $\beta_{i,j}$ is defined for the $i^{th}$ continuous variable value of the $j^{th}$ observation vector to indicate the mode selected such that $\beta_{i,j}$ has zero values except for a one value to indicate the selected mode. For example, if there are three modes and the second mode was selected $s_m = 2$ because the drawn random value was in the range [$\rho_1$, $\rho_1 + \rho_2$], $\beta_{i,j} = [0,1,0]$. A probability density value $\alpha_{i,j}$ is also computed for the $i^{th}$ continuous variable value of the $j^{th}$ observation vector using $$a_{i,j} = \frac{c_{i,j} - \eta_{s_m}}{4\phi_{s_m}}.$$

The mode value $\beta_{i,j}$ and its associated probability density value $\alpha_{i,j}$ are used to represent a transformed observation vector $x_j$ so that each observation vector $x_j$ can be normalized, where each $x_j$, j=1, . . . , N is defined from an observation vector read from historical data 124. For example, the mode and its probability density can be computed for each continuous variable as described in section 4.2 of a paper by Lei Xu et al. titled *Modeling Tabular Data using Conditional GAN* published Oct. 28, 2019 for the 33rd Conference on Neural Information Processing Systems (NeurIPS 2019) also referred to herein as the CT-GAN paper.

In an operation 224, a probability mass function $PMF_i$, i=1, . . . , $N_d$ is computed from the observation vectors included in historical data 124 for each discrete variable of each observation vector included in historical data 124 such that the probability mass of each value is a logarithm of its frequency for a respective discrete variable.

In an operation 226, each observation vector included in historical data 124 is transformed. For example, $r_j = T(x_j)$, j=1, . . . , N, where T indicates the transformation that indicates that each continuous variable value is replaced with its respective mode value $\beta_{i,j}$, i=1, . . . , $N_c$, j=1, . . . , N and probability density value $\alpha_{i,j}$, i=1, . . . , $N_c$, j=1, . . . , N and that each discrete variable value is replaced with its respective one-hot vector representation vector $d_{i,j}$, i=1, . . . , $N_d$, j=1, . . . , N so that $r_j = \alpha_{1,j} \oplus \beta_{1,j} \oplus \ldots \oplus \alpha_{N_c,j} \oplus \beta_{N_c,j} \oplus d_{1,j} \oplus \ldots \oplus d_{N_d,j}$, j=1, . . . , N.

In an operation 228, the initialized AE model is trained with the transformed observation vectors $r_j = \alpha_{1,j} \oplus \beta_{1,j} \oplus \ldots \oplus \alpha_{N_c,j} \oplus \beta_{N_c,j} \oplus d_{1,j} \oplus \ldots \oplus d_{N_d,j}$, j=1, . . . , N as an input. The AE is optimized, for example, by minimizing the BCE loss function:

$$BCE_{loss} = -\frac{1}{N}\sum_{i=1}^{N} r_i \log o_i + (1 - r_i)\log(1 - o_i).$$

In an operation 230, the generator model indicated in operation 206 is initialized. For example, a generator parameter $\Phi_G$ is initialized, and the weights of each node are initialized randomly.

In an operation 232, the discriminator model indicated in operation 208 is initialized, and processing continues with an operation 234 shown referring to FIG. 2B. For example, a discriminator parameter $\Phi_D$ is initialized, the weights of each node are initialized randomly, and parameters for each layer are initialized.

In operation 234, a batch size $N_b$ number of conditional vectors cond are defined, for example, as described in Training-by-sampling of section 4.3 of the CT-GAN paper. Each conditional vector $cond_j$, j=1, . . . , $N_b$ is a vector of length defined by $N_d$, the number of the one or more discrete variables. For example, to define each conditional vector $cond_j$, $N_d$ zero-filled mask vectors $M_i = [M_i^{(k)}]_{k=1, \ldots, |D_i|}$, i=1, . . . , $N_d$ are defined. A variable index value i* between one and $N_d$ is randomly selected with equal probability of selecting each value between one and $N_d$. A variable value k* between one and $|D_i|$ is randomly selected using the probability mass function computed for the $i^{*th}$ discrete variable $k^* = PMF_{i^*}$. The $k^{*th}$ component of $M_{i^*}$ is set to one, or $M_{i^*}^{(k^*)} = 1$. The conditional vector is defined using $cond_j = M_1 \oplus \ldots \oplus M_{N_d}$. The process is repeated to define each conditional vector $cond_j$ in the batch of conditional vectors cond.

In an operation 236, the noise distribution function indicated in operation 210 is sampled to generate a batch size $N_b$ number of latent observation vectors z. A batch of latent observation vectors is generated by sampling the noise distribution function the batch size $N_b$ number of times so that the batch of latent observation vectors includes the batch size $N_b$ number of observation vectors. Each latent observation vector $z_j$, j=1, . . . , $N_b$ is a vector of length defined by $N_v$, the number of the plurality of variables that includes the continuous and discrete variables. A target variable value such as $y_j=0$, $j=1, \ldots, N_b$ may be defined to indicate that each respective latent observation vector $z_j$ is a fake observation vector.

In an operation 238, the batch of latent observation vectors $z_j, j=1, \ldots, N_b$ and the batch of conditional vectors $cond_j, j=1, \ldots, N_b$ are input to the generator model indicated in operation 206 to compute g=G(z, cond), where G( ) indicates execution of the generator model with the indicated vectors to define g.

In an operation 239, the output of the generator model, g, is input to the decoder model of the trained autoencoder to define $\hat{\alpha}$ and $\hat{\beta}$ for each continuous variable and $\hat{d}$ for each discrete variable. For example, the output of the decoder model is $\hat{r}_j = \hat{\alpha}_{1,j} \oplus \hat{\beta}_{1,j} \oplus \ldots \oplus \hat{\alpha}_{N_c,j} \oplus \hat{\beta}_{N_c,j} \oplus \hat{d}_{1,j} \oplus \ldots \oplus \hat{d}_{N_d,j}$, $j=1, \ldots, N_b$.

In an operation 240, packed conditional vectors may be defined. For example, $cond_k^{(pac)} = cond_{k \times pac+1} \oplus \ldots \oplus cond_{k \times pac+pac}$, $k=1, \ldots, q$ as described in a paper by Zinan Lin, Ashish Khetan, Giulia Fanti, and Sewoong Oh titled *Pacgan: The power of two samples in generative adversarial networks* and published in In Advances in Neural Information Processing Systems, 2018 also referred to herein as the PacGAN paper and as described in Algorithm 1 of the CT-GAN paper.

In an operation 242, packed fake observations $\hat{r}_k^{(pac)}$ may be defined. For example, $\hat{r}_k^{(pac)} = \hat{r}_{k \times pac+1} \oplus \ldots \oplus \hat{r}_{k \times pac+pac}$, $k=1, \ldots, q$ as described in Algorithm 1 of the CT-GAN paper.

In an operation 244, a batch size $N_b$ number of observation vectors are selected from the transformed representation of each observation vector defined in operations 222 and 224 with replacement to define $r_j = \text{Uniform}(T(x_j)|cond_j)$, $j=1, \ldots, N_b$, where Uniform indicates a uniform random distribution function, T indicates the transformation of operations 222 and 224, $x_j$ is an observation vector selected from historical data 124, $(T(x_j)|cond_j)$ indicates a transformed observation vector selected given each respective conditional vector $cond_j$ so that the transformed observation vectors are sampled according to a log-frequency of each category and so all discrete values are explored evenly. The $cond_j = M_1 \oplus \ldots \oplus M_{N_d}$ has a one in a single position of the vector that is associated with a specific value for one of the discrete variables. An observation vector having the specific value indicated by $cond_j$ is selected from $T(x_j)$. For example, a row having the selected discrete variable value $k^*$ for the selected variable index value $i^*$ is randomly selected from all of the rows that have the selected discrete variable value $k^*$ for the selected variable index value $i^*$ using a uniform random distribution. A target variable value such as $y_j=1$, $j=1, \ldots, N_b$ may be defined to indicate that each respective real observation vector $r_j$ is a real observation vector.

In an operation 248, packed real observations $r_k^{(pac)}$ may be defined. For example, $r_k^{(pac)} = r_{k \times pac+1} \oplus \ldots \oplus r_{k \times pac+pac}$, $k=1, \ldots, q$ as described in Algorithm 1 of the CT-GAN paper.

In an operation 250, a discriminator loss value $L_D$ is computed by executing the discriminator model with the packed real observations $r_k^{(pac)}$, the packed fake observations $\hat{r}_k^{(pac)}$, and the packed conditional vectors $cond_k^{(pac)}$. For example, as described in Algorithm 1 of the CT-GAN paper, where D( ) indicates execution of the discriminator model with the indicated vectors as input to predict whether each observation vector is real or fake.

In an operation 252, weight values are sampled from a uniform distribution function with values between zero and one. For example, q weight values are defined by sampling using $\rho_k = \text{Uniform}(0,1)$, $k=1, \ldots, q$.

In an operation 254, weighted observation vectors are computed using the sampled weight values as described in Algorithm 1 of the CT-GAN paper. For example, $\tilde{r}_k^{(pac)} = \rho_k \hat{r}_k^{(pac)} + (1-\rho_k) r_k^{(pac)}$, $k=1, \ldots, q$.

In an operation 256, a gradient penalty loss value is computed. For example, $$L_{GP} = \frac{1}{q} \sum_{k=1}^{q} \left( \left\| \nabla_{\tilde{r}_k^{(pac)}} D(\tilde{r}_k^{(pac)}, cond_k^{(pac)}) \right\|_2 - 1 \right)^2$$

as described in Algorithm 1 of the CT-GAN paper, where $\nabla$ indicates a gradient computed using backpropagation of the discriminator model with the indicated vectors as input, and $\| \|_2$ indicates an L2 norm computation.

In an operation 258, the discriminator model indicated in operation 208 is updated using the discriminator and gradient penalty loss values to compute new weight values for each node. For example, $\Phi_D = \Phi_D - 0.0002 \times \text{Adam}(\nabla_{\Phi_D}(L_D + 10 L_{GP}))$, where Adam indicates use of the Adam optimization algorithm with the discriminator gradients $\nabla_{\Phi_D}$ to compute updated weights for each node included in the discriminator model, and 0.0002 indicates a value of a learning rate. Other optimization algorithms, such as stochastic gradient descent (SGD) and other extensions of SGD, other loss values, and other values for the learning rate may be used to update the discriminator model.

Similar to operation 234, in an operation 260, a batch size $N_b$ number of conditional vectors cond are defined for a next batch.

Similar to operation 236, in an operation 262, the noise distribution function indicated in operation 210 is sampled to generate a next batch of latent observation vectors z.

Similar to operation 238, in an operation 264, the batch of latent observation vectors $z_j, j=1, \ldots, N_b$ and the batch of conditional vectors $cond_j$, $j=1, \ldots, N_b$ are input to the generator model indicated in operation 206 to compute g=G(z, cond), where G( ) indicates execution of the generator model with the indicated vectors to define g.

Similar to operation 239, in an operation 266, the output of the generator model, g, is input to the decoder model of the trained autoencoder to define $\hat{\alpha}$ and $\hat{\beta}$ for each continuous variable and $\hat{d}$ for each discrete variable, and processing continues in operation 270 shown referring to FIG. 2C. For example, the output of the decoder model is $\hat{r}_j = \hat{\alpha}_{1,j} \oplus \hat{\beta}_{1,j} \oplus \ldots \oplus \hat{\alpha}_{N_c,j} \oplus \hat{\beta}_{N_c,j} \oplus \hat{d}_{1,j} \oplus \ldots \oplus \hat{d}_{N_d,j}$, $j=1, \ldots, N_b$.

Similar to operation 240, in an operation 270, packed conditional vectors $cond_k^{(pac)}$ are defined.

Similar to operation 242, in an operation 272, packed fake observations $\hat{r}_k^{(pac)}$ are defined from the output of operation 266.

In an operation 274, a generator loss value is computed. For example, $$L_D = \frac{1}{q} \sum_{k=1}^{q} D(\hat{r}_k^{(pac)}, cond_k^{(pac)}) - \frac{pac}{n_b} \sum_{k=1}^{q} D(r_k^{(pac)}, cond_k^{(pac)})$$

$$L_G = \frac{1}{q} \sum_{k=1}^{q} D(\hat{r}_k^{(pac)}, cond_k^{(pac)}) - \frac{1}{N_b} \sum_{j=1}^{N_b} CrossEntropy(\hat{d}_{i^*,j}, M_i*)$$

as described in section 4.3 and in Algorithm 1 of the CT-GAN paper, where CrossEntropy indicates a cross entropy computation, $\hat{d}_{i*,j}$ is the $i*^{\iota th}$ discrete variable value selected from $d_{1,j} \oplus \ldots \oplus d_{N_d,j}$ defined in operation 266 for the $j^{th}$ conditional vector of the batch, and $M_{i*}$ is the $i*^{\iota th}$ mask selected from $M_1 \oplus \ldots \oplus M_{N_d}$ defined in operation 260. The second term is added so that the generator model and decoder model make $\hat{d}_{i*,j} = M_{i*}$ so that the generated one-hot encoding vector is equal to the $i*^{\iota th}$ mask. The cross entropy is a difference measured between the generated one-hot encoded vector and the selected one-hot encoded conditional mask vector.

In an operation 276, the generator model indicated in operation 206 is updated using the generator loss value to compute new weight values for each node. For example, $\Phi_G = \Phi_G - 0.0002 \times \text{Adam}(\nabla_{\Phi_G} L_G)$ as described in Algorithm 1 of the CT-GAN paper though other optimization algorithms, other loss values, other values for the learning rate, etc. may be used to update the generator model.

In an operation 278, a convergence value c is computed. For example, the convergence parameter value c may be computed using $c = L_D + 10 L_{GP} + L_G$.

In an operation 280, a determination is made concerning whether convergence has been achieved or the maximum number of iterations have been performed. If $c \leq c_{th}$ or $I \geq I_{max}$, processing continues in an operation 284. If $c > c_{th}$ and $I < I_{max}$, processing continues in an operation 282.

In operation 282, the iteration counter I is incremented, for example, as I=I+1, and processing continues in operation 234.

In operation 284, the trained generator model with the decoder model of the trained AE model and/or the trained discriminator model may be output. For example, the updated generator model from operation 276 with the decoder model of the trained AE model may be output to generator model description 126. For example, the updated discriminator model from operation 258 may be output to generator model description 126 or another computer storage location. For illustration, the trained generator model with the decoder model of the trained AE model may be stored using the ASTORE procedure provided by SAS® Visual Data Mining and Machine Learning software. For illustration, the trained discriminator model from operation 258 may further be stored using the ASTORE procedure provided by SAS® Visual Data Mining and Machine Learning software and used to predict whether input observations are real or fake.

The synthetic observations may be output to synthetic historical data 128. Because one-hot encoded values were computed for the continuous and discrete variables, the encoding process is reversed to transform the $\hat{r}_j$ defined in operation 266 back to an original space defined by the observation vectors included in historical data 124. For example, each $\hat{r}_j = \hat{\alpha}_{1,j} \oplus \hat{\beta}_{1,j} \oplus \ldots \oplus \hat{\alpha}_{N_c,j} \oplus \hat{\beta}_{N_c,j} \oplus \hat{d}_{1,j} \oplus \ldots \oplus \hat{d}_{N_d,j}$, j=1, ..., $N_b$ is transformed to define values for each continuous variable i=1, ..., $N_c$ and each discrete variable n=1, ..., $N_d$. For each continuous variable, mode k is defined based on an index to the value that is non-zero in $\hat{\beta}_{i,j}$, i=1, ..., $N_c$ and used to compute the continuous value as $c_{i,j} = 4\phi_k \hat{\alpha}_{i,j} + \eta_k$. For each discrete variable, the one-hot vector representation $\hat{d}_{1,j}$ is used to define the discrete value, for example, using a lookup table. For example, based on the illustration above for a discrete variable value that includes one of three possible color values, red, green, blue, in the associated discrete variable column, $\hat{d}_{1,j} = [1,0,0]$ is transformed to the discrete value "red", $\hat{d}_{1,j} = [0,1,0]$ is transformed to the discrete value "green", and $\hat{d}_{1,j} = [0,0,1]$ is transformed to the discrete value "blue". The transformed synthetic observations may be output to synthetic historical data 128.

To generate synthetic observations from the stored generator model, an indicator of the noise distribution function indicated in operation 210 and $\eta_{k,i}$, k=1, ..., $N_m$, i=1, ..., $N_c$ and $\phi_{k,i}$, k=1, ..., $N_m$, i=1, ..., $N_c$ may be output, for example, to generator model description 126. The $PMF_i$, i=1, ..., $N_d$ may further be output, for example, to generator model description 126. The lookup table for discrete values for each discrete variable may further be output, for example, to generator model description 126.

Figure 3A:
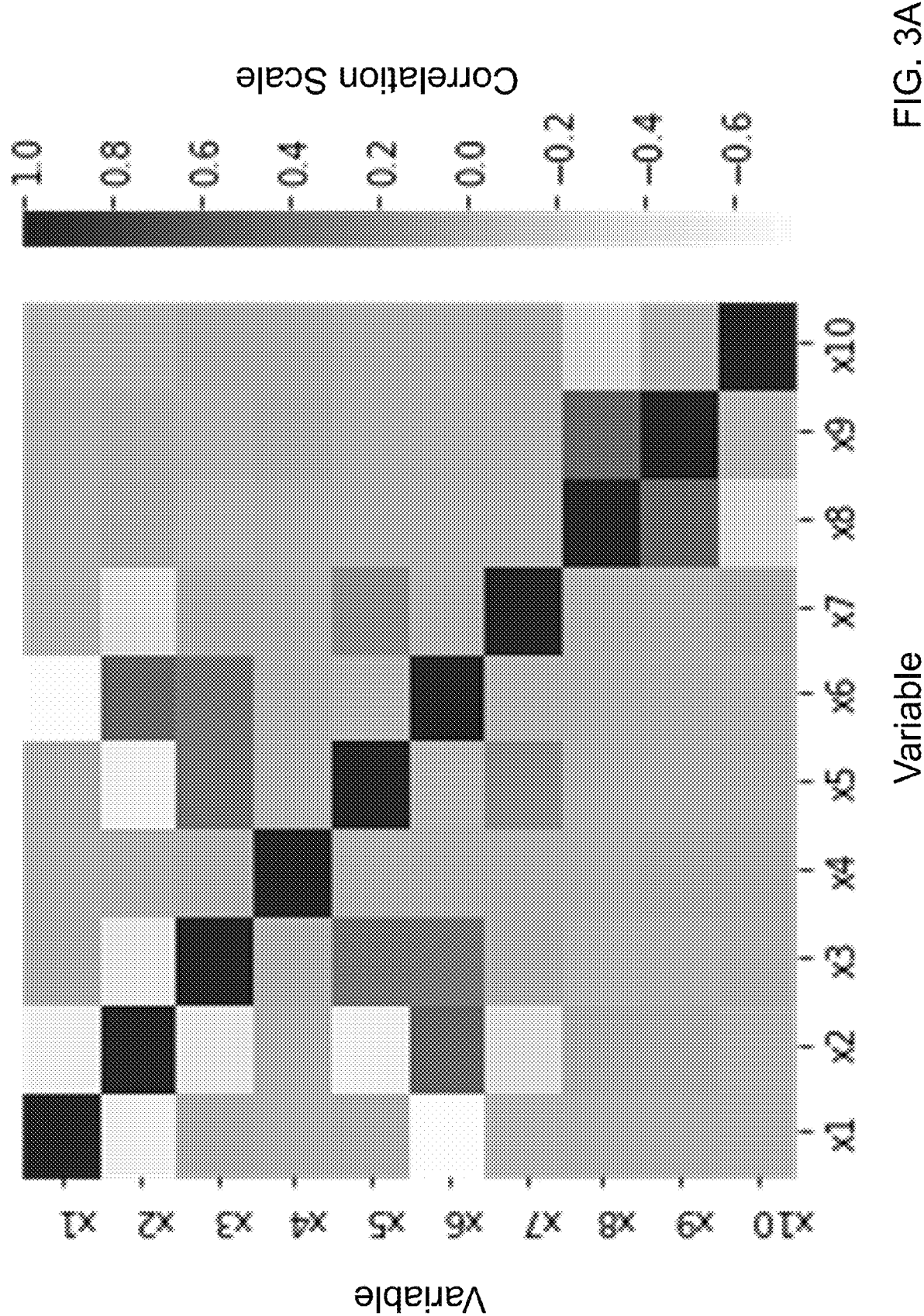
FIGS. 3A to 3E show heatmaps of illustrative correlation results between pairs of variables using different data generation methods in accordance with an illustrative embodiment.
Figure 3B:
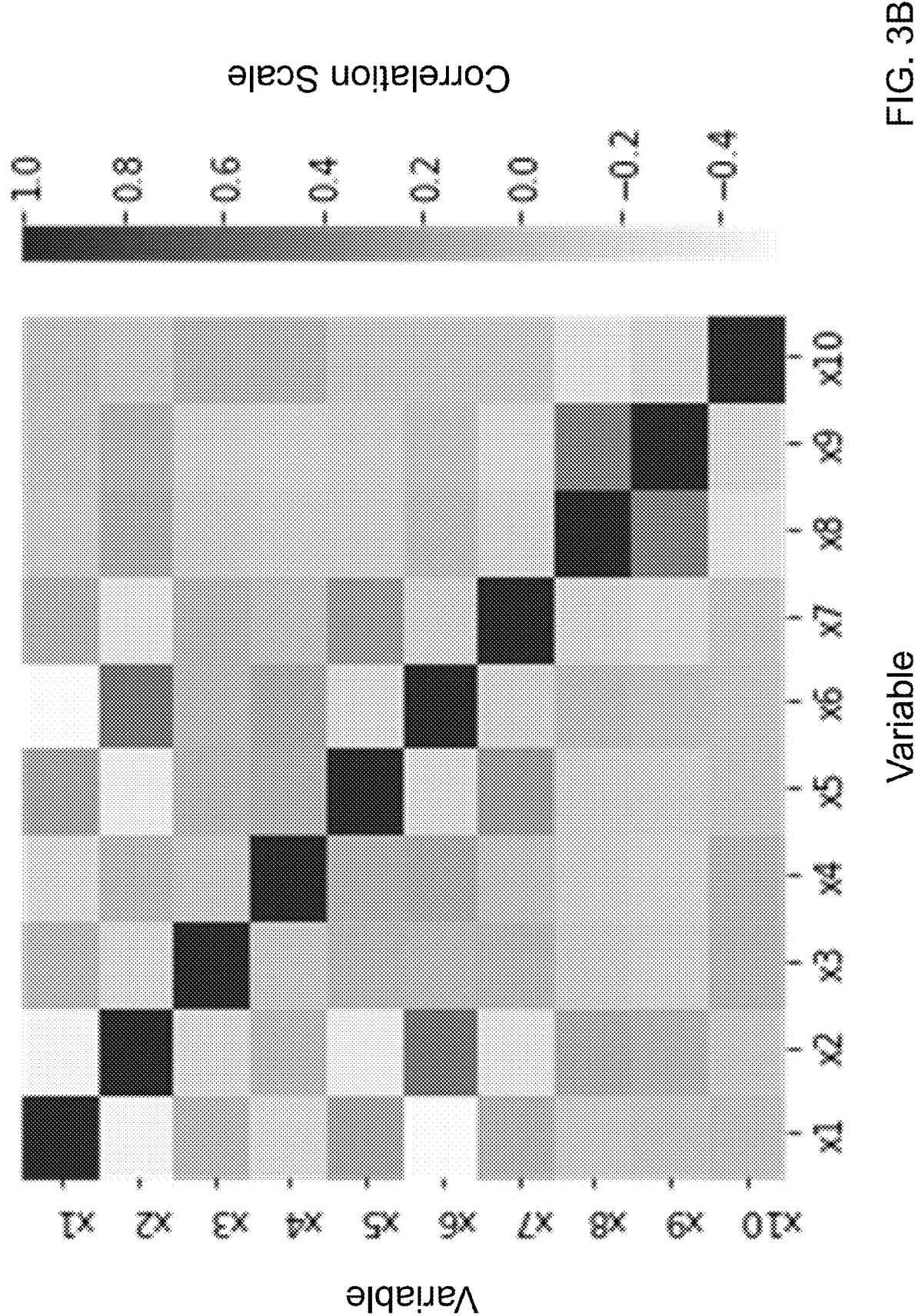
Figure 3C:
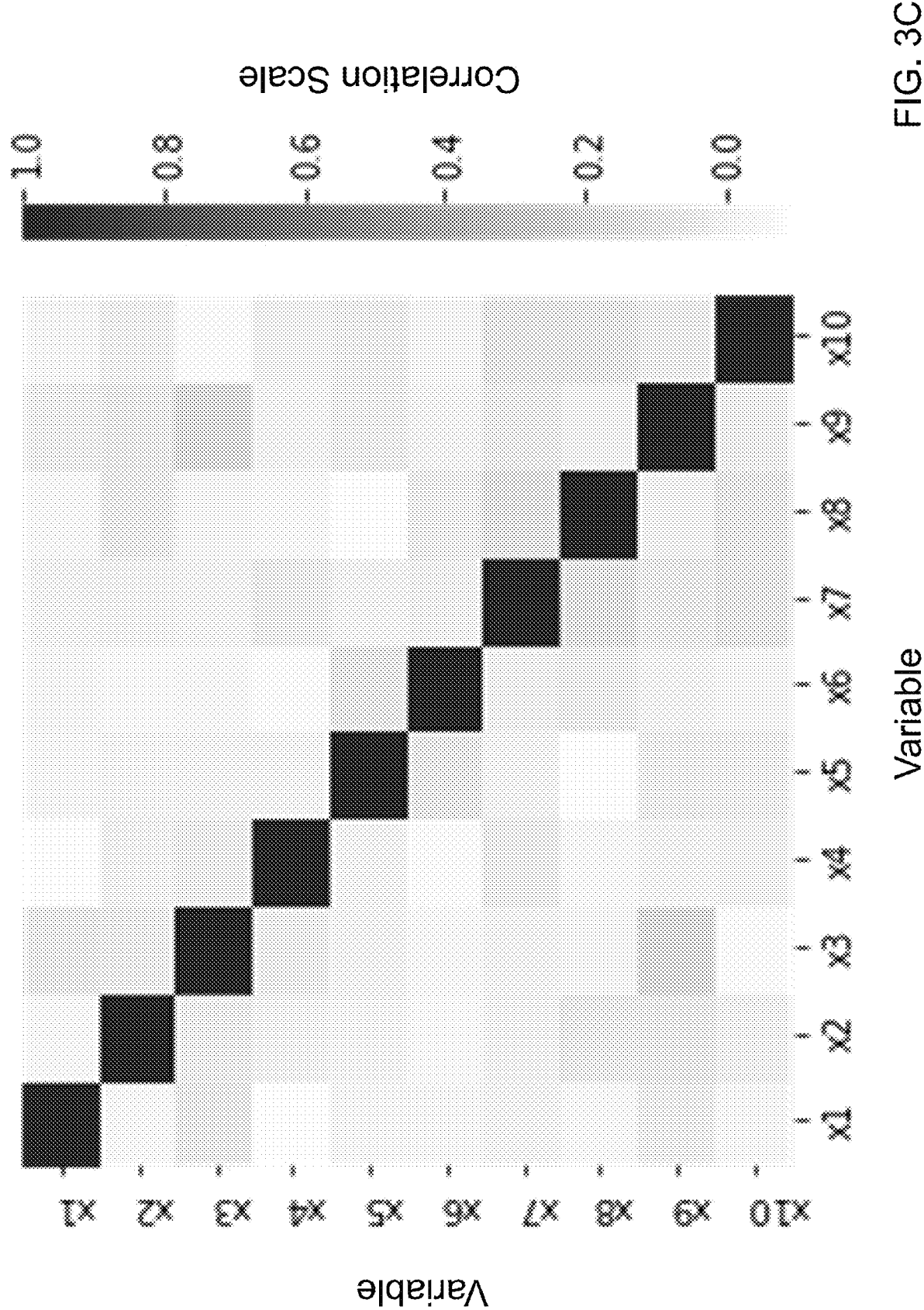

A performance of data generation training application 122 was compared to an existing method CTGAN described in the CT-GAN paper. A simulated dataset was generated with ten numeric variables that were correlated and 10,000 observation vectors. A correlation matrix was defined for the ten variables. The correlation matrix was decomposed with a Cholesky decomposition. The datasets were generated by multiplying the Cholesky component by a random number. Referring to FIG. 3A, a heatmap of the correlation matrix that resulted from the generated dataset is shown. Referring to FIG. 3B, a heatmap of the synthetic data generated using data generation training application 122 is shown. Referring to FIG. 3C, a heatmap of the synthetic data generated using CTGAN is shown. Data generation training application 122 generated synthetic data that preserved the pairwise correlations between the 10 variables. In contrast, CTGAN failed to capture any pairwise correlation in the synthetic data.

Figure 3D:
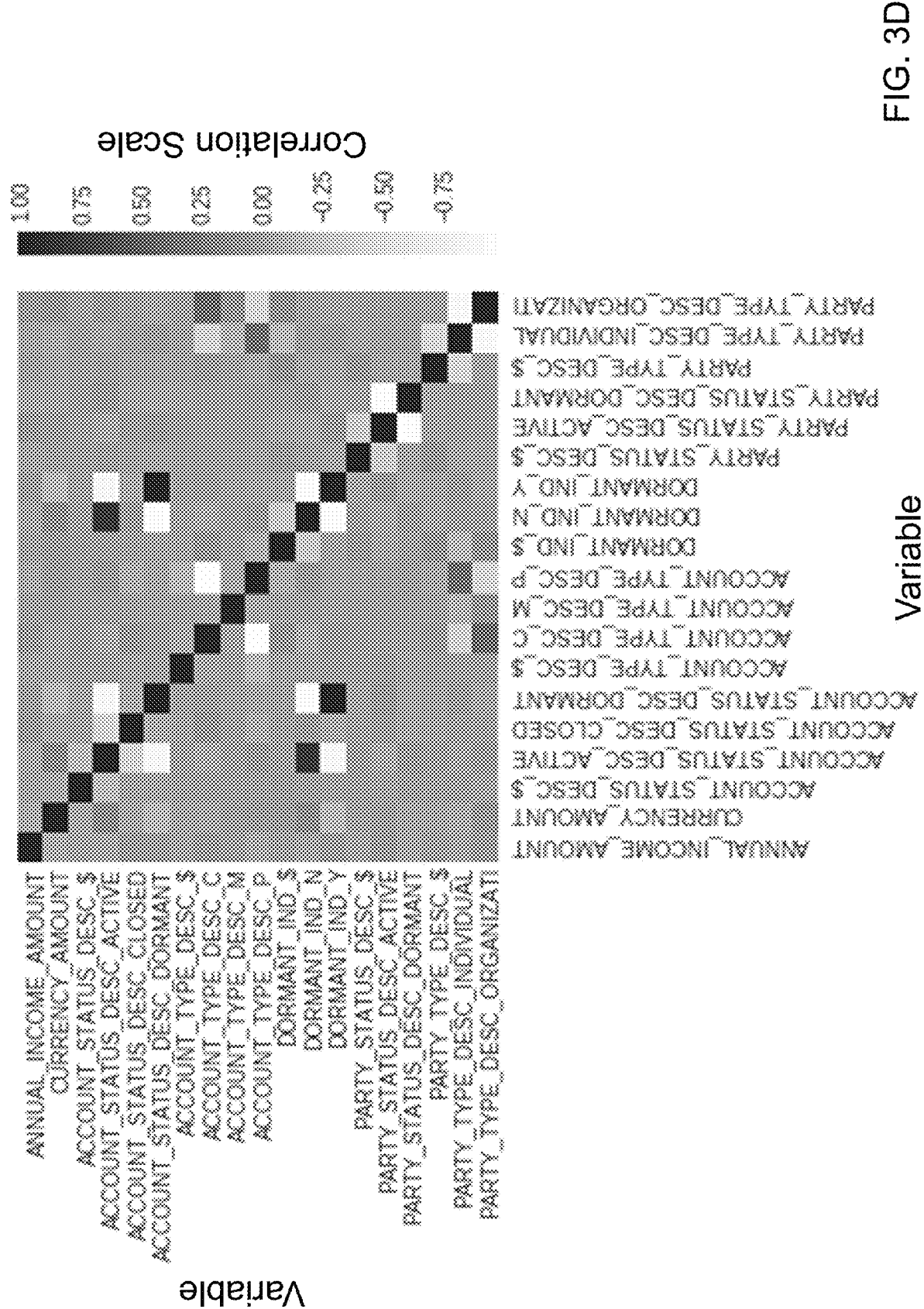
Figure 3E:
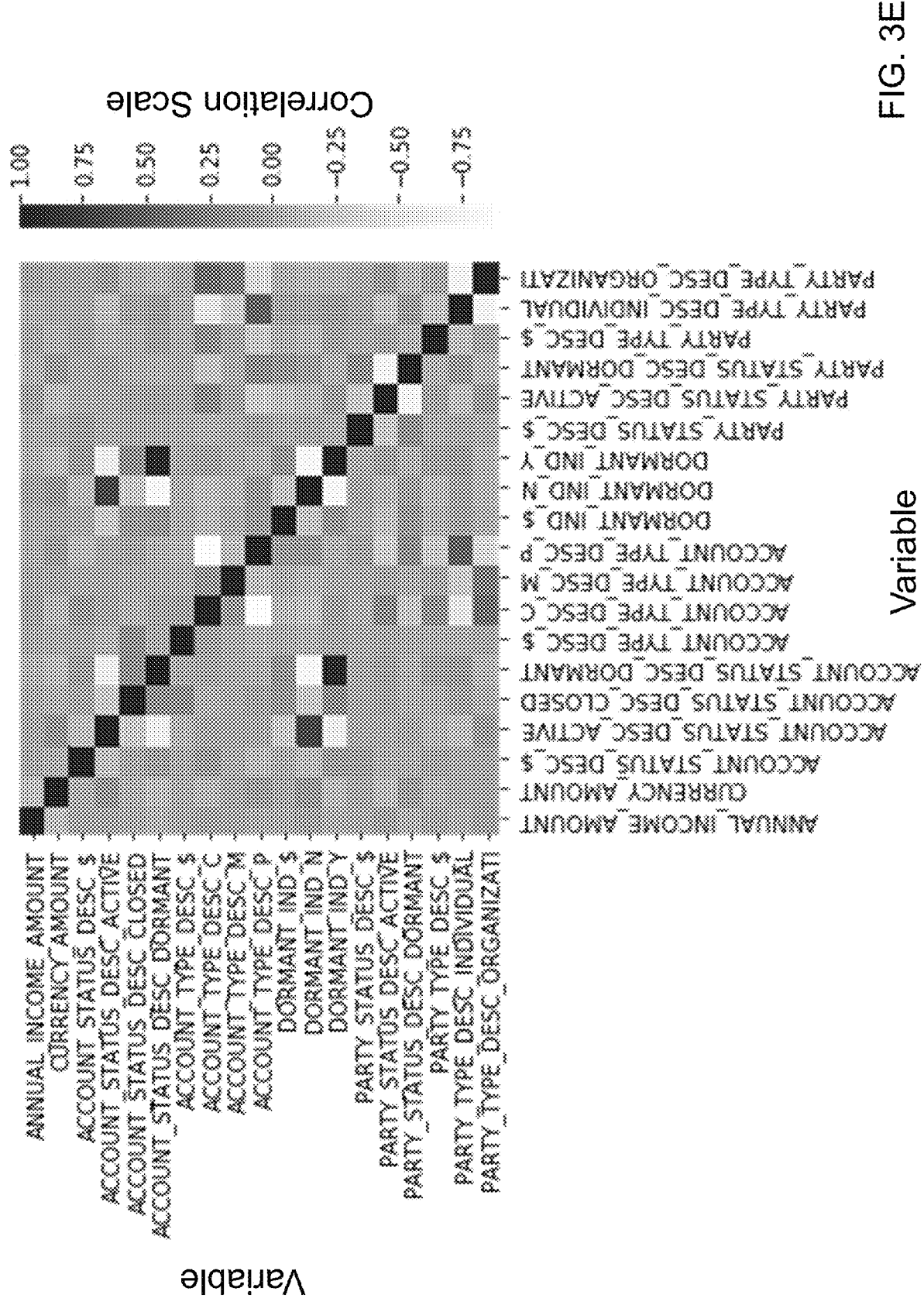

Referring to FIG. 3D, a heatmap of the correlation matrix that resulted from the dataset is shown. Referring to FIG. 3E, a heatmap of the synthetic data generated using data generation training application 122 is shown. Data generation training application 122 generated synthetic data that preserved the pairwise correlations between the 19 variables. In contrast, CTGAN failed to capture any pairwise correlation in the synthetic data.

The efficacy associated with using the synthetic data generated by data generation training application 122 and CTGAN as training data for machine learning was also evaluated. An adaboost classifier from the sklearn toolkit was used. Table 1 below captures the comparative results.

TABLE 1

| | Precision(0) accuracy | Precision(1) accuracy | Recall(0) accuracy | Recall(1) accuracy | 1-Euclidean |
|---|---|---|---|---|---|
| CTGAN | 0.97 | 0.91 | 0.97 | 0.92 | 0.95668 |
| Data generation training application 122 | 0.99 | 0.94 | 0.98 | 0.96 | 0.99999 |

The precision and recall accuracy for events as 0 or 1 was used to evaluate the classification performance. The 1-Euclidean was used to measure a proximity between the synthetic and the real data. Data generation training application 122 and the existing method CTGAN perform similarly.

When historical data 124 does not include a target variable, an unsupervised evaluation framework can be applied using kernel density estimation and calculation of a log-likelihood value. A quality of the synthetic data can be evaluated using a likelihood ratio test performed by comparing a fit of synthetic historical data 128 to historical data 124. Kernel density estimation is a non-parametric estimator of density. The kernel is a smooth function that specifies a shape of a distribution placed at each point, and a kernel bandwidth controls a size of the kernel at each point. Many different kernels may be used for kernel density estimation. The kernel density estimation fits the data by maximizing the likelihood.

The kernel density estimator may be defined using $$\hat{f}_K(x) = \underset{p}{\mathrm{argmax}} L_x(p).$$

The log-likelihood function of $f$ is $L(f)=\Sigma_{i=1}^N \log f(X_i) - N (\int f(u)du - 1)$. The local log-likelihood at target value x is $$L(f) = \sum_{i=1}^N K\left(\frac{x-X_i}{h}\right) \log f(X_x) - N \int K\left(\frac{x-u}{h}\right) f(u) du,$$

where K indicates the kernel function, and h indicates a kernel parameter value defined for the kernel function. A test statistic is $$LR = -2 \ln\left(\frac{L(m_1)}{L_{m_2}}\right) = 2(\log lik(m_2) - \log lik(m_1)),$$

where log lik indicates the log-likelihood computation. The likelihoods are calculated using the likelihood ratio test, which uses a chi-square test to reject a null hypothesis of the two distributions.

Figure 4:
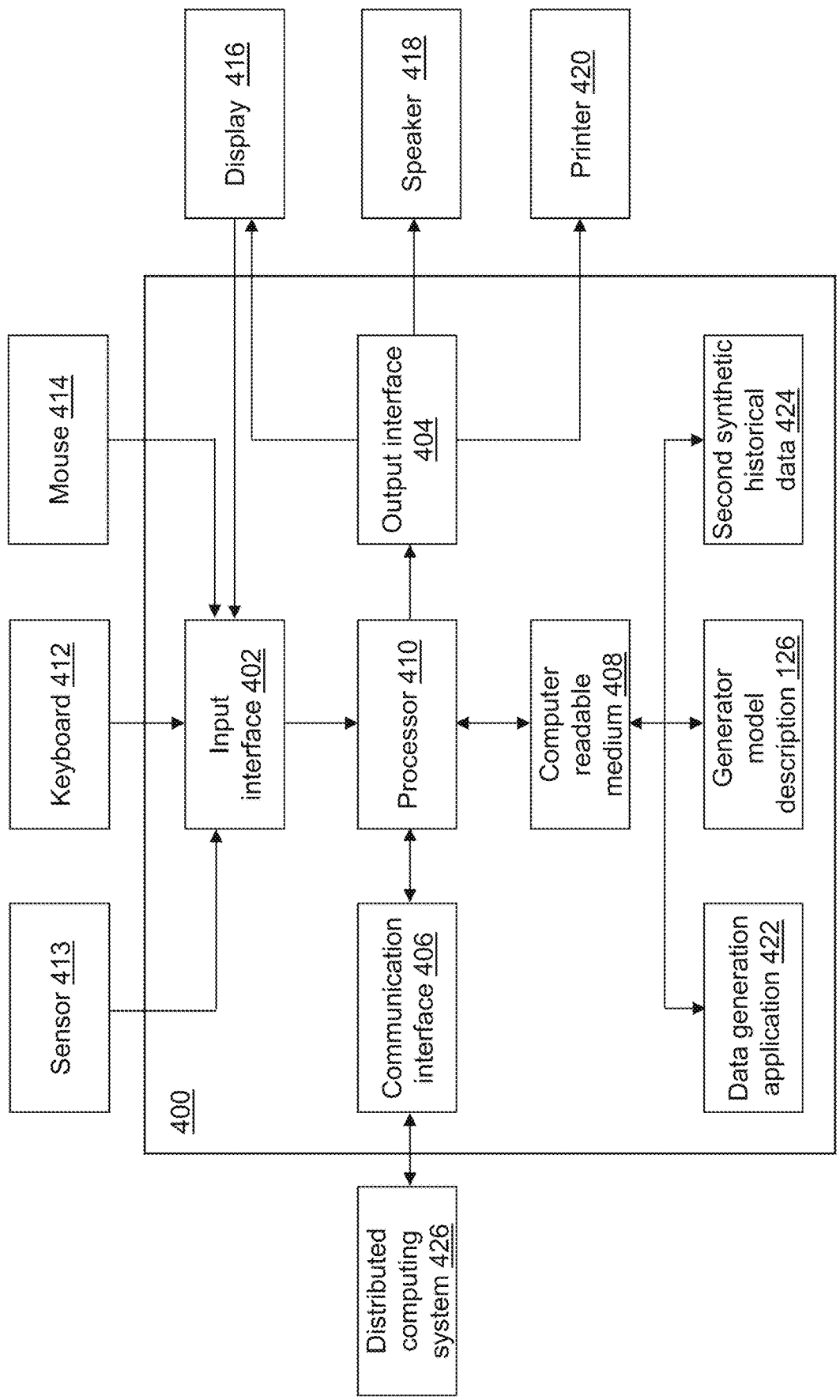
FIG. 4 depicts a block diagram of a data generation device in accordance with an illustrative embodiment.

Referring to FIG. 4, a block diagram of a data generation device 400 is shown in accordance with an illustrative embodiment. Data generation device 400 may include a second input interface 402, a second output interface 404, a second communication interface 406, a second non-transitory computer-readable medium 408, a second processor 410, a data generation application 422, second synthetic historical data 424, and generator model description 126. Fewer, different, and/or additional components may be incorporated into data generation device 400. Data generation device 400 and data generation training device 100 may be the same or different devices.

Second input interface 402 provides the same or similar functionality as that described with reference to input interface 102 of data generation training device 100 though referring to data generation device 400. Second output interface 404 provides the same or similar functionality as that described with reference to output interface 104 of data generation training device 100 though referring to data generation device 400. Second communication interface 406 provides the same or similar functionality as that described with reference to communication interface 106 of data generation training device 100 though referring to data generation device 400. Data and messages may be transferred between data generation device 400 and a distributed computing system 426 using second communication interface 406. Distributed computing system 132 and distributed computing system 426 may be the same or different computing systems. Second computer-readable medium 408 provides the same or similar functionality as that described with reference to computer-readable medium 108 of data generation training device 100 though referring to data generation device 400. Second processor 410 provides the same or similar functionality as that described with reference to processor 110 of data generation training device 100 though referring to data generation device 400.

Data generation application 422 performs operations associated with generating data stored in second synthetic historical data 424 using the decoder model description and the generator model description stored in generator model description 126. Some or all of the operations described herein may be embodied in data generation application 422. The operations may be implemented using hardware, firmware, software, or any combination of these methods.

Referring to the example embodiment of FIG. 4, data generation application 422 is implemented in software (comprised of computer-readable and/or computer-executable instructions) stored in second computer-readable medium 408 and accessible by second processor 410 for execution of the instructions that embody the operations of data generation application 422. Data generation application 422 may be written using one or more programming languages, assembly languages, scripting languages, etc. Similar to data generation training application 122, data generation application 422 may be integrated with other analytic tools. Data generation application 422 and data generation training application 122 may be the same or different applications that are integrated in various manners to generate synthetic data for use in training a machine learning model. Data generation application 422 may be implemented as a Web application.

Figure 5:
FIG. 5 depicts a flow diagram illustrating examples of operations performed by a data generation application of the data generation device of FIG. 4 in accordance with an illustrative embodiment.

Referring to FIG. 5, example operations of data generation application 422 are described to generate new tabular data. Additional, fewer, or different operations may be performed depending on the embodiment of data generation application 422. The order of presentation of the operations of FIG. 5 is not intended to be limiting. Although some of the operational flows are presented in sequence, the various operations may be performed in various repetitions, concurrently (in parallel, for example, using threads and/or distributed computing system 426), and/or in other orders than those that are illustrated.

In an operation 500, an eleventh indicator may be received that indicates generator model description 126. For example, the eleventh indicator indicates a location and a name of generator model description 126. As an example, the eleventh indicator may be received by data generation application 422 after selection from a user interface window or after entry by a user into a user interface window. In an alternative embodiment, generator model description 126 may not be selectable. For example, a most recently created model configuration data may be used automatically. As another example, generator model description 126 may be provided automatically as part of integration with data generation training application 122.

In an operation 502, a generator-decoder model description may be read from generator model description 126 that includes the decoder model of the trained AE model and the noise distribution function. In an alternative embodiment, the noise distribution function and/or the decoder model of the trained AE model may be read from a different file or otherwise provided to data generation application 422.

In an operation 504, a generator-decoder model is instantiated with the generator-decoder model description. For example, the architecture of the generator model and the decoder model, the hyperparameters, the weight vector, and other characterizing elements are read and used to instantiate the generator-decoder model based on the information output from the training process in operation 284.

Similar to operation 234, in an operation 505, a conditional vector cond is defined. For example, $N_d$ zero-filled mask vectors $M_i=[M_i^{(k)}]_{k=1,\ldots,|D_i|}$, $i=1,\ldots,N_d$ are defined. A variable index value i* between one and $N_d$ is randomly selected with equal probability of selecting each value between one and $N_d$. A variable value k* between one and $|D_i|$ is randomly selected using $PMF_{i*}$ for the i*$^{th}$ discrete variable that may be read from generator model description 126. The k*$^{th}$ component of $M_{i*}$ is set to one, or $M_{i*}^{(k*)}=1$. The conditional vector is defined using $cond_j=M_1 \oplus \ldots \oplus M_{N_d}$. In an alternative embodiment, $PMF_i$, $i=1,\ldots,N_d$ may be read from a different file or otherwise provided to data generation application 422 or otherwise provided to data generation application 422.

In an operation 506, a latent observation vector is generated by sampling from the noise distribution function.

In an operation 508, the latent observation vector and the conditional vector are input to the instantiated generator-decoder model to generate an output observation vector.

In an operation 509, the output observation vector is transformed to generate a synthetic observation vector. For example, similar to operation 284, mode k is defined based on an index to the value that is non-zero in $\beta_i$, $i=1,\ldots,N_c$ and used to compute the continuous value as $c_i=4\phi_k\alpha_i+\eta_k$, $i=1,\ldots,N_c$. For each discrete variable, the one-hot vector representation $d_i$, $i=1,\ldots,N_d$ is used to define the discrete value using the lookup table. The values for $\eta_k$ and $\phi_k$ and the lookup table may be read from generator model description 126 or another stored location or otherwise provided to data generation application 422.

In an operation 510, the synthetic observation vector may be output, for example, by storing the synthetic observation vector to second synthetic historical data 424. In addition, or in the alternative, the synthetic observation vector may be presented on a second display 416, printed on a second printer 420, sent to another computing device using second communication interface 406, etc.

In an operation 512, a determination is made concerning whether another synthetic observation vector is to be generated. When another synthetic observation vector is to be generated, processing continues in operation 505. When synthetic observation vector generation is done, processing continues in an operation 514. For example, a predefined number of synthetic observation vectors may be generated. In operation 514, processing stops.

Figure 6:
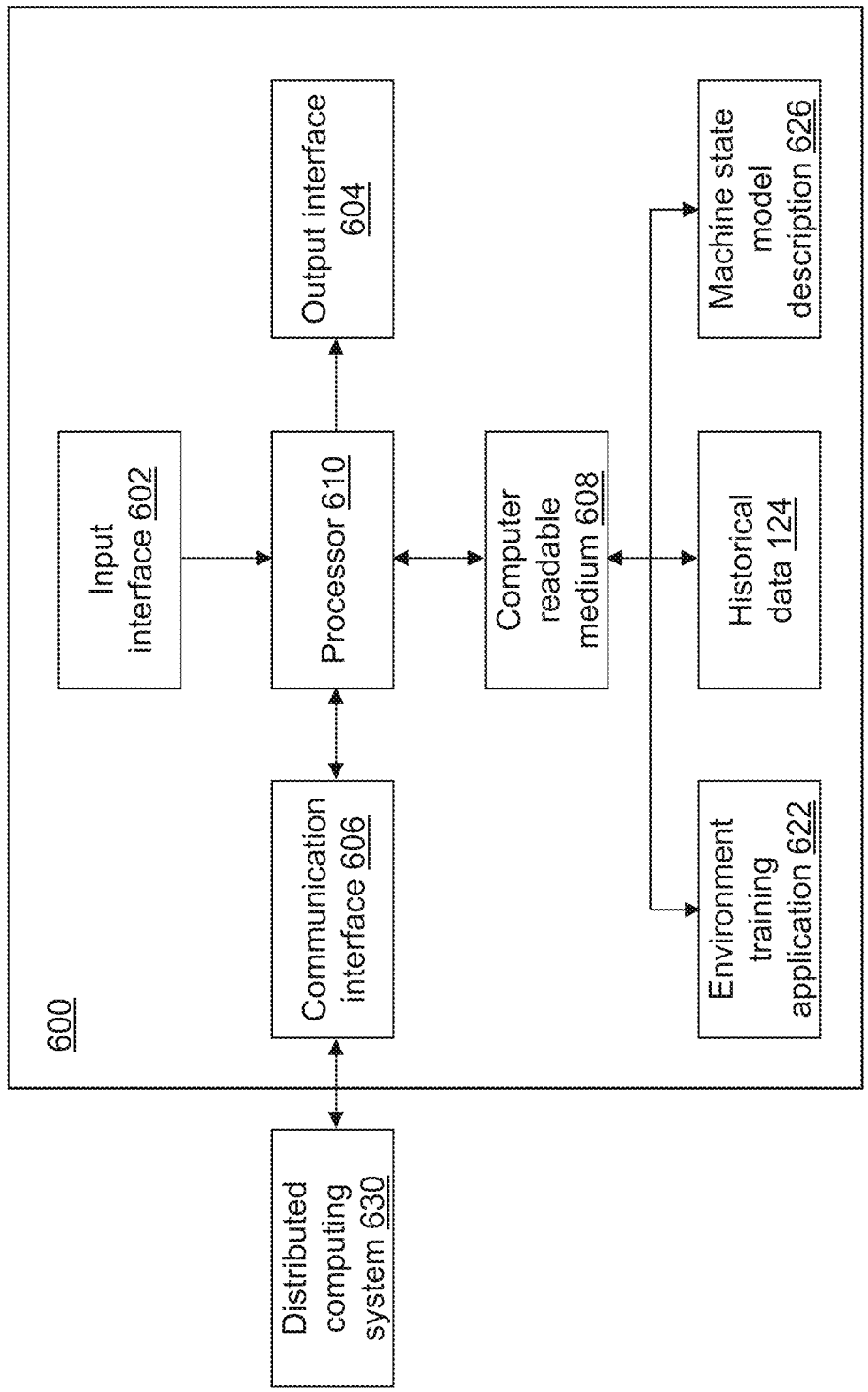
FIG. 6 depicts a block diagram of an environment training device in accordance with an illustrative embodiment.

Referring to FIG. 6, a block diagram of an environment training device 600 is shown in accordance with an illustrative embodiment. Environment training device 600 may include a third input interface 602, a third output interface 604, a third communication interface 606, a third non-transitory computer-readable medium 608, a third processor 610, an environment training application 622, historical data 124, and machine state model description 626. Fewer, different, and/or additional components may be incorporated into environment training device 600. Data generation device 400, data generation training device 100, and/or environment training device 600 may be the same or different devices.

Third input interface 602 provides the same or similar functionality as that described with reference to input interface 102 of data generation training device 100 though referring to environment training device 600. Third output interface 604 provides the same or similar functionality as that described with reference to output interface 104 of data generation training device 100 though referring to environment training device 600. Third communication interface 606 provides the same or similar functionality as that described with reference to communication interface 106 of data generation training device 100 though referring to environment training device 600. Data and messages may be transferred between environment training device 600 and a distributed computing system 630 using third communication interface 606. Distributed computing system 132, distributed computing system 426, and/or distributed computing system 630 may be the same or different computing systems. Third computer-readable medium 608 provides the same or similar functionality as that described with reference to computer-readable medium 108 of data generation training device 100 though referring to environment training device 600. Third processor 610 provides the same or similar functionality as that described with reference to processor 110 of data generation training device 100 though referring to environment training device 600.

Environment training application 622 performs operations associated with training a machine state model using historical data 124. Once trained, information used to instantiate the machine state model is stored in machine state model description 626. Some or all of the operations described herein may be embodied in environment training application 622. The operations may be implemented using hardware, firmware, software, or any combination of these methods.

Referring to the example embodiment of FIG. 6, environment training application 622 is implemented in software (comprised of computer-readable and/or computer-executable instructions) stored in third computer-readable medium 608 and accessible by third processor 610 for execution of the instructions that embody the operations of environment training application 622. Environment training application 622 may be written using one or more programming languages, assembly languages, scripting languages, etc. Similar to data generation application 422, environment training application 622 may be integrated with other analytic tools. Data generation application 422, data generation training application 122, and/or environment training application 622 may be the same or different applications that are integrated in various manners to generate synthetic data for use in training the machine state model. Environment training application 622 may be implemented as a Web application.

Figure 7:
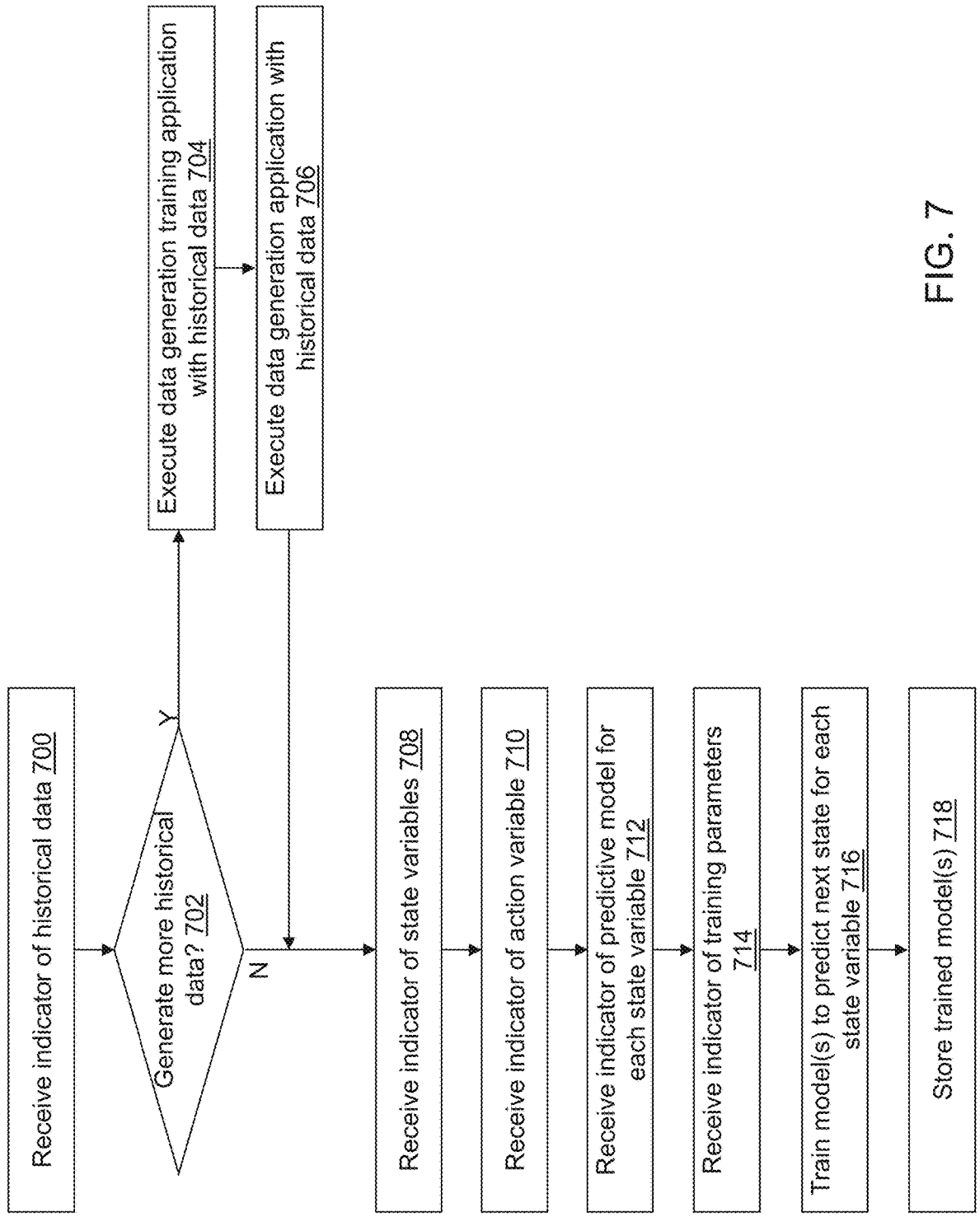
FIG. 7 depicts a flow diagram illustrating examples of operations performed by an environment training application of the environment training device of FIG. 6 in accordance with an illustrative embodiment.

Referring to FIG. 7, example operations of environment training application 622 are described to train the machine state model using historical data 124. Additional, fewer, or different operations may be performed depending on the embodiment of environment training application 622. The order of presentation of the operations of FIG. 7 is not intended to be limiting. Although some of the operational flows are presented in sequence, the various operations may be performed in various repetitions, concurrently (in parallel, for example, using threads and/or distributed computing system 630), and/or in other orders than those that are illustrated.

In an operation 700, a twelfth indicator may be received that indicates historical data 124. For example, the twelfth indicator indicates a location and a name of historical data 124. As an example, twelfth indicator may be received by environment training application 622 after selection from a user interface window or after entry by a user into a user interface window. In an alternative embodiment, historical data 124 may not be selectable. For example, a most recently created dataset may be used automatically. As another example, historical data 124 may be provided automatically as part of integration with data generation application 422. To train the machine state model, historical data 124 includes a machine state vector s and an action variable a with values defined for each observation vector. A next machine state vector is defined as a subsequent observation vector in a given episode that is a next in time machine state vectors stored in historical data 124.

In an operation 702, a determination is made concerning whether additional historical data or data privacy is needed. When additional historical data or data privacy is needed, processing continues in an operation 704. When additional historical data and data privacy are not needed, processing continues in an operation 708. For example, an indicator may be received that requests generation of additional historical data to supplement historical data 124 or generation of data from historical data 124 to provide data privacy.

In operation 704, data generation training application 122 is executed with historical data 124 to define generator model description 126 and/or synthetic historical data 128.

In an operation 706, data training application 422 is executed with generator model description 126 to generate any additional observations stored in second synthetic historical data 424. Synthetic historical data 128 and/or second synthetic historical data 424 are referred to subsequently as historical data 124 that is used to train the machine state model.

In an operation 708, a thirteenth indicator may be received that indicates the plurality of variables to use from historical data 124 to define the state variables. For example, the thirteenth indicator may indicate a plurality of column numbers or column names. The plurality of variables are the variables that define each state vector $s_i$, where $s_i = x_{i,j}$, $j=1, \ldots, N_{v,s}$, $i=1, \ldots, N$, where $N_{v,s}$ indicates the number of variables included in each state vector, and N indicates the number of observation vectors included in historical data 124. $x_{i,j}$ is a $j^{th}$ variable value for the $i^{th}$ observation vector.

In an operation 710, a fourteenth indicator may be received that indicates the action variable to use from historical data 124 to define the action variable value for each observation vector, $a_i$, $i=1, \ldots, N$. For example, the fourteenth indicator may indicate an action column number or column name.

In an operation 712, a fifteenth indicator indicates a predictive model type for each state variable included in the state vector $s_i$. For example, the fifteenth indicator indicates a name of a model type that performs prediction of a next value for the respective state variable. Each state variable may use the same or a different model type. The fifteenth indicator may be received by environment training application 622 from a user interface window or after entry by a user into a user interface window. A default value for the model type may further be stored, for example, in third computer-readable medium 608. For illustration, a model type may be selected from "SVM", "Neural Network", "Forest", "Gradient Boosting", "Decision Tree", etc. The model type indicated by "SVM" may refer to a support vector machine (SVM) model type. The model type indicated by "Neural Network" may refer to a neural network model type. The model type indicated by "Forest" may refer to a random forest model type. The model type indicated by "Gradient Boosting" may refer to a gradient boosting model type. The model type indicated by "Decision Tree" may refer to a decision tree model type. For example, a default model type may be indicated by "Forest". Of course, the model type may be labeled or selected in a variety of different manners by the user as understood by a person of skill in the art. In an alternative embodiment, the model type may not be selectable, and a single model type is implemented by environment training application 622. For example, the model type indicated as "Neural Network" may be used by default or without allowing a selection considering its expected accuracy and prediction time. The specific architecture of the neural network model can take many forms, with numerous layers, activation functions, drop-out, etc. However, input to the neural network model may include a vector of numbers encoding information about the values of state variables at that moment in time. These values may be transformed during encoding (e.g. categorical variables may be one-hot encoded and numeric variables may be normalized and mean-centered). The neural network model output may be either a single vector or a collection of vectors (corresponding to the number of output layers in the model). A multi-task learning model generally has one output layer per task being performed. As with input vectors, the values of the output vectors are interpreted in the context of the problem being solved. They may be scalar values indicating oven temperatures, or offsets to some pre-determined baseline temperature, or they may be one-hot encodings indicating discrete actions that should be taken.

The Decision Tree model type automatically adjusts decision tree hyperparameters to tune a decision tree model for minimum error as measured by a specified objective function. For illustration, a tuneDecisionTree action selects different hyperparameter configurations to run a dtreeTrain action, optionally a dtreePrune action, and a dtreeScore action (an assess action may be run after each dtreeScore action) multiple times to train and validate a decision tree model as it searches for a model that has reduced validation error. For illustration, the tuneDecisionTree action, the dtreeTrain action, the dtreePrune action, and the dtreeScore action are included in SAS® Viya™ and SAS® CAS.

For illustration, a FOREST procedure included in SAS® Visual Data Mining and Machine Learning 8.5 may be used to implement the forest model type in SAS® Viya™. The FOREST procedure creates a predictive model called a forest, which consists of several decision trees in SAS Viya. The FOREST procedure creates multiple decision trees that differ from each other in two ways: 1) the training data for each tree constitutes a different sample, and each sample is created by sampling, with replacement, observations from the original training data of the forest, and 2) the input variables that are considered for splitting a node are randomly selected from all available inputs. Among these randomly selected variables, the FOREST procedure chooses a single variable, which is associated the most with the target when it forms a splitting rule. The FOREST procedure creates an ensemble of decision trees to predict a single target of either interval or nominal measurement level. An input variable can have an interval or nominal measurement level.

For illustration, an "autotune" statement used with the FOREST procedure included in SAS® Visual Data Mining and Machine Learning 8.5 may be used to evaluate different hyperparameter configurations and to select the best configuration of hyperparameter values for the forest model type. A tuneForest action selects different hyperparameter configurations to run a forestTrain action and a forestScore action multiple times to train and validate the forest model as it searches for a model that has reduced validation error. For illustration, the tuneForest action, the forestTrain action, and the forestScore action are included in SAS® Viya™ and SAS® CAS.

The Gradient Boosting Tree model type automatically adjusts gradient boosting tree parameters to tune a gradient boosting tree model for minimum error as measured by a specified objective function. The Gradient Boosting Tree model type consists of multiple decision trees. For illustration, a GRADBOOST procedure included in SAS® Visual Data Mining and Machine Learning 8.5 may be used to implement the Gradient Boosting Tree model type in SAS® Viya™. The GRADBOOST procedure creates a predictive model called a gradient boosting tree model in SAS Viya. The GRADBOOST procedure creates a predictive model by fitting a set of additive trees.

For illustration, an "autotune" statement used with the GRADBOOST procedure included in SAS® Visual Data Mining and Machine Learning 8.5 may be used to evaluate different hyperparameter configurations and to select the best configuration of hyperparameter values for the Gradient Boosting Tree model type. A tuneGradientBoostTree action selects different hyperparameter configurations to run the gbtreeTrain and gbtreeScore actions multiple times to train and validate gradient boosting tree models as it searches for a model that has reduced validation error. For illustration, the gbtreeTrain and gbtreeScore actions are included in SAS® Viya™ and SAS® CAS.

The Neural Network model type automatically adjusts neural network parameters to tune a neural network model for minimum error as measured by a specified objective function. For illustration, a dlTrain action included in SAS® Visual Data Mining and Machine Learning 8.2 may be used to implement the Neural Network model type in SAS® Viya™ and SAS® Cloud Analytic Services (CAS) all developed and provided by SAS Institute Inc. of Cary, N.C., USA. The dlTrain action trains a deep fully-connected neural network. A dlTune action can be used to tune the deep neural network model. SAS Deep Learning actions support massively parallel processing and symmetric parallel processing with multiple threading and can be executed using GPU processors.

The Support Vector Machine model type automatically adjusts support vector machine parameters to tune a support vector machine model for minimum error as measured by a specified objective function. For illustration, a SVMACHINE procedure included in SAS® Visual Data Mining and Machine Learning 8.5 may be used to implement the Support Vector Machine model type in SAS® Viya™. The Support Vector Machine model type computes support vector machine learning classifiers for a binary pattern recognition problem. The SVMACHINE procedure uses both linear and low-degree polynomial kernels to conduct the computation.

For illustration, an "autotune" statement used with the SVMACHINE procedure included in SAS® Visual Data Mining and Machine Learning 8.5 may be used to evaluate different hyperparameter configurations and to select the best configuration of hyperparameter values for the support vector machine model type. A tuneSvm action selects different hyperparameter configurations to run the svm Train action of the svm action set, the score action of the astore action set, and the assess action of the percentile action set to train and validate support vector machine models as it searches for a model that has reduced validation error. For illustration, the svm Train action is included in the svm action set of SAS® Viya™ and SAS® CAS.

In an operation 714, a sixteenth indicator indicates one or more hyperparameters and any other training and/or tuning parameters to use for training and validating the indicated model type and/or specified values for an automatic tuning method for each state variable included in the state vector Hyperparameters define values or various options that govern a training and tuning process based on the model type. The default values of these hyperparameters may not be suitable for all applications. To reduce the effort in adjusting these hyperparameters, an automatic tuning process may be used to identify the best settings for the hyperparameters though the hyperparameters may optionally be selected as an input option by a user. Each state variable may use the same or different hyperparameters and any other training and/or tuning parameters.

In an operation 716, a state predictive model is trained for each state variable of the state variables using each observation vector read from historical data 124 based on the model type indicated in operation 712 and the hyperparameters indicated in operation 714. Each state predictive model is trained to predict a next state variable value for a respective state variable and action value read from historical data 124. Historical data 124 may include the plurality of episodes that are together used to train the state predictive model.

In an operation 718, the data that describes the state predictive model trained for each state variable of the state variables is stored in machine state model description 626. For illustration, the trained models may be stored using the ASTORE procedure provided by SAS® Visual Data Mining and Machine Learning software.

Figure 8:
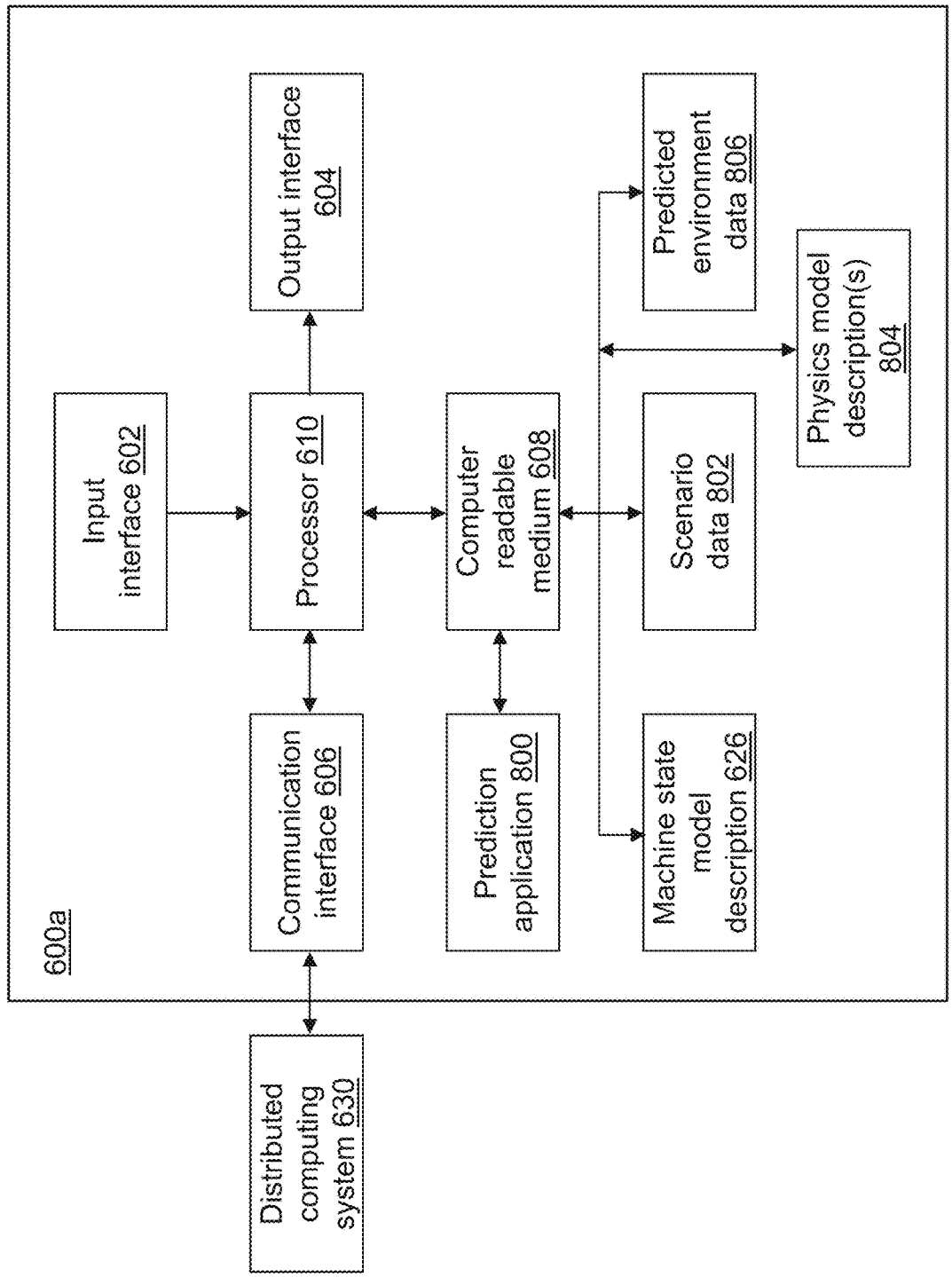
FIG. 8 depicts a block diagram of an environment simulator device in accordance with an illustrative embodiment.

Referring to FIG. 8, an environment simulator device 600a maybe similar to environment training device 600, but further include a prediction application 800, scenario data 802, zero or more physics model descriptions 804, and predicted environment data 806. Prediction application 800 simulates the environment using scenario data 802.

Historical data 124 and scenario data 802 may be generated, stored, and accessed using the same or different mechanisms. Similar to historical data 124, scenario data 802 may include a plurality of rows and a plurality of columns with the plurality of rows referred to as observations or records, and the columns referred to as variables that are associated with an observation. Scenario data 802 may be transposed. Scenario data 802 may include the identifier variable ID, the plurality of state variables that define the machine state vector s and the action variable a for one or more episodes as described above with reference to historical data 124.

Similar to historical data 124, scenario data 802 may be stored on third computer-readable medium 608 or on one or more computer-readable media of distributed computing system 630 and accessed by environment simulator device 600a using third communication interface 606. The data stored in scenario data 802 may include any type of content represented in any computer-readable format such as binary, alphanumeric, numeric, string, markup language, etc. The content may include textual information, numeric information, etc. that further may be encoded using various encoding techniques as understood by a person of skill in the art. The data stored in scenario data 802 may be captured at different time points, periodically, intermittently, when an event occurs, etc. One or more columns may include a time value. Similar to historical data 124, data stored in scenario data 802 may be generated as part of the IoT, and some or all data may be pre- or post-processed by an ESPE.

Similar to historical data 124, scenario data 802 may be stored in various compressed formats such as a coordinate format, a compressed sparse column format, a compressed sparse row format, etc. Scenario data 802 further may be stored using various structures as known to those skilled in the art including a file system, a relational database, a system of tables, a structured query language database, etc. on environment simulator device 600a and/or on distributed computing system 630. Environment simulator device 600a may coordinate access to scenario data 802 that is distributed across a plurality of computing devices that make up distributed computing system 630. For example, scenario data 802 may be stored in a cube distributed across a grid of computers as understood by a person of skill in the art. As another example, scenario data 802 may be stored in a multi-node Hadoop® cluster. As another example, scenario data 802 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in scenario data 802.

Figure 9:
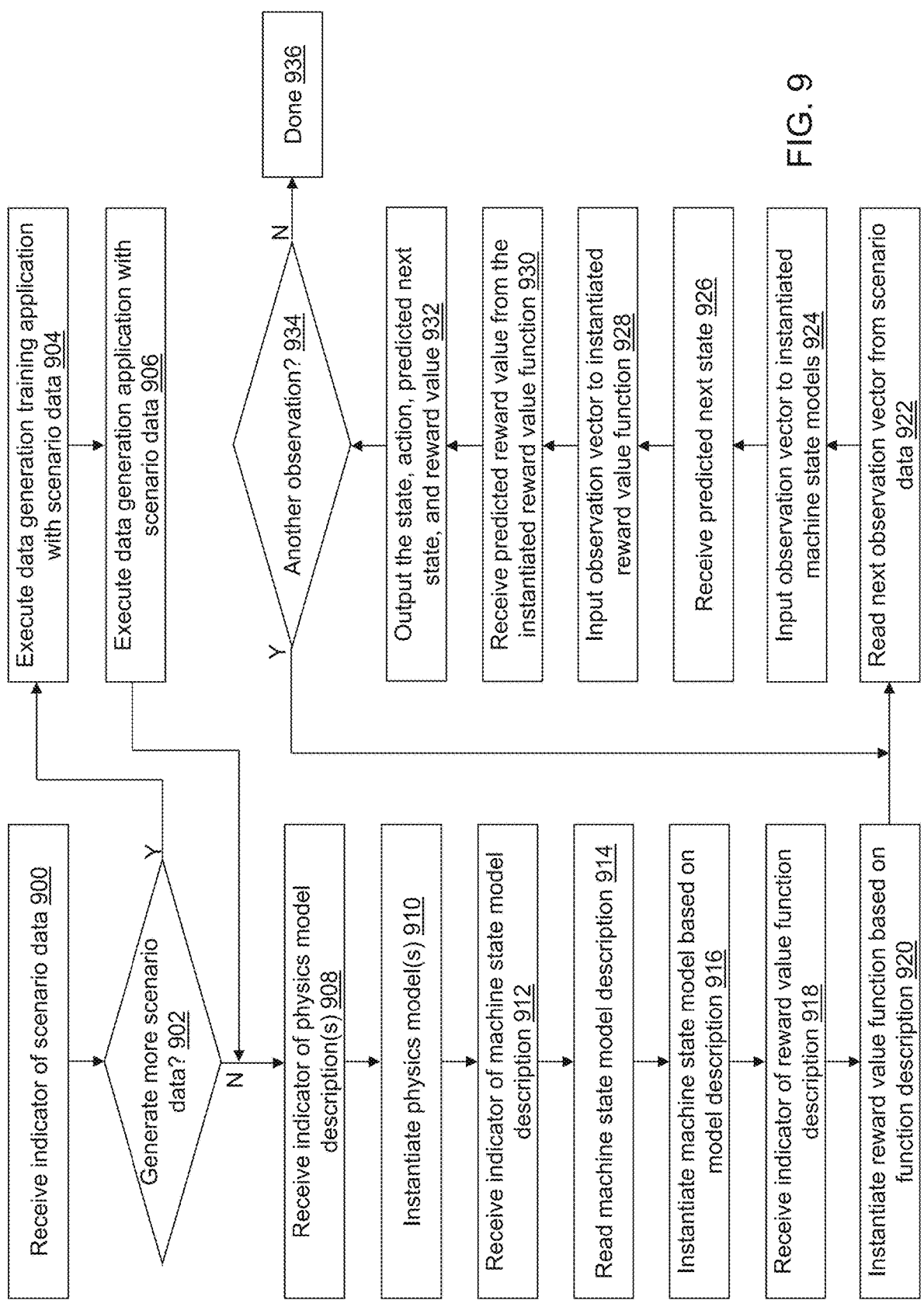
FIG. 9 depicts a flow diagram illustrating examples of operations performed by a prediction application of the simulator device of FIG. 8 in accordance with an illustrative embodiment.

Referring to FIG. 9, example operations of prediction application 800 are described to use the models trained using environment training device 600 to predict a next state vector and/or a reward variable value for each observation vector included in scenario data 802.

In an operation 900, a seventeenth indicator may be received that indicates scenario data 802. For example, the seventeenth indicator indicates a location and a name of scenario data 802. As an example, the seventeenth indicator may be received by prediction application 800 after selection from a user interface window or after entry by a user into a user interface window. In an alternative embodiment, scenario data 802 may not be selectable. For example, a most recently created dataset may be used automatically. Scenario data 802 includes a plurality of observation vectors where each observation vector includes a state variable value for each state variable and an associated action variable value.

In an operation 902, a determination is made concerning whether additional data or data privacy is needed. When additional data or data privacy is needed, processing continues in an operation 904. When additional data and data privacy are not needed, processing continues in an operation 908. For example, an indicator may be received that requests generation of additional data to supplement scenario data 802 or generation of data from scenario data 802 to provide data privacy.

In operation 904, data generation training application 122 is executed with scenario data 802 to define generator model description 126 and/or synthetic historical data 424.

In an operation 906, data training application 422 is executed with generator model description 126 to generate any additional observations stored in second synthetic historical data 424. Scenario data 802 and/or second synthetic historical data 424 are referred to subsequently as scenario data 802.

In an operation 908, an eighteenth indicator may be received that indicates any physics model descriptions 804. For example, the eighteenth indicator indicates a location and a name of any physics model descriptions 804. As an example, the eighteenth indicator may be received by prediction application 800 after selection from a user interface window or after entry by a user into a user interface window. A physics model applies physics rules to simulate a next state variable for a state variable. A physics model may be used instead of a machine learning model such as those trained by environment training device 600. A subset of the state variables of each state vector may not have been used by environment training device 600 to train a machine learning model.

In an operation 910, a physics model is instantiated for each state variable for which a physics model is indicated in operation 901.

In an operation 912, a nineteenth indicator may be received that indicates machine state model description 626. For example, the nineteenth indicator indicates a location and a name of machine state model description 626. As an example, the nineteenth indicator may be received by prediction application 800 after selection from a user interface window or after entry by a user into a user interface window.

In an operation 914, a machine state model description may be read from machine state model description 626.

In an operation 916, a machine state model is instantiated using the machine state model description read from machine state model description 626 for each state variable of the state vector for which a machine learning model was trained.

In an operation 918, a twentieth indicator may be received that indicates a reward value function g used to combine the reward value computed for each reward variable of the reward vector $r_t = g(r_t^1, \ldots, r_t^m)$. For example, the twentieth indicator indicates a location and a name of the reward value function description. As an example, the twentieth indicator may be received by prediction application 800 after selection from a user interface window or after entry by a user into a user interface window. For example, a combined reward value function reflects a performance quality of the system in a time slot t based on one or more reward variables. The reward value function may be industry-specific and dependent on how experts evaluate an overall performance of a system at any specific time. For instance, in a tile manufacturing process, if a lower deviation from a standard tile color in all stages of the production matters equally, the reward value function may be a negative value of an average deviation among all the stages. The reward values are included in historical data 124. For example, the technical guidance specifies color codes and sensory information indicates a produced color code. A difference between the specified and produced color codes can be used to indicate how well the system is performing to determine the reward. As another example, if experts determine that the overall performance relates to a final quality, the final quality defines the reward value.

In an operation 920, a reward function is instantiated using the reward function description for each reward variable of the reward vector for which a machine learning model was trained.

In an operation 922, an observation vector is read from scenario data 802.

In an operation 924, the observation vector is input to the instantiated machine state model for each state variable of the state vector to predict a next state value for each respective state variable. The instantiated state model may be a physics model or a trained machine learning model.

In an operation 926, the predicted next state value for each respective state variable is received as an output of each instantiated model to define a next state vector.

In an operation 928, the observation vector is input to the instantiated reward function for each reward variable of the reward vector.

In an operation 930, the reward value predicted for each respective reward variable is received as an output of each instantiated function to define a reward vector. The reward value function is applied to the reward vector predicted by each reward function to determine a reward value.

In an operation 932, the state vector, action variable value, predicted next state vector, and reward value may be output, for example, to predicted environment data 806.

In an operation 934, a determination is made concerning whether or not scenario data 802 includes another observation vector. When scenario data 802 includes another observation vector, processing continues in operation 922. When scenario data 802 does not include another observation vector, processing continues in an operation 936.

In operation 936, processing is done.

Environment simulator device 600a may be used to predict machine operation under various operating conditions and/or to predict a reward associated with the state-action pair for an understanding of machine performance as well as to generate additional data to train a controller of the machine.

Figure 10:
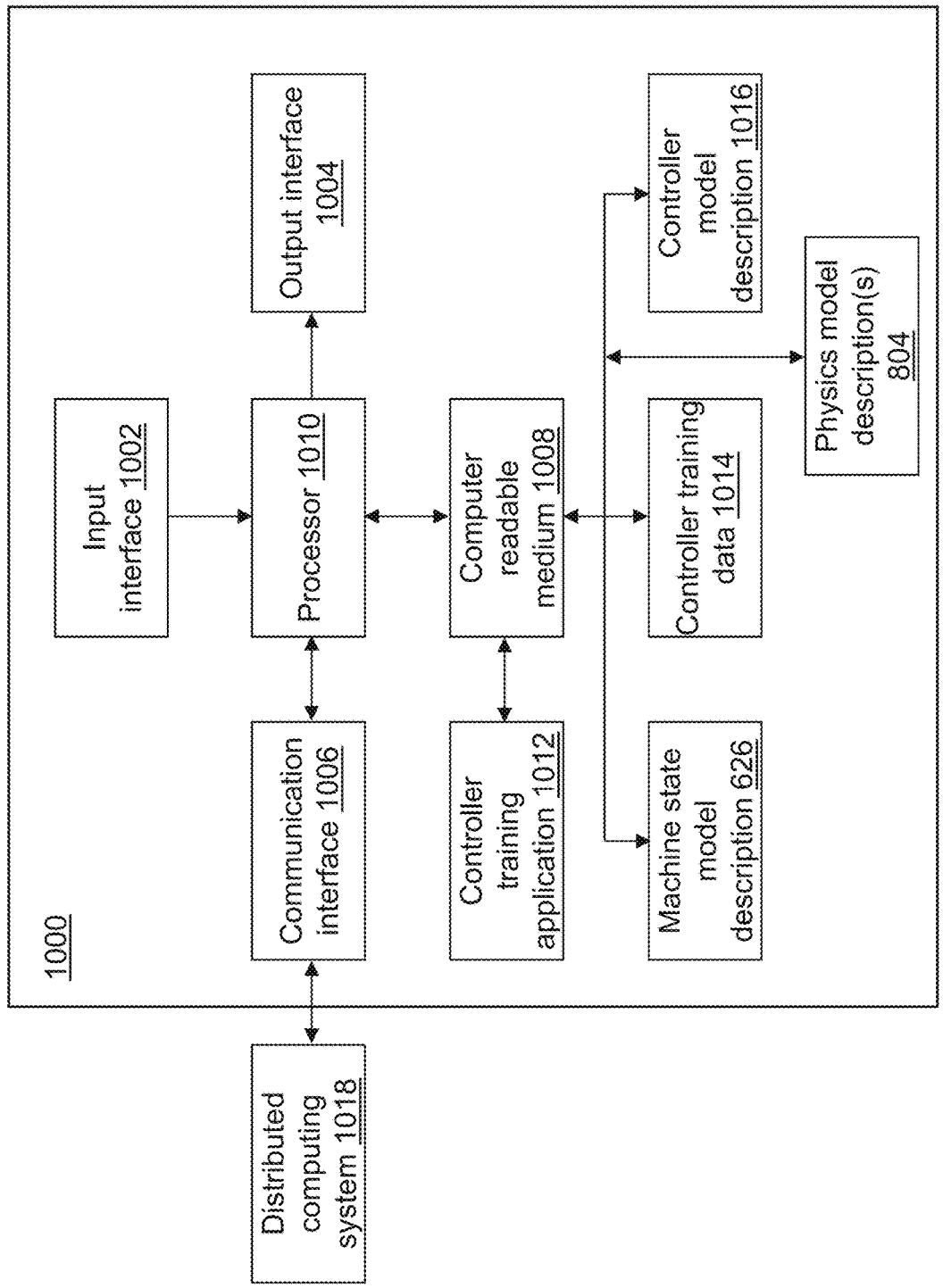
FIG. 10 depicts a block diagram of a controller training device in accordance with an illustrative embodiment.

Referring to FIG. 10, a block diagram of a controller training device 1000 is shown in accordance with an illustrative embodiment. Controller training device 1000 may include a fourth input interface 1002, a third output interface 1004, a third communication interface 1006, a third non-transitory computer-readable medium 1008, a third processor 1010, a controller training application 1012, controller training data 1014, machine state model description 626, physics model descriptions 804, and controller model description 1016. Fewer, different, and/or additional components may be incorporated into controller training device 1000.

Fourth input interface 1002 provides the same or similar functionality as that described with reference to input interface 102 of data generation training device 100 though referring to controller training device 1000. Fourth output interface 1004 provides the same or similar functionality as that described with reference to output interface 104 of data generation training device 100 though referring to controller training device 1000. Fourth communication interface 1006 provides the same or similar functionality as that described with reference to communication interface 106 of data generation training device 100 though referring to controller training device 1000. Data and messages may be transferred between controller training device 1000 and a distributed computing system 1018 using fourth communication interface 606. Fourth computer-readable medium 1008 provides the same or similar functionality as that described with reference to computer-readable medium 108 of data generation training device 100 though referring to controller training device 1000. Fourth processor 1010 provides the same or similar functionality as that described with reference to processor 110 of data generation training device 100 though referring to controller training device 1000.

Controller training application 1012 performs operations associated with training a controller model using controller training data 124. Once trained, information used to instantiate the controller model is stored in controller model description 1016. Some or all of the operations described herein may be embodied in controller training application 1012. The operations may be implemented using hardware, firmware, software, or any combination of these methods.

Referring to the example embodiment of FIG. 10, controller training application 1012 is implemented in software (comprised of computer-readable and/or computer-executable instructions) stored in fourth computer-readable medium 1008 and accessible by fourth processor 1010 for execution of the instructions that embody the operations of controller training application 1012. Controller training application 1012 may be written using one or more programming languages, assembly languages, scripting languages, etc. Similar to data generation application 422, controller training application 1012 may be integrated with other analytic tools. Controller training application 1012 may be implemented as a Web application.

Figure 11:
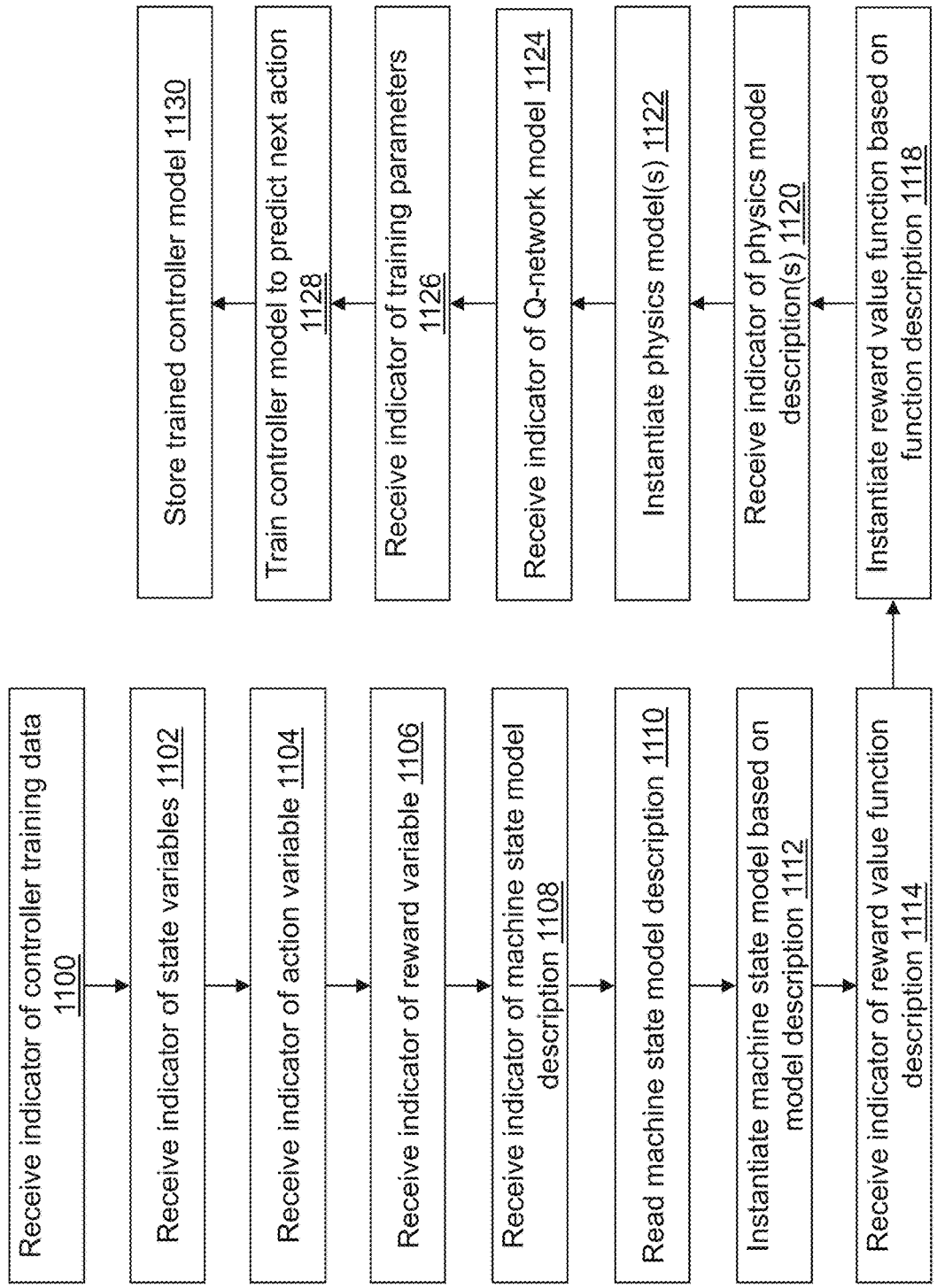
FIG. 11 depicts a flow diagram illustrating examples of operations performed by a controller training application of the controller training device of FIG. 10 in accordance with an illustrative embodiment.

Referring to FIG. 11, example operations of controller training application 1012 are described to train the controller model using controller training data 1014. Additional, fewer, or different operations may be performed depending on the embodiment of controller training application 1012. The order of presentation of the operations of FIG. 11 is not intended to be limiting. Although some of the operational flows are presented in sequence, the various operations may be performed in various repetitions, concurrently (in parallel, for example, using threads and/or distributed computing system 1018), and/or in other orders than those that are illustrated.

In an operation 1100, a twenty-first indicator may be received that indicates controller training data 1014. For example, the twenty-first indicator indicates a location and a name of controller training data 1014. As an example, twenty-first indicator may be received by controller training application 1012 after selection from a user interface window or after entry by a user into a user interface window. In an alternative embodiment, controller training data 1014 may not be selectable. For example, a most recently created dataset may be used automatically. Controller training data 1014 may be predicted environment data 806 that includes a state vector, an action variable, a reward variable and a next state vector for one or more episodes. When controller training data 1014 includes an insufficient number of observations, additional data may be generated using data generation training application 122 and data generation application 422 in a manner similar to that described in operations 704 and 706 to generate additional tuples of observations {s, a, r, $s_n$}, where $s_n$ indicates the next state vector.

In an operation 1102, a twenty-second indicator may be received that indicates the plurality of variables to use from controller training data 1014 to define the state variables. For example, the twenty-second indicator may indicate a plurality of column numbers or column names. The plurality of variables are the variables that define each state vector $s_i$, where $s_i = x_{i,j}$, j=1, ..., $N_{v,s}$, i=1, ..., N, where $N_{v,s}$ indicates the number of variables included in each state vector, and N indicates the number of observation vectors included in controller training data 1014.

In an operation 1104, a twenty-third indicator may be received that indicates the action variable to use from controller training data 1014 to define the action variable value for each observation vector, $a_i$, i=1, ..., N. For example, the twenty-third indicator may indicate an action column number or column name.

In an operation 1106, a twenty-fourth indicator may be received that indicates the reward variable to use from controller training data 1014 to define the reward variable value for each observation vector, $r_i$, i=1, ..., N. For illustration, the reward value may have been computed using operations 920 and 922. For example, the twenty-fourth indicator may indicate a column number or column name.

In an operation 1108, a twenty-fifth indicator may be received that indicates machine state model description 626. For example, the twenty-fifth indicator indicates a location and a name of machine state model description 626.

In an operation 1110, a machine state model description may be read from machine state model description 626.

In an operation 1112, a machine state model is instantiated using the machine state model description read from machine state model description 626 for each state variable of the state vector for which a machine learning model was trained.

Similar to operation 910, in an operation 1114, a twenty-sixth indicator may be received that indicates the reward value function description.

Similar to operation 912, in an operation 1118, a reward value function is instantiated using the reward function.

In an operation 1120, a twenty-seventh indicator may be received that indicates any physics model descriptions 804. For example, the twenty-seventh indicator indicates a location and a name of any physics model descriptions 804.

In an operation 1122, a physics model is instantiated for each state variable for which a physics model is indicated in operation 1120.

In an operation 1124, a twenty-eighth indicator may be received that indicates a Q-network model that specifies properties of the layers of a neural net used to estimate a Q value.

In an operation 1126, a twenty-ninth indicator indicates one or more hyperparameters and any other training and/or tuning parameters to use for training and validating the controller model.

In an operation 1128, a controller model is trained using each observation vector read from controller training data 1014 and the hyperparameters indicated in operation 1126. For illustration, the controller model may be trained as described in U.S. Pat. No. 10,762,424 titled Methods and Systems for Reinforcement Learning and/or U.S. Pat. No. 11,055,861 titled Discrete Event Simulation with Sequential Decision Making both of which are assigned to the assignee of the present application. The controller model further may be trained using the r|TrainDqn action included in SAS® Visual Data Mining and Machine Learning 2020.1.3. For example, the r|TrainDqn action is described in SAS® Visual Data Mining and Machine Learning: Reinforcement Learning Programming Guide 2020.1.3-2020.1.5* published by SAS Institute Inc. Apr. 19, 2021. A batch dimension of neural networks supports multiple trajectories at the same time. For example, if 16 episodes are to be sampled, all of the states of the 16 environments can be concatenated in the batch dimension and used to obtain the next state and reward with only a single forward pass of the neural network.

In an operation 1130, the data that describes the trained controller model is stored in machine state model description 626. For illustration, the trained model may be stored using the ASTORE procedure provided by SAS® Visual Data Mining and Machine Learning software.

Figure 12:
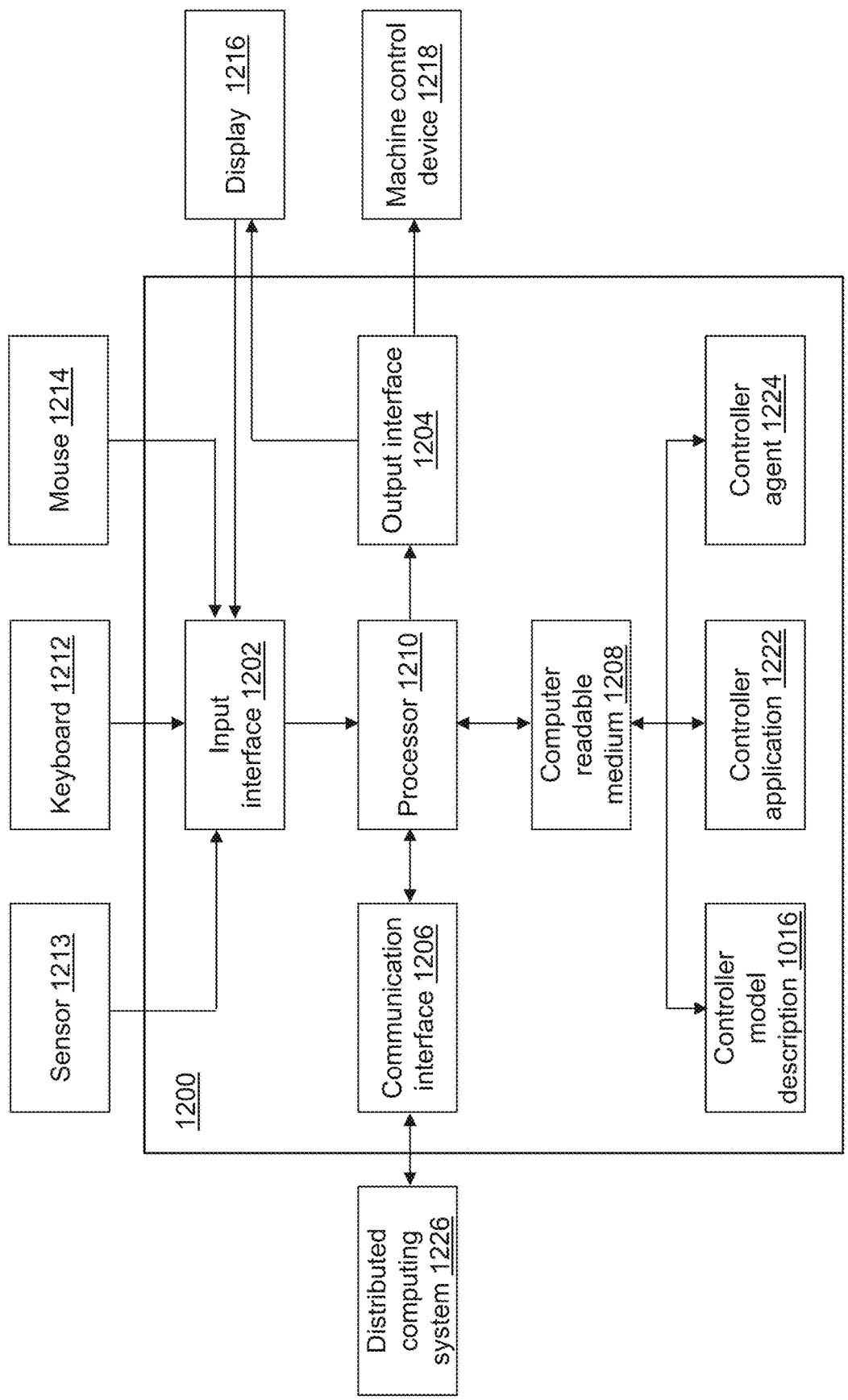
FIG. 12 depicts a block diagram of a controller device in accordance with an illustrative embodiment.

Referring to FIG. 12, a block diagram of a controller device 1200 is shown in accordance with an illustrative embodiment. Controller device 1200 may include a fifth input interface 1202, a fifth output interface 1204, a fifth communication interface 1206, a fifth non-transitory computer-readable medium 1208, a fifth processor 1210, controller model description 1016, a controller application 1222, and a controller agent 1224. Fewer, different, and/or additional components may be incorporated into controller device 1200.

Fifth input interface 1202 provides the same or similar functionality as that described with reference to input interface 102 of data generation training device 100 though referring to controller device 1200. Fifth output interface 1204 provides the same or similar functionality as that described with reference to output interface 104 of data generation training device 100 though referring to controller device 1200. Fifth communication interface 1206 provides the same or similar functionality as that described with reference to communication interface 106 of data generation training device 100 though referring to controller device 1200. Data and messages may be transferred between controller device 1200 and a distributed computing system 1226 using fifth communication interface 1206. Fifth computer-readable medium 1208 provides the same or similar functionality as that described with reference to computer-readable medium 108 of data generation training device 100 though referring to controller device 1200. Fifth processor 1210 provides the same or similar functionality as that described with reference to processor 110 of data generation training device 100 though referring to controller device 1200.

Controller application 1222 performs operations associated with instantiating controller agent 1224 to control one or more machines as part of a manufacturing process. Some or all of the operations described herein may be embodied in controller application 1222. The operations may be implemented using hardware, firmware, software, or any combination of these methods.

Figure 13:
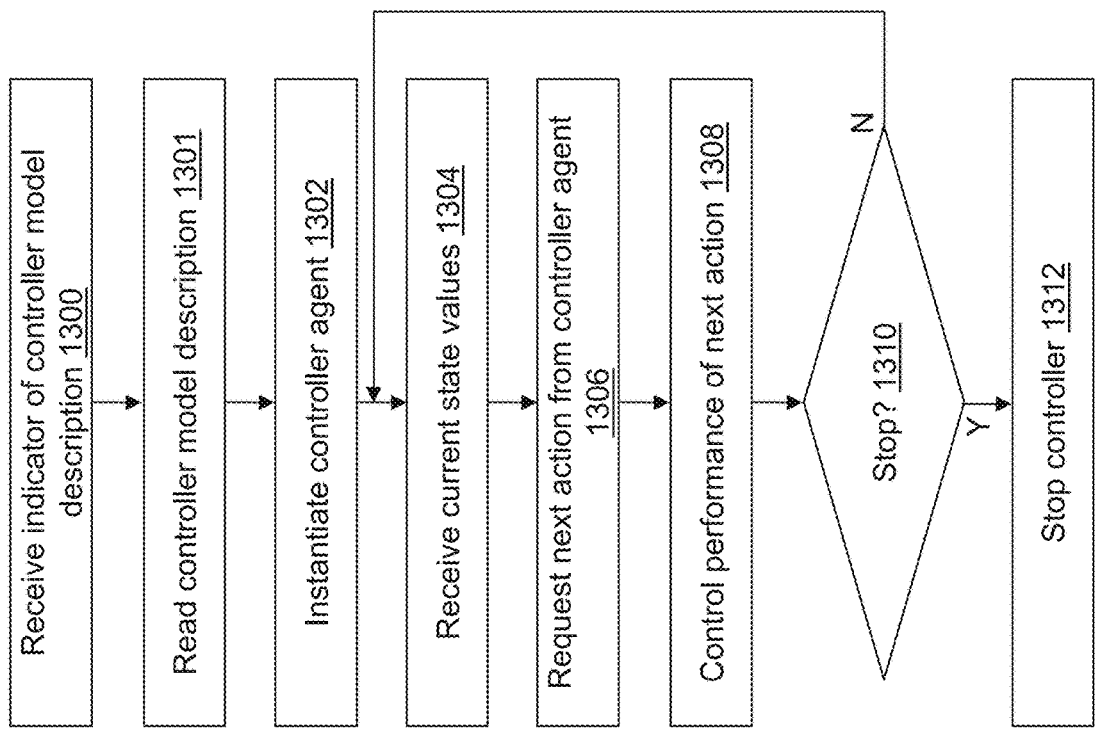
FIG. 13 depicts a flow diagram illustrating examples of operations performed by a controller application of the controller device of FIG. 12 in accordance with an illustrative embodiment.

Referring to the example embodiment of FIG. 13, controller application 1222 is implemented in software (comprised of computer-readable and/or computer-executable instructions) stored in fifth computer-readable medium 1208 and accessible by fifth processor 1210 for execution of the instructions that embody the operations of controller application 1222. Controller application 1222 may be written using one or more programming languages, assembly languages, scripting languages, etc. Similar to data generation training application 122, controller application 1222 may be integrated with other analytic tools. Controller application 1222 may be implemented as a Web application.

Referring to FIG. 13, example operations of controller application 1222 are described. Additional, fewer, or different operations may be performed depending on the embodiment of controller application 1222. The order of presentation of the operations of FIG. 13 is not intended to be limiting. Although some of the operational flows are presented in sequence, the various operations may be performed in various repetitions, concurrently (in parallel, for example, using threads and/or distributed computing system 1226), and/or in other orders than those that are illustrated.

In an operation 1300, a thirtieth indicator may be received that indicates controller model description 1016. For example, the thirtieth indicator indicates a location and a name of controller model description 1016. As an example, the thirtieth indicator may be received by controller application 1222 in an operation after selection from a user interface window or after entry by a user into a user interface window.

In an operation 1301, a controller model description may be read from controller model description 1016.

In an operation 1302, controller agent 1224 is instantiated using the controller model description read from controller model description 1016.

In an operation 1304, current state values are received for the state vector used to train the controller model. For example, the current state values may be received through input interface 1302 from a sensor 1213, a keyboard 1212, a mouse 1214, and/or a display 1216. For example, a machine operator may use keyboard 1212 and/or mouse 1214 to enter information regarding the product or the machine type, etc. Sensor 1213 may measure a machine characteristic such as a temperature that is part of the state vector.

In an operation 1306, a next action is requested from controller agent 1224. For example, the current state values are provided to controller agent 1224 that determines a next action to take based on the trained policy. The controller agent may be instantiated and executed, for example, using the r|Score action included in SAS® Visual Data Mining and Machine Learning 2020.1.3. For illustration, a SAS package may be used to communicate with a remote Python environment. The SAS package executing the r|Score action may use a Google® remote procedure call to provide a fast communication to an environment server executing the machine state model such as that stored in machine state model description 626 instantiated at the environment server that generates a predicted next state from the current state values. The Google® remote procedure call transfers data back and forth between the SAS package and the environment server. Controller agent 1224 determines the next action to take based on the trained policy and the predicted next state.

In an operation 1308, controller device 1200 controls performance of the determined next action. For example, the next action may indicate to increase an oven temperature set point. Based on this, controller device 1200 may send an instruction to a machine control device 1218 to perform the action.

In an operation 1310, a determination is made concerning whether or not to stop controller device 1200. When controller device 1200 is stopped, processing continues in an operation 1312. When controller device 1200 is not stopped, processing continues in an operation 1304 to receive and process new current state values.

In operation 1312, processing stops.

Figure 19:
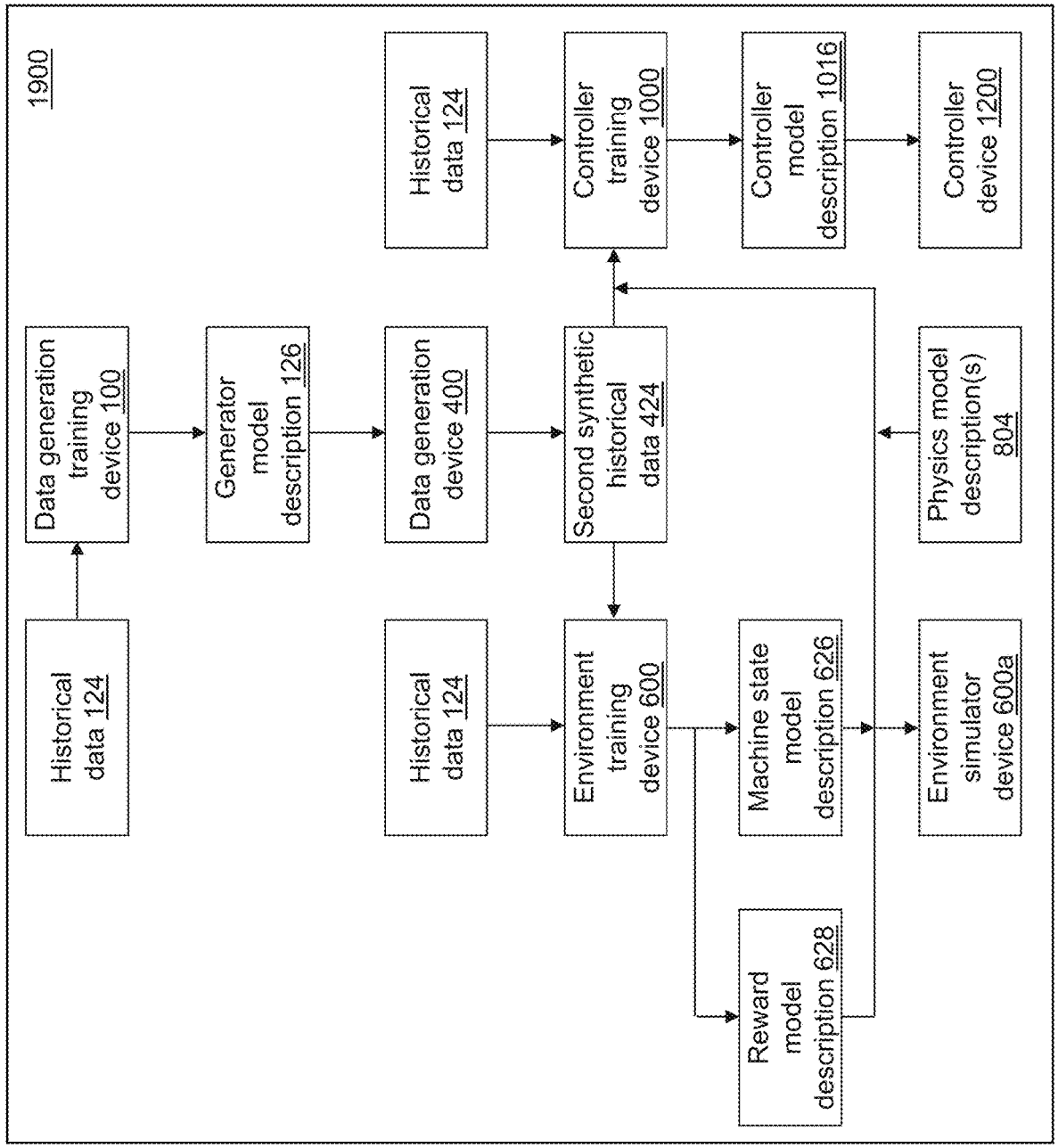
FIG. 19 depicts a block diagram of a pipeline for creating an environment simulator and a controller in accordance with an illustrative embodiment.

Referring to FIG. 19, a block diagram of a pipeline 1900 for creating an environment simulator and a controller is shown in accordance with an illustrative embodiment. Historical data 124 may be used directly by environment training device 600 or controller training device 1000. Alternatively, when additional data is needed by environment training device 600 and/or controller training device 1000, second synthetic historical data 424 is generated. Second synthetic historical data 424 may include state vectors, reward vectors, reward values, action values, and/or next state vectors. Second synthetic historical data 424 may include synthetic historical data 128.

To validate the performance of pipeline 1900, synthetic data of a manufacturing process in which some of the state variables represent the state for one of the machines involved in the process was created. The data included episodes of different lengths since the manufacturing line may be disrupted or stopped for various reasons.

In the environment, a machine in the process included a first state variable value that directly depends on the selected action value, such that state variable value goes up and down based on the selected action value. A second state variable value depended on a time, and a third state variable value depended on a physical characteristic of the product. The first state variable value represented a temperature of an oven, the second state variable value was a statistical variable that represented the time of running the oven, and the third state variable value was related to the physical characteristic of the product. Alternatively, the process could be a representation of a machinery tool where the first state variable value was the speed of the machinery tool, and the other two state variable values were similar to those included in the oven process.

For the oven, the actions are changes of the temperature with the goal of achieving the final product as designed. Similarly, in the machinery tools, the actions are changes in the speed of the machine compared to the existing speed. In both systems, the reward is higher if the temperature/speed goes up until it reaches a threshold. Beyond that threshold, increasing the temperature/speed results in a smaller reward that can be negative after the threshold is significantly exceeded. Controller model description 1016 is trained by learning the relationship between the state variables, action, and the threshold to determine when to increase or to decrease the temperature/speed state variable. The reward function involves a negative coefficient multiplied by the action that represents the cost of taking the action and a function of time that decreases the reward value as time progresses to represent required maintenance of the machine.

Two neural networks were trained to define the state transition function for the first variable and the second state variable. The third state variable value was obtained using physics-based rules.

Figure 14C:
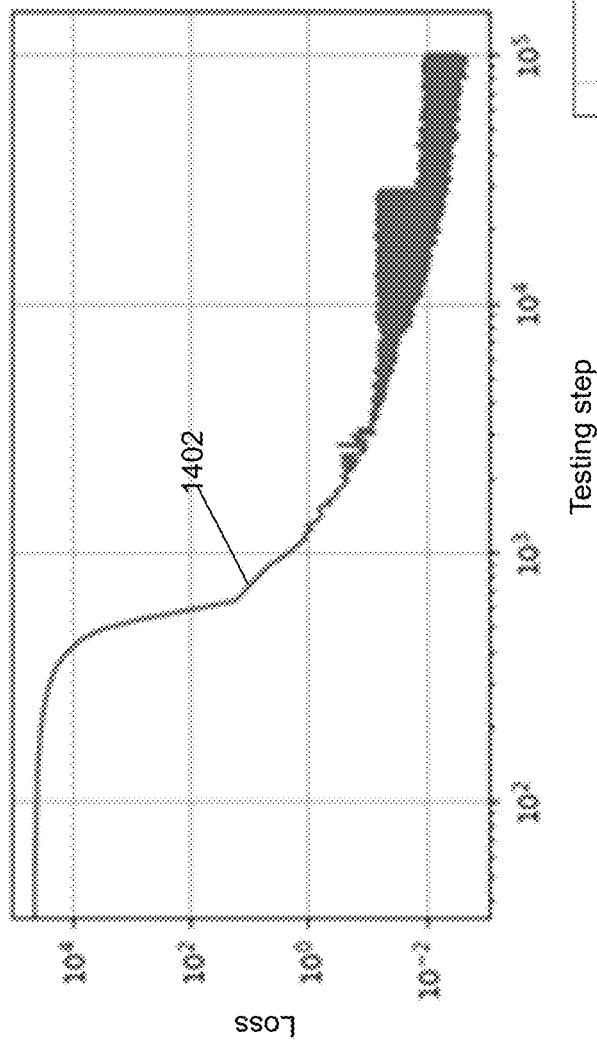
FIG. 14C shows a loss value as a function of a testing step computed for the state variable by the environment model training device of FIG. 6 in accordance with an illustrative embodiment.

Referring to FIG. 14A, a loss value curve 1400 is shown as a function of a training step computed for the first state variable by environment model training device 600 using a training dataset portion of historical data 124 in accordance with an illustrative embodiment. Referring to FIG. 14B, a loss value curve 1401 is shown as a function of a validation step computed for the first state variable by environment model training device 600 using a validation dataset portion of historical data 124 in accordance with an illustrative embodiment. Referring to FIG. 14C, a loss value curve 1402 is shown as a function of a testing step computed for the first state variable by environment model training device 600 using a testing dataset portion of historical data 124 in accordance with an illustrative embodiment.

Figure 16B:
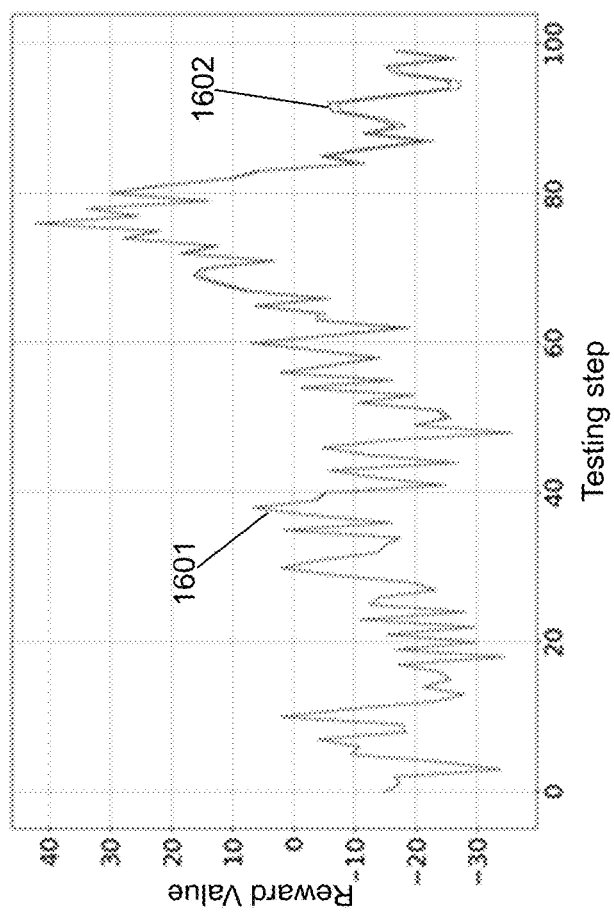
FIG. 16B shows a reward value as a function of the training step computed by the environment model training device of FIG. 6 in accordance with an illustrative embodiment.
Figure 16A:
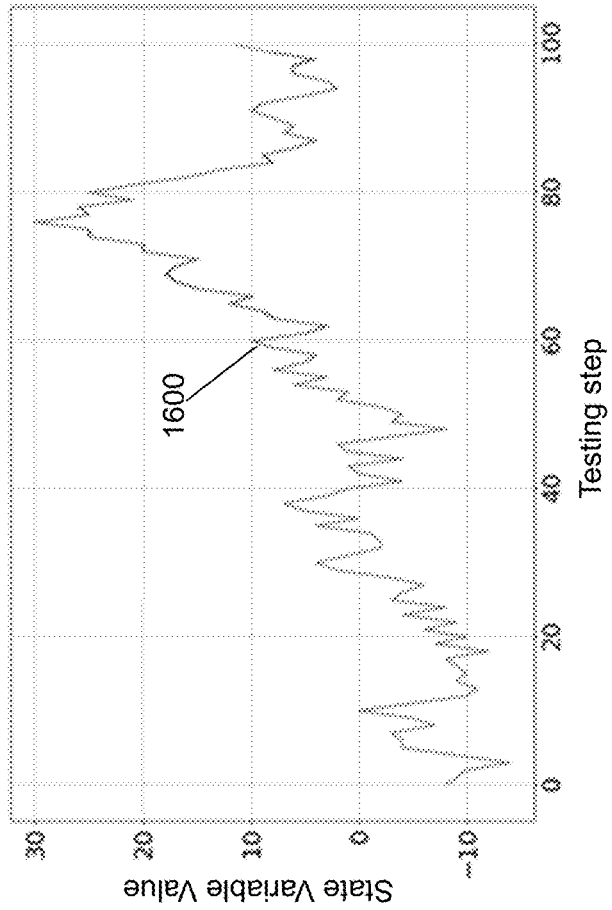
FIG. 16A shows a state variable value as a function of a training step computed by the environment model training device of FIG. 6 in accordance with an illustrative embodiment.

Referring to FIG. 16A, a predicted state variable value curve 1600 is shown as a function of the testing step computed for the first state variable by environment model training device 600 using the testing dataset portion of historical data 124 in accordance with an illustrative embodiment. Predicted state variable value curve 1600 directly overlays the actual state variable values included in the testing dataset portion of historical data 124 meaning that the trained neural network model for the first state variable is very accurate. A similar accuracy was achieved for the second state variable.

Referring to FIG. 16B, a predicted reward variable value curve 1601 and an actual reward variable value curve 1602 are shown as a function of the testing step computed for the reward variable by environment model training device 600 using the testing dataset portion of historical data 124 in accordance with an illustrative embodiment. Predicted reward variable value curve 1601 is very close to actual reward variable value curve 1602 generated from the testing dataset portion of historical data 124 meaning that the trained neural network model for the first reward variable is very accurate.

Figure 15:
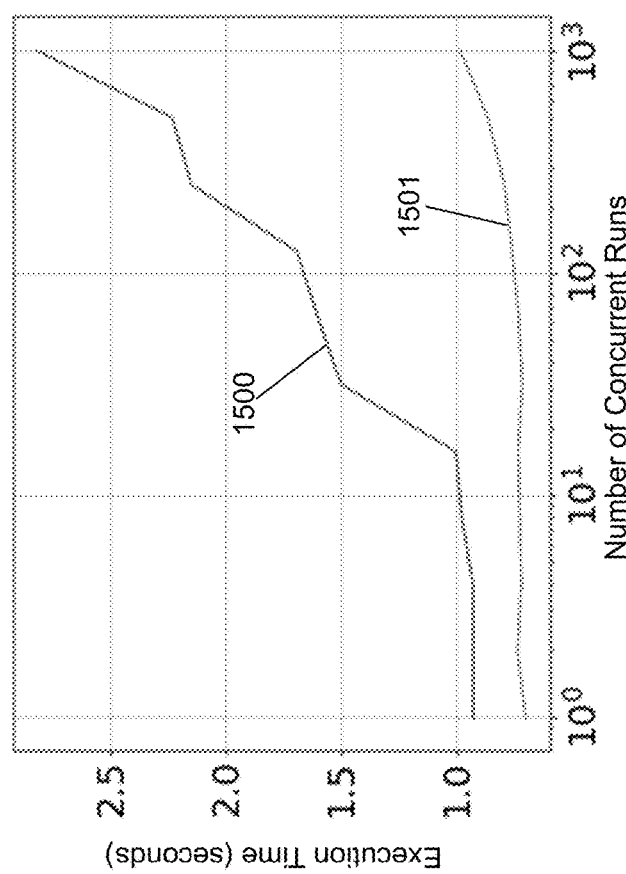
FIG. 15 shows an execution time of the simulator device of FIG. 8 as a function of a number of concurrent runs in accordance with an illustrative embodiment.

Parallel execution of machine state model description 626 instantiated as a machine state model can speed up the training process. $2^{\{1, \cdots, 10\}}$ episodes were executed at the same time for each call of the instantiated machine state models while training the controller model such that in each one, three episodes were run with 100 time-steps each. Referring to FIG. 15, an average execution time of each case is shown as a function of a number of concurrent runs in accordance with an illustrative embodiment. A CPU time curve 1500 shows the average execution times using a single thread of a CPU. A GPU time curve 1501 shows the average execution times using a single core of a GPU.

By utilizing the neural network as the core of the state and reward transition functions, several episodes of the instantiated machine state model can be executed together with only a very small increase in execution time. For example, for running 1 to 16 episodes together, the scoring execution times were almost equal when a single core of a CPU was used. Since the required time to run 16 episodes was almost equal to running a single episode, a huge speedup results when using the instantiated machine state model while training the controller model. Though the scoring execution time increases as the number pf episodes increases, executing 1024 episodes together resulted in a total scoring execution time of 2.5 seconds compared to 0.93 seconds for a single episode. When a single core of a GPU, V100 with 16 GB memory was used, the process was even faster. Using the GPU, executing 1024 episodes together resulted in a total scoring execution time of 0.99 seconds compared to 0.7 seconds for a single episode.

In summary, utilizing the neural network as the core of the machine state model and executing a plurality of episodes in parallel speeds up execution at least one order of magnitude using a single core of a CPU and three orders of magnitude using a single core of a GPU. This is very helpful in increasing the speed of training controller model description 1016, or executing environment simulator device 600*aa* when performing scenario analysis.

Figure 17:
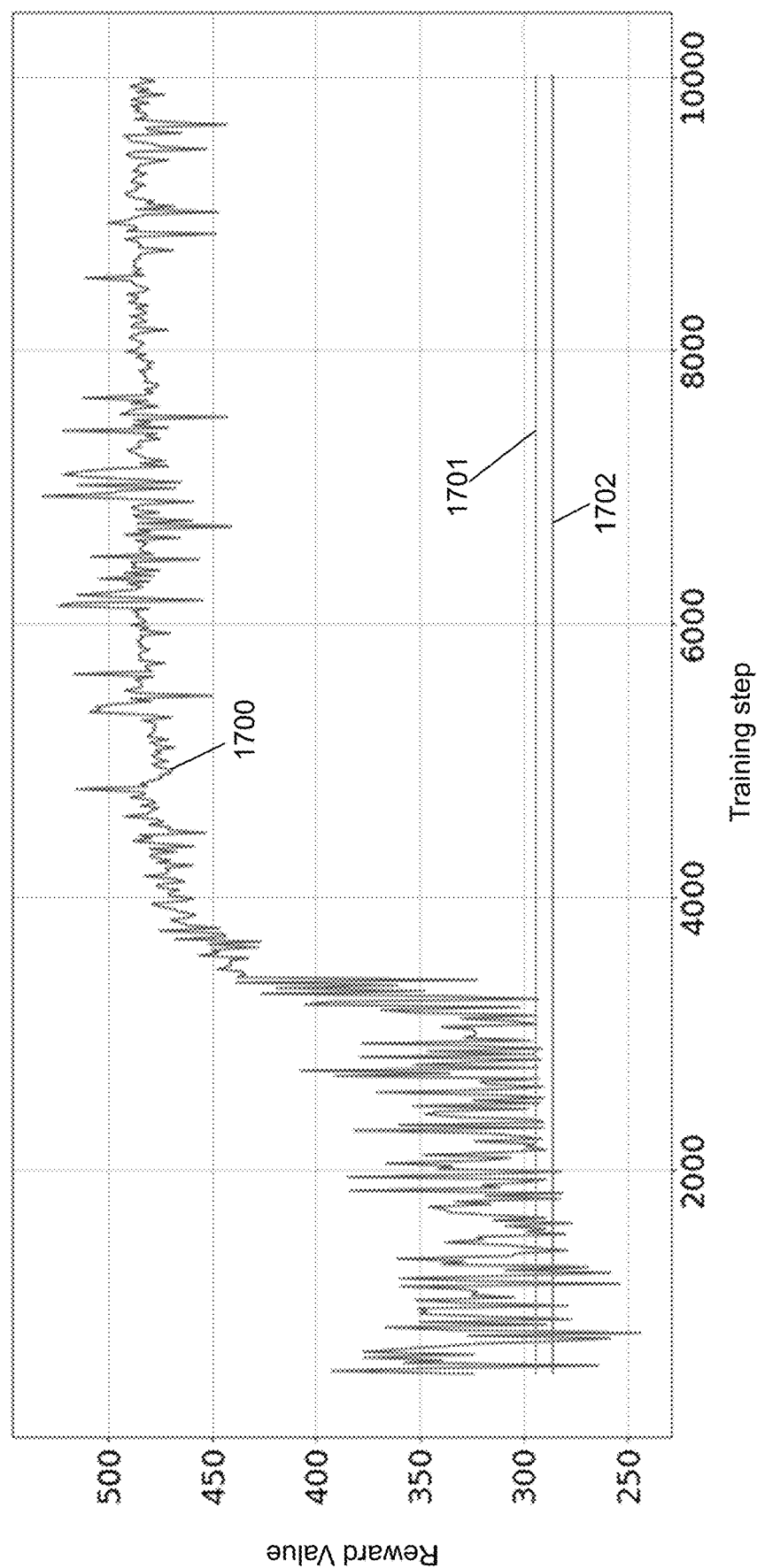
FIG. 17 shows the reward value as a function of the training step computed by the controller model training device of FIG. 10 in accordance with an illustrative embodiment.

Using instantiated machine state model, controller model description 1016 was trained using controller training application 1012. Referring to FIG. 17, the reward value for a training episode is shown as a function of the training step computed by the controller model training device 1000 in accordance with an illustrative embodiment. A predicted reward value curve 1700 shows an average of the reward value for 128 episodes, each with 100 time-steps computed using controller training application 1012 to determine the next action. An actual reward value curve 1701 shows an average of the reward value for the 128 episodes determined using the next action included in the synthetic data. A random reward value curve 1702 shows an average of the reward value for the 128 episodes using a random action selection. Predicted reward value curve 1700 shows that controller training application 1012 started from a random policy and, after some exploration, converged to a good policy with a significantly higher reward value.

Using 5000 episodes with 100 time-steps in each, controller training application 1012 achieved the reward value of 423.4, while the actual policy based on the current practice of the process achieved the reward value of 244.2. The random policy (where the actions were selected randomly) achieved the reward value of 171.7. These results, encourage utilization of controller training application 1012 to train a controller model for use in manufacturing environments to maximize the efficiency of the machines and optimize the revenue of the company.

Figure 18A:
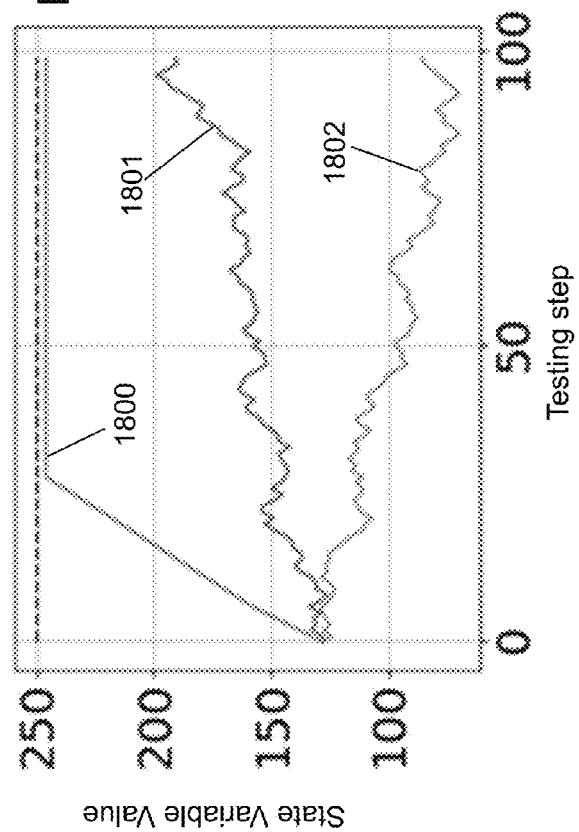
FIG. 18A shows a state variable value as a function of a testing step computed by the controller model training device of FIG. 10 in accordance with an illustrative embodiment.

Referring to FIG. 18A, a state variable value comparison is shown as a function of the testing step for the first state variable in accordance with an illustrative embodiment. A predicted state variable value curve 1800 shows the state variable value computed using controller training application 1012 to determine the next action. An actual state variable value curve 1801 shows the state variable value determined using the next action included in the synthetic data. A random state variable value curve 1802 shows the state variable value determined using a random action selection.

Figure 18B:
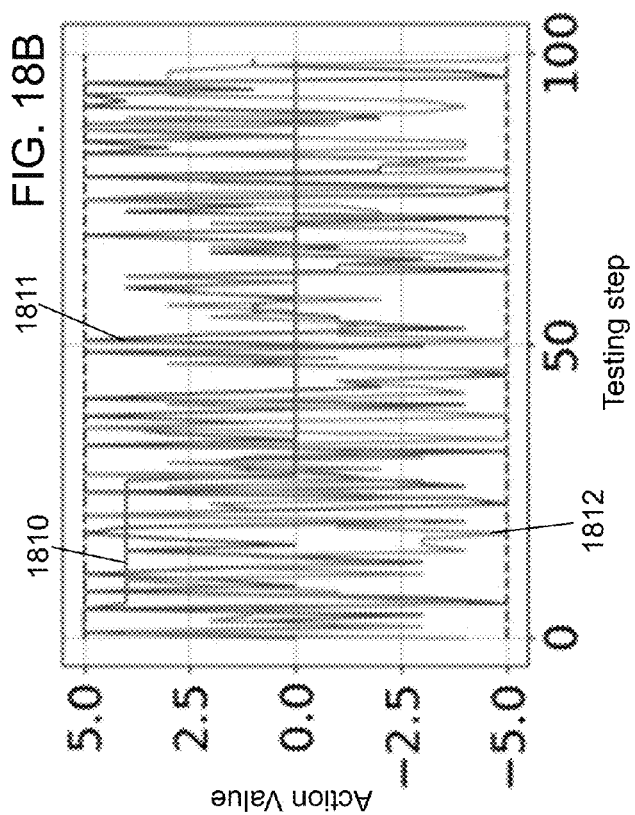
FIG. 18B shows a reward value as a function of the testing step computed by the controller model training device of FIG. 10 in accordance with an illustrative embodiment.

Referring to FIG. 18B, a reward variable value comparison is shown as a function of the testing step in accordance with an illustrative embodiment. A predicted reward variable value curve 1810 shows the reward variable value computed using controller training application 1012 to determine the next action. An actual reward variable value curve 1811 shows the reward variable value determined using the next action included in the synthetic data. A random reward variable value curve 1812 shows the reward variable value determined using a random action selection.

Figure 18C:
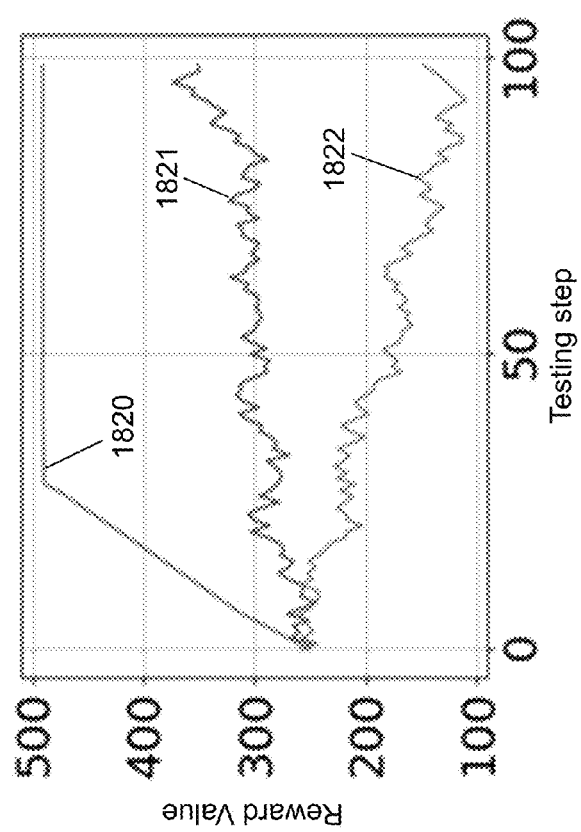
FIG. 18C shows an action value as a function of the testing step computed by the controller model training device of FIG. 10 in accordance with an illustrative embodiment.

Referring to FIG. 18C, an action variable value comparison is shown as a function of the testing step in accordance with an illustrative embodiment. A predicted action variable value curve 1820 shows the action variable value selected using controller training application 1012. An actual action variable value curve 1821 shows the action variable value included in the synthetic data. A random action variable value curve 1822 shows the action variable value determined using random selection.

Predicted reward variable value curve 1810 shows that the controller model learned the underlying mechanics of the system and increased the oven temperature or speed of the machine until it reached the threshold and then remained below the threshold. As a result, the trained controller model achieved the highest average reward among the three comparison cases.

Pipeline 1900 describes a process for creating a controller model description 1016 that can be used to instantiate an automated decision-making agent, controller agent 1224. Pipeline 1900 uses historical data 124 as the input and uses a neural network to train a parallelizable environment. If historical data is limited, pipeline 1900 uses generator model description 126 to augment the data for use by environment training device 600 and/or controller training device 1000. Given the environment (instantiated machine state model), a reinforcement learning algorithm is used to train a policy to control a certain machine in the manufacturing line. The results show that pipeline 1900 significantly outperforms the actual policy and, not surprisingly, a random policy, proving its capability in controlling a manufacturing process.

Pipeline 1900 was applied to a manufacturing process of a high-volume glass parts supplier. The company buys raw flat pieces of glass from different suppliers and bends them to curvatures defined for different usages. For this purpose, the pieces of glass go into a series of seven ovens, and their temperature increases in each of them, theoretically to the temperature of that oven. The goal is to set the glass temperatures to a certain target temperature and then bend them with a certain pressure to achieve the target curvature. The bending pressure is set a priori and cannot be adjusted once it is set. As a result, the only control mechanism that remains is the set-point temperature of the ovens. If the temperature of a piece of a glass reaches the target temperature, the bending operation results in the expected target curvature. Any deviation from that temperature results in some level of deviation from the target curvature. Hotter pieces of glass will observe more curvature than the target, and the cooler pieces of glass will be curved less than the target curvature. Although in theory one should be able to heat the ovens and the glass gradually to achieve the required temperature, there are two sources of stochasticity in this process that hinder achieving the required temperature: (i) uncertainty in the oven temperature, compared to the set-point temperature, and (ii) uncertainty in the glass temperature, compared to the oven temperature.

First, consider the uncertainty in the oven temperature. In the production line, a set-point for each oven is determined and once the piece of glass enters the oven, the oven is heated/cooled for a certain amount of time (usually few seconds) to become as hot/cold as the set-point temperature. Apparently, the goal is to reach the set-point temperature and stay there for the certain amount of time. However, the observed temperatures of the ovens involve some level of uncertainty, i.e., sometimes it deviates a lot from the set-point temperature, especially when a new target curvature or a new raw glass is introduced to the ovens, which usually requires a big adjustment in the oven temperatures. In addition, in the stable condition (in terms of the target curvature or the properties of the raw glass), the observed temperature may still deviate from the set-point temperature. The initial temperature of the oven, the temperature of the glass at the time the glass enters the oven, and the duration of heating the glass up/down results in a warmer or a colder temperature than the set-point temperature. All these uncertainties result in stochastic observations in the oven temperature.

Now consider the uncertainty in the glass temperature. To get the best curvature performance, according to physic-based formulas, the temperature of the glass should not be increased at once so that they need to go into a series of ovens for a gradual warm up. Besides, when a piece of glass goes into an oven, it does not necessarily warm up to the temperature of that oven. The temperature of the glass after exiting the oven depends on (i) the properties of the raw glass (which varies with the supplier), (ii) the initial thickness of the glass, (iii) and the temperature of the glass at the time the glass enters the oven. Based on these properties, the temperature of the glass after exiting the oven shows some stochasticity and could be lower or even higher than the temperature of that oven.

These uncertainties in the process result in a difficult decision-making problem for the set-point temperatures. In addition, there are several physical limits in this process that make the decision making even harder. For example, the set-point temperature cannot go beyond four degrees above/below the current oven temperature.

Also, this is a sequential decision-making problem such that the set-point temperature of each oven affects the performance of the next oven(s) (if any). In addition, the set-point temperatures affect the performance of the coming glasses in the same oven. So, one cannot act greedily to obtain a good performance for an existing piece of glass since the coming glasses need to be considered in the next time-steps.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   train a generative adversarial network with an autoencoder using a first plurality of observation vectors, wherein each observation vector of the first plurality of observation vectors includes state variable values for state variables and an action variable value for an action variable, wherein the state variables define a machine state, wherein the action variable defines a next action taken in response to the machine state, wherein the first plurality of observation vectors successively define sequential machine states to manufacture a product;
   generate a second plurality of observation vectors using the trained generative adversarial network with the autoencoder, wherein a plurality of observation vectors includes the first plurality of observation vectors and the generated second plurality of observation vectors;
   train a machine state machine learning model to predict a subsequent machine state using the plurality of observation vectors; and
   output a description of the trained machine state machine learning model.

2. The non-transitory computer-readable medium of claim 1, wherein training the generative adversarial network with the autoencoder comprises:
   (A) defining a plurality of conditional vectors, wherein the plurality of conditional vectors includes a predefined number of vectors, wherein each conditional vector of the plurality of conditional vectors includes a vector defined for each discrete variable of the state variables and the action variable;
   (B) generating a plurality of latent observation vectors using a predefined noise distribution function, wherein the plurality of latent observation vectors includes the predefined number of vectors, wherein each latent observation vector of the plurality of latent observation vectors includes a first value for each variable of the state variables and the action variable;
   (C) executing a forward propagation of a generator model with the defined plurality of conditional vectors and the generated plurality of latent observation vectors as input to generate an output vector;
   (D) executing a forward propagation of a decoder model of a trained autoencoder model with the generated output vector as input to generate a plurality of decoded vectors, wherein the plurality of decoded vectors includes the predefined number of vectors;
   (E) selecting a plurality of transformed observation vectors from transformed data based on the defined plurality of conditional vectors, wherein the plurality of transformed observation vectors includes the predefined number of vectors, wherein each transformed observation vector of the plurality of transformed observation vectors is a transformation of a respective observation vector of the first plurality of observation vectors;
   (F) executing a forward propagation of a discriminator model with the selected plurality of transformed observation vectors, the defined plurality of conditional vectors, and the generated plurality of decoded vectors as input to predict whether each of the selected plurality of transformed observation vectors and the generated plurality of decoded vectors is real or fake;
   (G) computing a discriminator model loss value based on whether the prediction for each of the selected plurality of transformed observation vectors and the generated plurality of decoded vectors is correct;
   (H) updating the discriminator model using the computed discriminator model loss value;
   (I) computing a generator model loss value based on whether the prediction for each of the plurality of transformed observation vectors and the generated plurality of decoded vectors is correct;

(J) updating the generator model using the computed generator model loss value;

repeating (A) through (J) until a convergence parameter value indicates that training of the generator model is complete; and wherein the generator model and the decoder model of the trained autoencoder model are the trained generative adversarial network with the autoencoder.

3. The non-transitory computer-readable medium of claim 2, wherein the generator model includes a first plurality of neural network layers.

4. The non-transitory computer-readable medium of claim 3, wherein the input to the generator model is a concatenation of the defined plurality of conditional vectors and the generated plurality of latent observation vectors.

5. The non-transitory computer-readable medium of claim 4, wherein the output vector is generated from application of a linear transformation layer from an input dimension defined by the concatenation of the defined plurality of conditional vectors and the generated plurality of latent observation vectors to a predefined output dimension, application of a batch normalization activation function layer, application of a rectified linear activation function layer, and application of a hyperbolic tangent activation function layer.

6. The non-transitory computer-readable medium of claim 5, wherein the decoder model includes a plurality of fully-connected neural network layers, wherein an input layer of the decoder model accepts the output vector defined based on the predefined output dimension.

7. The non-transitory computer-readable medium of claim 6, wherein each decoded vector of the generated plurality of decoded vectors includes a probability density value and a mode vector defined for each continuous variable of the state variables and the action variable and a one-hot vector representation of each discrete variable of the state variables and the action variable.

8. The non-transitory computer-readable medium of claim 7, wherein the discriminator model includes a third plurality of neural network layers, wherein an output layer of the third plurality of neural network layers assigns a label that indicates whether each of the plurality of transformed observation vectors and the generated plurality of decoded vectors is real or fake.

9. The non-transitory computer-readable medium of claim 8, wherein the discriminator model loss value is computed by providing the plurality of transformed observation vectors and the defined plurality of conditional vectors to the input layer of the discriminator model and by separately providing the generated plurality of decoded vectors and the defined plurality of conditional vectors to the input layer of the discriminator model.

10. The non-transitory computer-readable medium of claim 3, wherein the forward propagation of the generator model executes the generator model using current weight values defined for each node of each layer of the first plurality of neural network layers.

11. The non-transitory computer-readable medium of claim 10, wherein the update of the generator model computes new weight values for each node of each layer of the first plurality of neural network layers.

12. The non-transitory computer-readable medium of claim 2, wherein the convergence parameter value is a number of iterations of (J) and indicates that training of the generator model is complete based on the number of iterations of (J) exceeding a predefined maximum number of iterations.

13. The non-transitory computer-readable medium of claim 2, wherein the convergence parameter value is a loss value computed from the computed discriminator loss value and the computed generator model loss value and indicates that training of the generator model is complete based on the convergence parameter value being less than or equal to a predefined convergence value.

14. The non-transitory computer-readable medium of claim 13, wherein the convergence parameter value further includes a gradient penalty loss value computed before (H) and after (F) by executing the forward propagation of the discriminator model with weighted vectors and the defined plurality of conditional vectors, wherein the weighted vectors are computed from the plurality of transformed observation vectors and the generated plurality of decoded vectors.

15. The non-transitory computer-readable medium of claim 2, wherein each transformed observation vector of the plurality of transformed observation vectors includes a probability density value and a mode vector defined for each continuous variable of the state variables and the action variable and a one-hot vector representation of each discrete variable of the state variables and the action variable.

16. The non-transitory computer-readable medium of claim 2, wherein each transformed observation vector of the plurality of transformed observation vectors is selected from the first plurality of observation vectors based on a respective conditional vector of the plurality of conditional vectors.

17. The non-transitory computer-readable medium of claim 2, wherein, before (A), the computer-readable instructions further cause the computing device to:

transform the plurality of observation vectors to define the plurality of transformed observation vectors; and train the autoencoder model with the plurality of transformed observation vectors.

18. The non-transitory computer-readable medium of claim 17, wherein, transforming the plurality of observation vectors comprises:

computing a mode vector for each continuous variable of the state variables and the action variable from the first plurality of observation vectors;

computing a probability density value for each continuous variable of the state variables and the action variable from the first plurality of observation vectors; and defining a one-hot vector representation vector for each discrete variable of the state variables and the action variable from the first plurality of observation vectors.

19. The non-transitory computer-readable medium of claim 18, wherein each conditional vector of the plurality of conditional vectors includes a value in a single position of the respective conditional vector that is associated with a specific value for one of the discrete variables, wherein each transformed observation vector of the plurality of transformed observation vectors is selected from the first plurality of observation vectors based on the specific value.

20. The non-transitory computer-readable medium of claim 2, wherein, generating the second plurality of observation vectors comprises:

(K) defining a conditional vector that includes the vector defined for each discrete variable of the state variables and the action variable;

(L) generating a latent observation vector using the predefined noise distribution function, wherein the latent observation includes a third value for each variable of the state variables and the action variable;

(M) executing the trained generator model with the defined conditional vector and the generated latent observation vector as input to generate a second output vector;
(N) executing the decoder model of the trained autoencoder model with the second output vector as input to generate a fake output vector;
(O) transforming the generated fake output vector from an output space defined by the generated plurality of decoded vectors to an input space defined by the first plurality of observation vectors;
(P) outputting the transformed, generated fake output vector; and
repeating (K) through (P) a plurality of times to generate the second plurality of observation vectors that includes each transformed, generated fake output vector output in (P).

21. The non-transitory computer-readable medium of claim 1, wherein the computer-readable instructions further cause the computing device to:
train a controller machine learning model to predict a subsequent action value using the plurality of observation vectors and a reward value associated with each respective observation vector of the plurality of observation vectors, wherein as part of the training of the controller machine learning model, the state variables and the subsequent action value are provided as input to the trained machine state machine learning model to predict the next machine state and to the trained reward machine learning model to predict the reward value, wherein the controller machine learning model is trained to predict the subsequent action value by optimizing the predicted reward value; and
output a description of the trained controller machine learning model.

22. The non-transitory computer-readable medium of claim 1, wherein the machine state machine learning model includes a neural network machine learning model trained to define a state-transition function for each state variable of the state variables.

23. The non-transitory computer-readable medium of claim 1, wherein the computer-readable instructions further cause the computing device to:
train a controller machine learning model to predict a subsequent action value using the plurality of observation vectors and a reward value associated with each respective observation vector of the plurality of observation vectors, wherein as part of the training of the controller machine learning model, the state variables and the subsequent action value are provided as input to the trained machine state machine learning model to predict the subsequent machine state, wherein the controller machine learning model is trained to predict the subsequent action value by optimizing the reward value; and
output a description of the trained controller machine learning model.

24. The non-transitory computer-readable medium of claim 23, wherein the reward value is computed using a predefined reward function with a reward variable value of a reward variable defined for each observation vector of the plurality of observation vectors.

25. The non-transitory computer-readable medium of claim 23, wherein the computer-readable instructions further cause the computing device to:
instantiate a controller agent from the description of the trained controller machine learning model;
receive a current machine state of a machine;
input the received current machine state to the instantiated controller agent to predict the next action by the machine; and
control performance of the predicted next action by the machine.

26. The non-transitory computer-readable medium of claim 23, wherein the controller machine learning model is a neural network machine learning model trained using reinforcement learning.

27. The non-transitory computer-readable medium of claim 26, wherein the controller machine learning model is trained using multi-task learning.

28. The non-transitory computer-readable medium of claim 23, wherein the controller machine learning model is further trained using a physics model to predict at least one state variable of the state variables.

29. A computing device comprising:
a processor; and
a non-transitory computer-readable medium operably coupled to the processor, the computer-readable medium having computer-readable instructions stored thereon that, when executed by the processor, cause the computing device to
train a generative adversarial network with an autoencoder using a first plurality of observation vectors, wherein each observation vector of the first plurality of observation vectors includes state variable values for state variables and an action variable value for an action variable, wherein the state variables define a machine state, wherein the action variable defines a next action taken in response to the machine state, wherein the first plurality of observation vectors successively define sequential machine states to manufacture a product;
generate a second plurality of observation vectors using the trained generative adversarial network with the autoencoder, wherein a plurality of observation vectors includes the first plurality of observation vectors and the generated second plurality of observation vectors;
train a machine state machine learning model to predict a subsequent machine state using the plurality of observation vectors; and
output a description of the trained machine state machine learning model.

30. A method of training a machine state predictive model, the method comprising:
training, by a computing device, a generative adversarial network with an autoencoder using a first plurality of observation vectors, wherein each observation vector of the first plurality of observation vectors includes state variable values for state variables and an action variable value for an action variable, wherein the state variables define a machine state, wherein the action variable defines a next action taken in response to the machine state, wherein the first plurality of observation vectors successively define sequential machine states to manufacture a product;
generating, by the computing device, a second plurality of observation vectors using the trained generative adversarial network with the autoencoder, wherein a plurality of observation vectors includes the first plurality of observation vectors and the generated second plurality of observation vectors;

training, by the computing device, a machine state machine learning model to predict a subsequent machine state using the plurality of observation vectors; and outputting, by the computing device, a description of the trained machine state machine learning model.

* * * * *